US008814614B2

(12) United States Patent
Suzuki et al.

(10) Patent No.: US 8,814,614 B2
(45) Date of Patent: Aug. 26, 2014

(54) MARINE VESSEL PROPULSION DEVICE

(71) Applicant: Yamaha Hatsudoki Kabushiki Kaisha, Iwata (JP)

(72) Inventors: Takayoshi Suzuki, Shizuoka (JP); Noriyoshi Hiraoka, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 112 days.

(21) Appl. No.: 13/670,613

(22) Filed: Nov. 7, 2012

(65) Prior Publication Data
US 2013/0115832 A1    May 9, 2013

(30) Foreign Application Priority Data
Nov. 8, 2011    (JP) ................................ 2011-244662

(51) Int. Cl.
*B63H 21/22* (2006.01)
*B63H 21/17* (2006.01)
*B63H 21/14* (2006.01)
*B63H 21/20* (2006.01)

(52) U.S. Cl.
CPC ............. *B63H 21/14* (2013.01); *Y02Y 70/5236* (2013.01); *B63H 2021/205* (2013.01); *B63H 21/17* (2013.01); *B63H 21/20* (2013.01)
USPC ..................................... 440/1; 440/6; 440/71

(58) Field of Classification Search
USPC .................................................. 440/1, 71, 6
IPC ....................................................... B63H 21/17
See application file for complete search history.

(56) References Cited

U.S. PATENT DOCUMENTS

| 5,722,864 | A | * | 3/1998 | Andiarena | 440/5 |
| 6,175,354 | B1 | * | 1/2001 | Blissett et al. | 345/110 |
| 7,207,852 | B2 | * | 4/2007 | Myers | 440/3 |
| 7,862,393 | B2 | * | 1/2011 | Levander et al. | 440/3 |
| 2004/0147181 | A1 | | 7/2004 | Elizondo | |
| 2008/0113569 | A1 | | 5/2008 | Kaji | |
| 2013/0115833 | A1 | * | 5/2013 | Suzuki et al. | 440/2 |

FOREIGN PATENT DOCUMENTS

EP         0 115 045 A1    8/1984
WO    2010/002340 A1    1/2010

OTHER PUBLICATIONS

Official Communication issued in corresponding European Patent Application No. 12191645.6, mailed on Feb. 21, 2013.
Suzuki et al., "Marine Vessel Propulsion Device", U.S. Appl. No. 13/670,610, filed Nov. 7, 2012.

* cited by examiner

*Primary Examiner* — Stephen Avila
(74) *Attorney, Agent, or Firm* — Keating & Bennett, LLP

(57) ABSTRACT

A marine vessel propulsion device includes a propeller rotatable around a propeller axis, a duct that surrounds the propeller around the propeller axis, an internal combustion engine that rotates the propeller relative the duct, and an electric motor that rotates the propeller relative to the duct. The propeller includes a plurality of blades, and a cylindrical rim that surrounds the plurality of blades around the propeller axis. The electric motor rotates the propeller by rotating the rim.

26 Claims, 27 Drawing Sheets

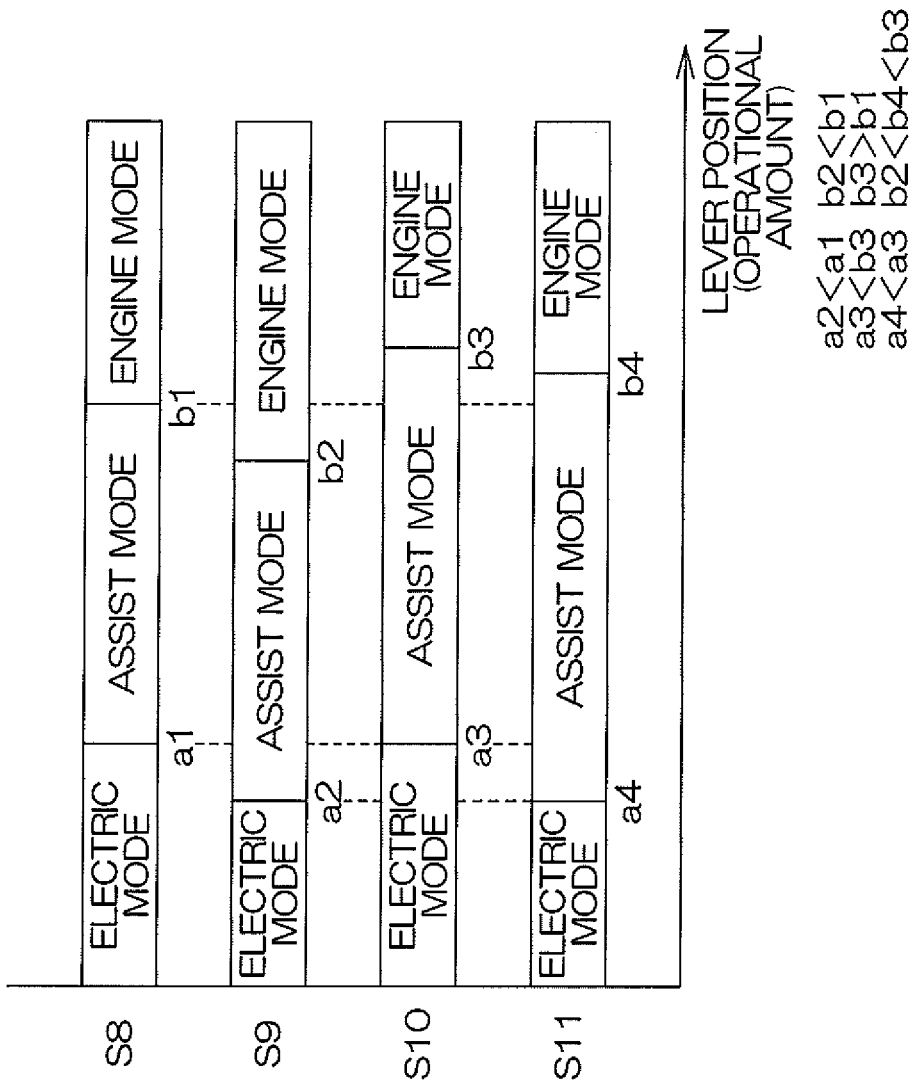

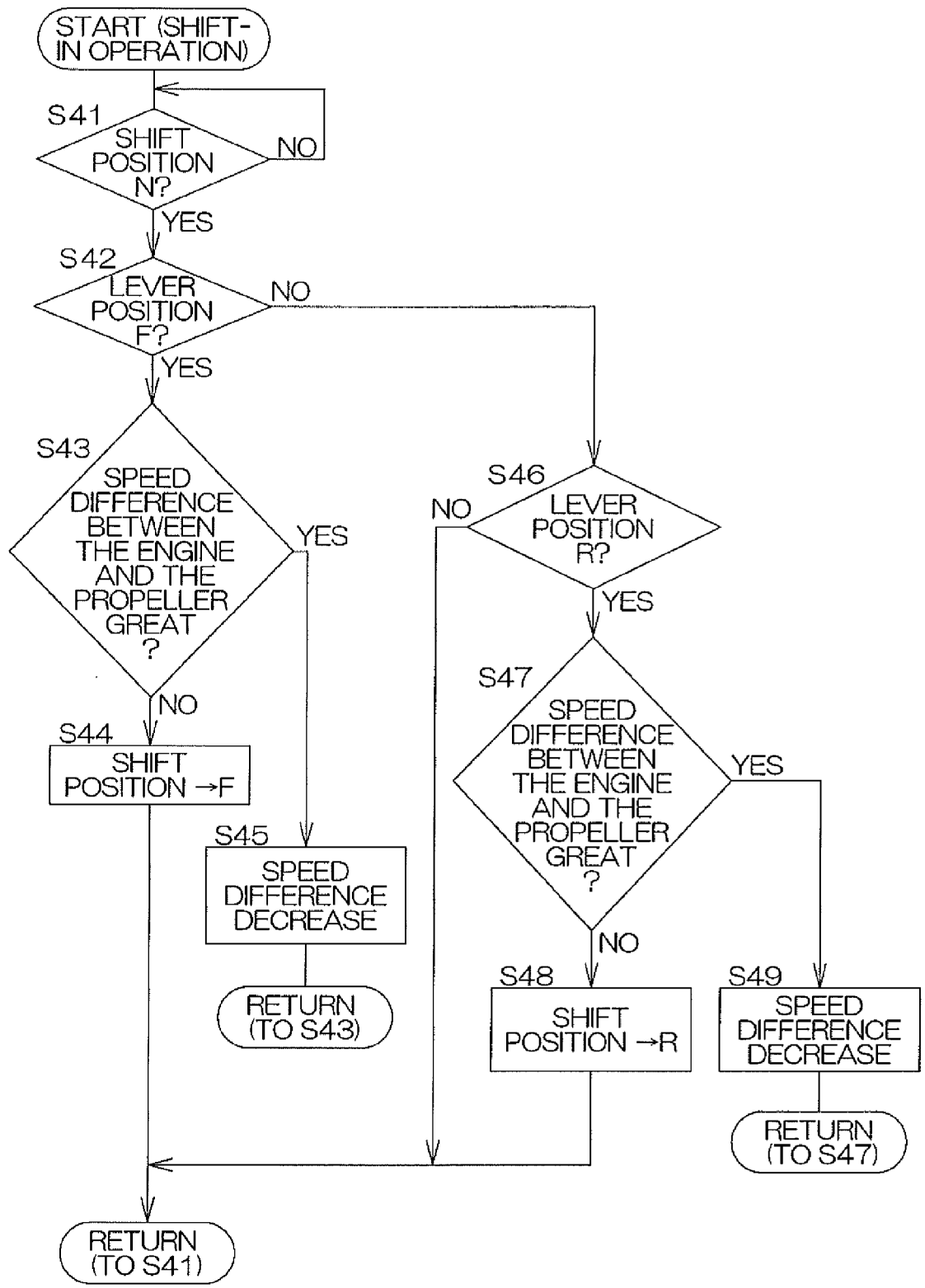

MARINE VESSEL PROPULSION DEVICE

BACKGROUND OF THE INVENTION

1. Field of the Invention

The present invention relates to a marine vessel propulsion device.

2. Description of the Related Art

A hybrid type marine vessel propulsion device including an engine (internal combustion engine) and an electric motor has been disclosed.

For example, United States Patent Application Publication Number US 2008/0113569 A1 discloses a marine vessel propulsion device that includes an outboard motor having a built-in engine and a built-in electric motor. The engine is connected to a propeller through a drive shaft, a forward/rearward switching mechanism, and a propeller shaft. The electric motor is placed on the drive shaft between the engine and the forward/rearward switching mechanism. The engine is connected to the electric motor through a multi-plate clutch placed on the drive shaft. When the propeller is driven by the engine, the multi-plate clutch is engaged, and, when the propeller is driven by the electric motor, the multi-plate clutch is disengaged. As a result, the power of the electric motor is prevented from being transmitted to the engine.

SUMMARY OF THE INVENTION

The inventors of preferred embodiments of the present invention described and claimed in the present application conducted an extensive study and research regarding a marine vessel propulsion device, such as the one described above, and in doing so, discovered and first recognized new unique challenges and previously unrecognized possibilities for improvements as described in greater detail below.

In the marine vessel propulsion device of US 2008/0113569 A1, the electric motor is placed on the drive shaft between the forward/rearward switching mechanism and the engine, and therefore the multi-plate clutch is required to be disposed between the engine and the electric motor. Therefore, the structure of the marine vessel propulsion device is complex.

In order to overcome the previously unrecognized and unsolved challenges described above, a first preferred embodiment of the present invention provides a marine vessel propulsion device that includes a propeller that is rotatable around a propeller axis, a duct that surrounds the propeller around the propeller axis, an internal combustion engine that rotates the propeller with respect to the duct, and an electric motor that rotates the propeller with respect to the duct. The propeller includes a plurality of blades and a cylindrical rim surrounding the plurality of blades around the propeller axis. The electric motor rotates the propeller with respect to the duct by rotating the rim.

According to this arrangement, the propeller including the blades and the rim is surrounded by the duct. The internal combustion engine rotates the propeller around the propeller axis with respect to the duct. On the other hand, the electric motor rotates the propeller around the propeller axis with respect to the duct by rotating the rim. Therefore, the propeller is rotationally driven by either the internal combustion engine or the electric motor or by both the internal combustion engine and the electric motor. As a result, a thrust force that propels the marine vessel is generated. The internal combustion engine and the electric motor can rotate the propeller independently of each other in this manner, and therefore the structure of the marine vessel propulsion device can be simplified.

The propeller may further include a propeller rotational shaft that extends along the propeller axis, and rotates around the propeller axis together with the blades. In this case, the internal combustion engine may rotate the propeller with respect to the duct by rotating the propeller rotational shaft.

The electric motor may be a direct drive motor that directly drives the rim. In other words, the electric motor may include a stator defined by at least a portion of the duct and a rotor defined by at least a portion of the rim. In this case, the rim may include a magnet that defines at least a portion of the rotor. In other words, the electric motor may be a permanent-magnet type direct-current motor including a permanent-magnet rotor. The electric motor may be a reluctance motor including a salient poled rotor.

The marine vessel propulsion device may further include a shift operating member that is operable by a vessel operator in order to switch a direction of a thrust force generated by the marine vessel propulsion device between a forward direction and a backward direction, a forward/rearward switching mechanism that performs switching among a forward state in which the internal combustion engine and the propeller are connected together so as to generate a thrust force in the forward direction, a neutral state in which a connection between the internal combustion engine and the propeller is released, and a rearward state in which the internal combustion engine and the propeller are connected together so as to generate a thrust force in the backward direction, an engine speed detector that detects a rotation speed of the internal combustion engine, a propeller speed detector that detects a rotation speed of the propeller, and a control device programmed to control the forward/rearward switching mechanism. The propeller speed detector may detect the rotation speed of the propeller itself, or may detect the rotation speed of an intermediate member (e.g., an engine output transmission shaft) that is disposed between the forward/rearward switching mechanism and the propeller and that rotates together with the propeller. In other words, the propeller speed detector may be arranged to detect the propeller rotation speed at any position downstream of the forward/rearward switching mechanism.

In this case, the control device may be programmed to perform a shift-in control that switches the forward/rearward switching mechanism from the neutral state to the forward state or to the rearward state only when a speed difference that is a difference between the rotation speed of the internal combustion engine and the rotation speed of the propeller falls within a predetermined range, in response to a shift-in operation performed on the operating member to switch the forward/rearward switching mechanism from the neutral state to the forward state or to the rearward state. When the speed difference does not fall within the predetermined range when the shift-in operation is performed on the shift operating member, the control device may be programmed to change the speed difference so as to fall within the predetermined range by controlling at least either one of the internal combustion engine and the electric motor. The control device may be programmed to change the speed difference so as to fall within the predetermined range, and may thereafter perform the shift-in control. If the speed difference falls within the predetermined range when the shift-in operation is performed, the control device may be programmed to perform the shift-in control without changing the output of the internal combustion engine and that of the electric motor. In this case, an input shaft of the forward/rearward switching mechanism and an output shaft of the forward/rearward switching mechanism are connected together in a state in which the relative speed between the input shaft (e.g., a front gear and a rear gear described below) and the output shaft (e.g., a dog clutch described below) is small. Therefore, a shock (i.e., shift shock) caused in response to the shift-in control can be reduced.

When a reverse operation in which the forward/rearward switching mechanism is switched from either one of the forward state and the rearward state to the other one is performed with respect to the shift operating member, the control device may be programmed to decrease the rotation speed of the propeller in a pre-reverse direction to a cut-off speed by controlling the electric motor, and may thereafter to switch the forward/rearward switching mechanism from the forward state or from the rearward state to the neutral state. The control device may be programmed to switch the forward/rearward switching mechanism to the neutral state, and may thereafter rotate the propeller in a post-reverse direction opposite to the pre-reverse direction by controlling the electric motor, and may accelerate the propeller until the rotation speed of the propeller in the post-reverse direction reaches not less than a connection speed. The control device may be programmed to switch the forward/rearward switching mechanism from the neutral state to the forward state or to the rearward state in a state in which the rotation speed of the propeller in the post-reverse direction is not less than the connection speed. The pre-reverse direction and the post-reverse direction are directions opposite to each other around the propeller axis.

The internal combustion engine is connected to the propeller through the forward/rearward switching mechanism. When the forward/rearward switching mechanism is switched to the neutral state, a connection between the internal combustion engine and the propeller is released, and therefore a load applied from the propeller to the internal combustion engine is zero. Therefore, if the forward/rearward switching mechanism is switched to the neutral state in a state in which the rotation speed of the propeller is high, there is a possibility that the rotation speed of the internal combustion engine will be greatly increased. Therefore, the forward/rearward switching mechanism is switched to the neutral state in a state in which the rotation speed of the propeller in the pre-reverse direction has been decreased, and, as a result, the rotation speed of the internal combustion engine can be prevented from being greatly increased. Additionally, a shift shock can be reduced by switching the forward/rearward switching mechanism from the neutral state to the forward state or to the rearward state in a state in which the rotation speed of the propeller is not less than the connection speed.

When a shift-out operation is performed on the shift operating member so as to switch the forward/rearward switching mechanism from the forward state or from the rearward state to the neutral state, the control device may be programmed to decrease the rotation speed of the propeller in a pre-shift-out direction to a cut-off speed by controlling the electric motor, and may thereafter switch the forward/rearward switching mechanism from the forward state or from the rearward state to the neutral state. The pre-shift-out direction is a direction of the rotation of the propeller immediately before the shift-out operation is performed. For example, if a shift-out operation is performed on the shift operating member in order to switch the forward/rearward switching mechanism from the forward state to the neutral state, the pre-shift-out direction is a direction in which the propeller generates a thrust force in the forward direction.

The internal combustion engine may be disposed inside the vessel, or may be disposed outside the vessel. If the internal combustion engine is disposed outside the vessel, the marine vessel propulsion device may include an outboard motor in which the internal combustion engine is provided. In detail, the marine vessel propulsion device may further include a drive shaft, a forward/rearward switching mechanism, and an engine output transmission shaft. The drive shaft extends in a vertical or substantially vertical direction, and is rotationally driven by the internal combustion engine. The forward/rearward switching mechanism includes an output shaft that extends in the front-rear direction, and transmits the rotation of the drive shaft to the output shaft. The engine output transmission shaft transmits the rotation of the output shaft to the propeller. The forward/rearward switching mechanism can change the rotation direction of the output shaft with respect to the rotation direction of the drive shaft. Therefore, the forward/rearward switching mechanism can change the rotation direction of the engine output transmission shaft and that of the propeller.

If the marine vessel propulsion device includes the drive shaft, the forward/rearward switching mechanism, and the engine output transmission shaft, the propeller may be disposed in front of or behind the forward/rearward switching mechanism, or may be disposed below the output shaft. If the propeller is disposed in front of or behind the forward/rearward switching mechanism, the output shaft and the engine output transmission shaft may be disposed coaxially. If the propeller is disposed below the output shaft, the marine vessel propulsion device may further include a gear transmission mechanism that transmits the power of the internal combustion engine to the rim. In this case, the gear transmission mechanism may include a driving gear that rotates together with the engine output transmission shaft and a driven gear to which the rotation of the driving gear is transmitted and that rotates together with the rim.

The marine vessel propulsion device may be arranged so that the pitch of the propeller (i.e., a distance advanced by one rotation of the propeller) can be changed.

In detail, the rim may include a front rim and a rear rim both of which support the blade so that an inclination angle of the blade with respect to the propeller axis changes in accordance with relative rotation around the propeller axis. In this case, either one of the front and rear rims may be rotationally driven by the internal combustion engine, and the other one may be rotationally driven by the electric motor. In this case, the internal combustion engine and the electric motor relatively rotate the front rim and the rear rim around the propeller axis, and, as a result, the propeller pitch is changed. Therefore, the internal combustion engine and the electric motor can change the characteristics of the propeller between a high torque type and a high output type.

The rim may include a front rim and a rear rim, and the electric motor may include a front electric motor that rotates the front rim and a rear electric motor that rotates the rear rim. In this case, the marine vessel propulsion device may further include a control device programmed to control a relative rotation amount of the front rim and the rear rim with respect to each other by controlling the front electric motor and the rear electric motor. According to this arrangement, the front electric motor and the rear electric motor relatively rotate the front rim and the rear rim around the propeller axis, and, as a result, the propeller pitch is changed. Therefore, the control device can adjust the characteristics of the propeller in a non-stepped manner between a high torque type and a high output type by controlling the front electric motor and the rear electric motor.

If the marine vessel propulsion device is arranged so that the propeller pitch can be changed, the marine vessel propulsion device may further include a rotation amount restricting portion that restricts a relative rotation amount of the front rim and that of the rear rim. According to this arrangement, the relative rotation amount of the front rim and that of the rear rim are restricted, and therefore the amount of change of the propeller pitch is also restricted. Therefore, the marine vessel propulsion device can change the propeller pitch within the range of the relative rotation amount of the front rim and the rear rim that is allowed by the rotation amount restricting portion.

The rotation amount restricting portion may include a supporting portion disposed at either one of the rim and the blade, and a supported portion that is disposed at the other one of the rim and the blade and that defines a long hole in which the supporting portion is inserted.

According to this arrangement, the rim and the blade are connected together by the supporting portion and the supported portion. The supporting portion is inserted in the long hole defined by the supported portion. The supporting portion and the supported portion can relatively move in a longitudinal direction of the long hole in a state in which the supported portion is supported by the supporting portion. The rim and the blade relatively move in response to the relative movement of the supporting portion with respect to the supported portion. When the supporting portion and the supported portion (i.e., an inner surface of the long hole) come into contact with each other, the relative movement of the supporting portion and that of the supported portion are restricted. Therefore, the relative movement of the rim with respect to the blade is restricted. In other words, the movement of the front rim with respect to the blade is restricted, and the movement of the rear rim with respect to the blade is restricted. In other words, in the front rim and the rear rim, the relative movement with respect to a shared member (i.e., the blade) is restricted, and, as a result, the relative rotation is restricted. Therefore, the relative rotation amounts of the front and rear rims with respect to each other are restricted.

If the marine vessel propulsion device includes the rotation amount restricting portion, the propeller may further include a front rotational shaft that extends along the propeller axis and that rotates around the propeller axis together with the front rim, and a rear rotational shaft that extends along the propeller axis and that rotates around the propeller axis together with the rear rim. In this case, the rotation amount restricting portion may include a front engagement portion and a rear engagement portion that are disposed on the front rotational shaft and on the rear rotational shaft, respectively, and that engage with each other so as to be relatively rotatable around the propeller axis within a predetermined angular range.

According to this arrangement, the front engagement portion is disposed on the front rotational shaft of the propeller, whereas the rear engagement portion is disposed on the rear rotational shaft of the propeller. Therefore, the front engagement portion rotates around the propeller axis together with the front rotational shaft, whereas the rear engagement portion rotates around the propeller axis together with the rear rotational shaft. The front engagement portion and the rear engagement portion engage with each other so as to be relatively rotatable around the propeller axis within the predetermined angular range. Therefore, when the front engagement portion and the rear engagement portion come into contact with each other, the relative rotation of the front rim and that of the rear rim with respect to each other are regulated. As a result, the relative rotation amount of the front rim and that of the rear rim with respect to each other are restricted.

The marine vessel propulsion device may further include an illuminant that emits light. The light emission state, such as brightness or lighting time, may be changed in accordance with the rotation state of the propeller. The illuminant may be disposed on either one of the duct and the propeller, or may be disposed on both of the duct and the propeller. The illuminant may be an electric lamp, or may be an LED (light emitting diode). In this case, electric power that is supplied to the illuminant may be electric power supplied from a motor power source that supplies electric power to the electric motor, or may be electric power supplied from a dedicated power supply system that supplies electric power to the illuminant.

If the marine vessel propulsion device includes the power supply system, the electric motor may include a stator defined by at least one portion of the duct and a rotor defined by at least one portion of the rim. The marine vessel propulsion device may further include a power generation coil that has at least one portion attached to the rim at a position at which the one portion faces the stator and that rotates around the propeller axis together with the rim. In other words, the power supply system may include the power generation coil. In this case, the illuminant may be connected to the power generation coil and be disposed on the propeller.

According to this arrangement, the power generation coil is attached to the rim, and the illuminant is connected to the power generation coil. At least one portion of the power generation coil faces the stator. Therefore, when the electric motor rotates the propeller (the rim), a magnetic flux passing through the power generation coil changes, and an electric current (an induced current) is generated in the power generation coil. As a result, the illuminant emits light. The electric current generated in the power generation coil changes in accordance with the rotation speed of the propeller. Additionally, when the propeller is rotated with a high torque, electric power supplied to the stator is greater than with a low torque even if the rotation speed of the propeller is the same, and therefore the electric current generated in the power generation coil is increased. Therefore, the light emission state of the illuminant changes in accordance with the rotation state of the propeller including its rotation speed and torque. A member (power generation coil) that rotates together with the propeller generates electric power in this manner, and therefore electric power can be reliably supplied to the illuminant despite that the illuminant is disposed on the propeller. In other words, there is no need to provide complex wiring that extends from a fixing portion (duct) to a rotational body (propeller).

If the marine vessel propulsion device includes the power supply system, the marine vessel propulsion device may further include a power generation coil that is attached to the rim and that rotates around the propeller axis together with the rim and a power generation magnet that is attached to the duct and that faces the power generation coil. In other words, the power supply system may include a dedicated coil and a dedicated magnet. In this case, the illuminant may be connected to the power generation coil, and may be disposed on the propeller.

According to this arrangement, the power generation coil is attached to the rim, and the power generation magnet is attached to the duct. Additionally, the power generation coil and the power generation magnet face each other. Therefore, when at least either one of the internal combustion engine and the electric motor rotates the rim and the propeller, an electric current is generated in the power generation coil, and the illuminant emits light in a light emission state corresponding to the rotation state of the propeller.

Another preferred embodiment of the present invention provides a marine vessel propulsion device including an internal combustion engine, an electric motor, a propeller that is rotationally driven around a propeller axis by at least either one of the internal combustion engine and the electric motor, and a forward/rearward switching mechanism that is disposed on a power transmission path from the internal combustion engine to the propeller and that performs switching among a forward state in which the internal combustion engine and the propeller are connected so that the propeller generates a thrust force in a forward direction, a neutral state in which a connection between the internal combustion engine and the propeller is released, and a rearward state in which the internal combustion engine and the propeller are connected so that the propeller generates a thrust force in a backward direction, wherein the electric motor is disposed closer to the propeller than to the forward/rearward switching mechanism on the power transmission path from the internal combustion engine to the propeller.

According to this arrangement, the electric motor is disposed closer to the propeller than the forward/rearward switching mechanism. In other words, the electric motor is disposed downstream of the forward/rearward switching mechanism with respect to a direction in which the power of the internal combustion engine is transmitted to the propeller. The electric motor may be disposed between the forward/rearward switching mechanism and the propeller, and may be connected to an intermediate member (e.g., an engine output transmission shaft) that rotates together with the propeller, or may be connected to the propeller. The power of the electric motor is input from a portion (intermediate member or propeller) downstream of the forward/rearward switching mechanism. Therefore, the electric motor can rotate the propeller even if the forward/rearward switching mechanism is in any one of the forward state, the neutral state, and the rearward state.

The marine vessel propulsion device may further include a shift operating member that is operable by a vessel operator in order to switch a direction of a thrust force generated by the marine vessel propulsion device between the forward direction and the backward direction, an engine speed detector that detects a rotation speed of the internal combustion engine, a propeller speed detector that detects a rotation speed of the propeller, and a control device programmed to control the forward/rearward switching mechanism.

In this case, the control device may be programmed to perform a shift-in control that switches the forward/rearward switching mechanism from the neutral state to the forward state or to the rearward state only when a speed difference that is a difference between the rotation speed of the internal combustion engine and the rotation speed of the propeller falls within a predetermined range, in response to a shift-in operation performed on the shift operating member to switch the forward/rearward switching mechanism from the neutral state to the forward state or to the rearward state. When the speed difference does not fall within the predetermined range when the shift-in operation is performed on the shift operating member, the control device may be programmed to change the speed difference so as to fall within the predetermined range by controlling at least either one of the internal combustion engine and the electric motor. The control device may be programmed to change the speed difference so as to fall within the predetermined range, and may thereafter perform the shift-in control. If the speed difference falls within the predetermined range when the shift-in control is performed, the control device may be programmed to perform the shift-in control without changing the output of the internal combustion engine and that of the electric motor.

When a reverse operation is performed on the shift operating member in order to switch the forward/rearward switching mechanism from either one of the forward state and the rearward state to the other one, the control device may be programmed to decrease the rotation speed of the propeller in a pre-reverse direction to a cut-off speed by controlling the electric motor, and may thereafter switch the forward/rearward switching mechanism from the forward state or from the rearward state to the neutral state. The control device may be programmed to switch the forward/rearward switching mechanism to the neutral state, and may thereafter rotate the propeller in a post-reverse direction opposite to the pre-reverse direction by controlling the electric motor, and may accelerate the propeller until the rotation speed of the propeller in the post-reverse direction reaches not less than a connection speed. The control device may be programmed to switch the forward/rearward switching mechanism from the neutral state to the forward state or to the rearward state in a state in which the rotation speed of the propeller in the post-reverse direction is not less than the connection speed.

When a shift-out operation is performed on the shift operating member in order to switch the forward/rearward switching mechanism from the forward state or from the rearward state to the neutral state, the control device may be programmed to decrease the rotation speed of the propeller in a pre-shift-out direction to a cut-off speed by controlling the electric motor, and may thereafter switch the forward/rearward switching mechanism from the forward state or from the rearward state to the neutral state.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 13B is a view for describing a relationship among a lever-position change rate, a residual amount of a battery, and a range of each mode.

FIG. 14A is a flowchart when a shift-in operation is performed.

DETAILED DESCRIPTION OF THE PREFERRED EMBODIMENTS

Propellers according to the following preferred embodiments are preferably rotatable in a normal rotation direction and in a reverse rotation direction. The normal rotation direction may be a clockwise direction (i.e., right-handed rotation direction) when the propeller is seen from behind, or may be a counterclockwise direction (i.e., left-handed rotation direction) when the propeller is seen from behind. Hereinafter, the clockwise direction of the propeller seen from behind is defined as the normal rotation direction of the propeller, and the counterclockwise direction of the propeller seen from behind is defined as the reverse rotation direction of the propeller.

Figure 1A:
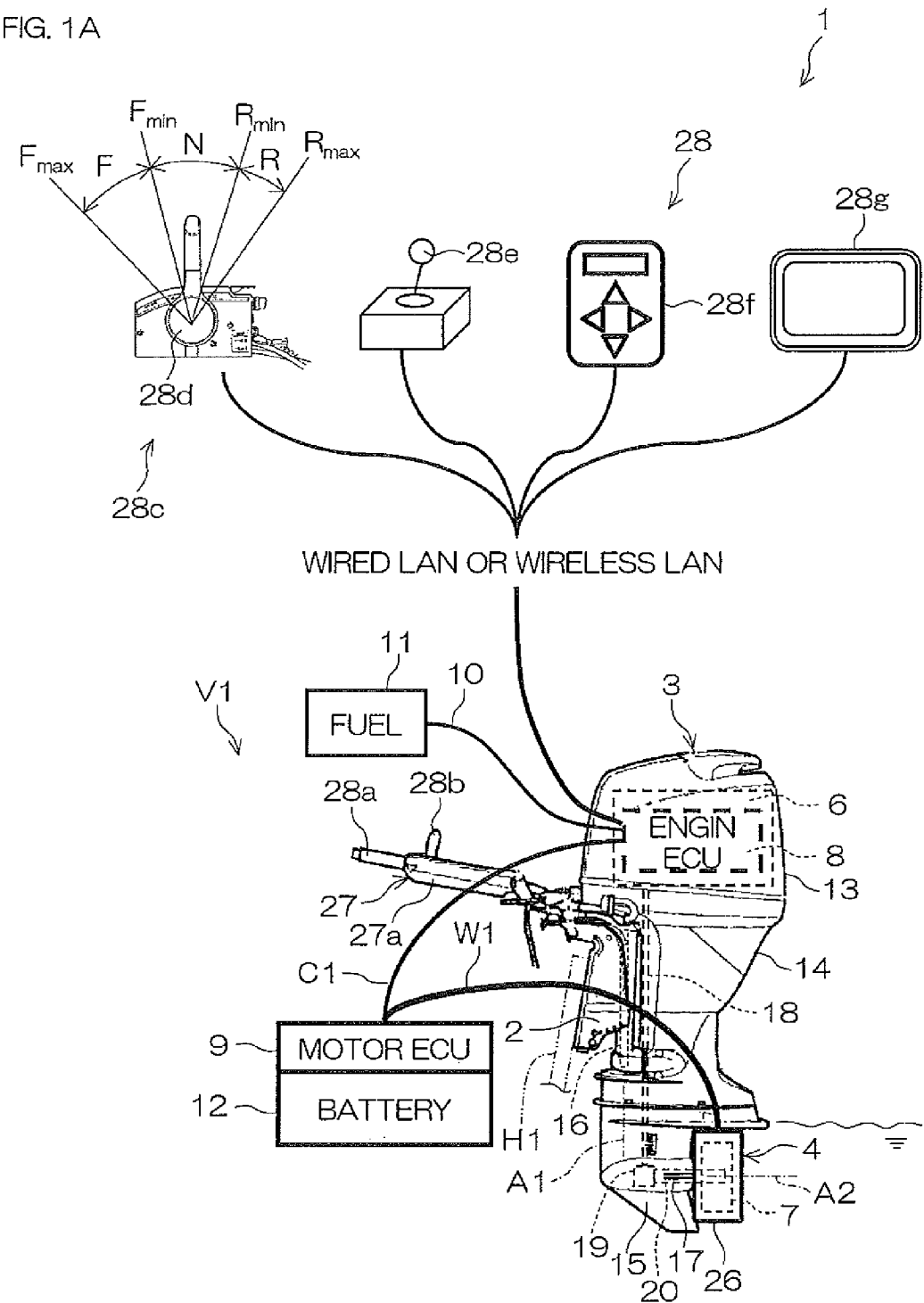
FIG. 1A is a side view of a marine vessel propulsion device according to a first preferred embodiment of the present invention.
Figure 1B:
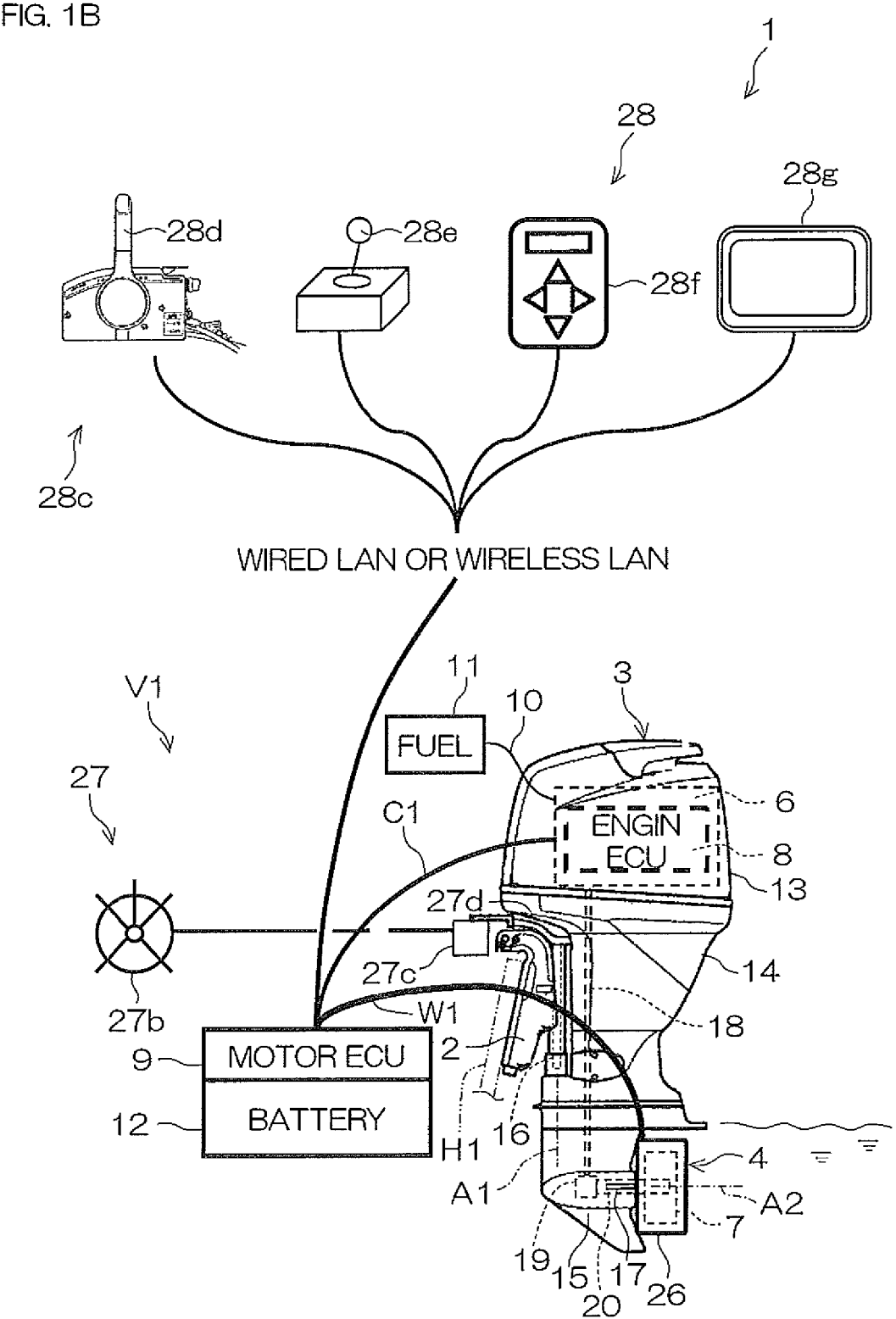
FIG. 1B is a side view of the marine vessel propulsion device according to the first preferred embodiment of the present invention.
Figure 2:
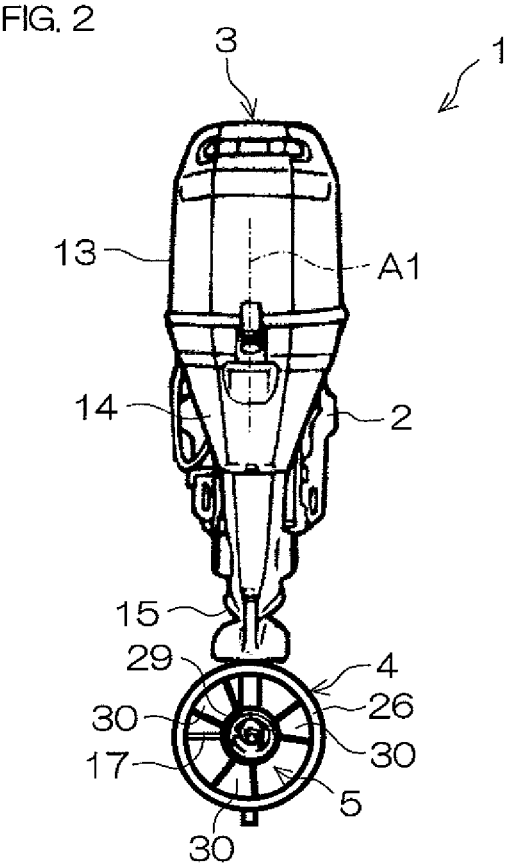
FIG. 2 is a rear view of the marine vessel propulsion device according to the first preferred embodiment of the present invention.
Figure 3:
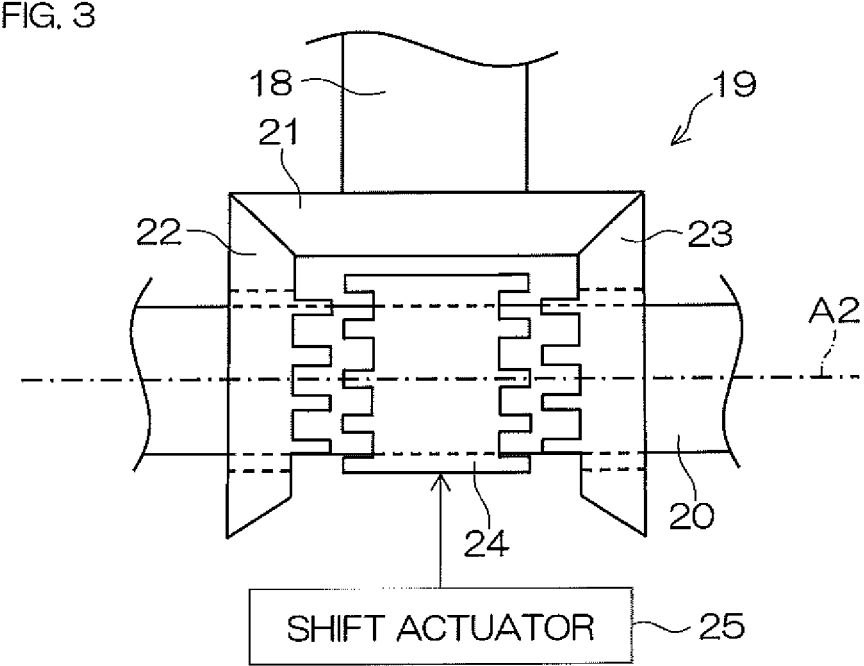
FIG. 3 is a schematic view of a forward/rearward switching mechanism according to the first preferred embodiment of the present invention.

FIG. 1A and FIG. 1B are side views of a marine vessel propulsion device 1 according to a first preferred embodiment of the present invention. FIG. 2 is a rear view of the marine vessel propulsion device 1 according to the first preferred embodiment of the present invention. FIG. 3 is a schematic view of a forward/rearward switching mechanism 19 according to the first preferred embodiment of the present invention.

As shown in FIG. 1A and FIG. 1B, the marine vessel propulsion device 1 includes a bracket 2 that is attachable to the stern of a marine vessel V1, an outboard motor 3 that is attached to the stern through the bracket 2, and a propulsion unit 4 attached to the outboard motor 3. As shown in FIG. 2, the marine vessel propulsion device 1 additionally includes a propeller 5 held by the propulsion unit 4. The marine vessel propulsion device 1 is preferably a hybrid type marine vessel propulsion device. In more detail, as shown in FIG. 1A and FIG. 1B, the marine vessel propulsion device 1 additionally includes an engine 6 and an electric motor 7 that are used to rotate the propeller 5 around a propeller axis A2 extending in a front-rear direction, an engine ECU (Electronic Control Unit) 8 programmed to control the engine 6, and a motor ECU 9 programmed to control the electric motor 7.

As shown in FIG. 1A and FIG. 1B, the engine 6 is arranged in the outboard motor 3, and the electric motor 7 is preferably arranged in the propulsion unit 4. The engine 6 is preferably an internal combustion engine including a crankshaft that is rotatable around a crankshaft axis extending in an up-down direction. The engine 6 is connected to a fuel tank 11 disposed on the vessel through a fuel supply hose 10. The electric motor 7 is connected to the motor ECU 9 through an electric wire W1. The engine ECU 8 and the motor ECU 9 are connected to a battery 12 disposed on the vessel. The electric power of the battery 12 is supplied to the electric motor 7 through the motor ECU 9. The motor ECU 9 is connected to the engine ECU 8 preferably via a LAN (local area network) cable C1. The engine ECU 8 and the motor ECU 9 communicate with each other through the LAN cable C1.

As shown in FIG. 1A and FIG. 1B, the engine ECU 8 is arranged in the outboard motor 3, and the motor ECU 9 is arranged on the vessel. The motor ECU 9 may be arranged in the outboard motor 3 or in the propulsion unit 4. If the motor ECU 9 is arranged in the outboard motor 3, the motor ECU 9 may be cooled by cooling water that cools the engine 6. In this case, preferably, a cooling water passage is arranged so that the cooling water cools the motor ECU 9 before cooling the engine 6. According to this arrangement, the motor ECU 9 is cooled by low-temperature cooling water that has not yet been warmed by the engine 6. Therefore, the temperature of the motor ECU 9 can be sufficiently lowered.

As shown in FIG. 1A and FIG. 1B, the outboard motor 3 is disposed behind a hull H1. The outboard motor 3 includes the engine 6 and the engine ECU 8 both of which have been described above, an engine cover 13 with which the engine 6 and the engine ECU 8 are covered, an upper case 14 that extends downwardly from the engine cover 13, and a lower case 15 that extends downwardly from the upper case 14. The outboard motor 3 additionally includes a vertical or substantially vertical steering shaft 16 that extends in the up-down direction. The outboard motor 3 is connected to the bracket 2 rotatably around a vertical or substantially vertical steering axis A1 (i.e., central axis of the steering shaft 16). Therefore, the outboard motor 3 is rotatable right and left around the steering axis A1 with respect to the hull H1. The propulsion unit 4 is preferably disposed behind the lower case 15. The propulsion unit 4 is preferably connected to the lower case 15 through a stay 17. The propulsion unit 4 rotates around the steering axis A1 together with the outboard motor 3. Therefore, when the outboard motor 3 rotates rightward and leftward around the steering axis A1, the propeller 5 also rotates rightward and leftward around the steering axis A1.

As shown in FIG. 1A and FIG. 1B, the outboard motor 3 additionally includes a drive shaft 18 connected to the engine 6, a forward/rearward switching mechanism 19 connected to the drive shaft 18, and an engine output transmission shaft 20 connected to the forward/rearward switching mechanism 19. The drive shaft 18 extends in a vertical or substantially vertical direction. The drive shaft 18 is rotationally driven by the engine 6 around a central axis of the drive shaft 18. The drive shaft 18 is connected to the engine output transmission shaft 20 by the forward/rearward switching mechanism 19. The engine output transmission shaft 20 extends in the front-rear direction. The propeller 5 is connected to the rear end of the engine output transmission shaft 20. The propeller 5 rotates together with the engine output transmission shaft 20. The rotation of the engine 6 is transmitted to the propeller 5 through the drive shaft 18, the forward/rearward switching mechanism 19, and the engine output transmission shaft 20. The forward/rearward switching mechanism 19 performs switching among a forward state in which the engine output transmission shaft 20 rotates in the normal rotation direction, a rearward state in which the engine output transmission shaft 20 rotates in the reverse rotation direction, and a neutral state in which a connection between the drive shaft 18 and the engine output transmission shaft 20 is released. Therefore, the rotation state of the propeller 5 changes in accordance with the state of the forward/rearward switching mechanism 19.

As shown in FIG. 3, the forward/rearward switching mechanism 19 includes a pinion 21 connected to the drive shaft 18, a front gear 22 and a rear gear 23 both of which are engaged with the pinion 21, and a dog clutch 24 that is selectively engaged with either the front gear 22 or the rear gear 23. The forward/rearward switching mechanism 19 is preferably an electric type forward/rearward switching mechanism. In other words, the forward/rearward switching mechanism 19 additionally includes a shift actuator 25 that moves the dog clutch 24. The shift actuator 25 and the dog clutch 24 are connected together through a shift rod (not shown). The engine ECU 8 controls the forward/rearward switching mechanism 19 to selectively perform switching to any one of the forward state, the rearward state, and the neutral state by causing the shift actuator 25 to move the dog clutch 24 that serves as an output shaft of the forward/rearward switching mechanism 19.

As shown in FIG. 3, the pinion 21, the front gear 22, and the rear gear 23 are preferably all bevel gears. The front gear 22 and the rear gear 23 are disposed within a space therebetween in the front-rear direction. The dog clutch 24 is disposed between the front gear 22 and the rear gear 23. The engine output transmission shaft 20 penetrates through the front gear 22, the rear gear 23, and the dog clutch 24 in the front-rear direction. The front gear 22 and the rear gear 23 are rotatable around the central axis of the engine output transmission shaft 20 with respect to the engine output transmission shaft 20. The front gear 22 and the rear gear 23 are rotatably held by the lower case 15. On the other hand, the dog clutch 24 is connected to the engine output transmission shaft 20 by a spline. Therefore, the engine output transmission shaft 20 and the dog clutch 24 are relatively movable in the axial direction, and are rotatable around the central axis of the engine output transmission shaft 20. The dog clutch 24 and the engine output transmission shaft 20 are disposed coaxially.

The dog clutch 24 is movable with respect to the engine output transmission shaft 20 between a forward position at which the dog clutch 24 is engaged with the front gear 22 and a rearward position at which the dog clutch 24 is engaged with the rear gear 23. The position (i.e., the position shown in FIG. 3) between the forward position and the rearward position is a neutral position at which the dog clutch 24 is spaced apart from both the front gear 22 and the rear gear 23. The engine ECU 8 causes the dog clutch 24 to move to any shift position of the forward position, the rearward position, and the neutral position by controlling the shift actuator 25. The forward position, the rearward position, and the neutral position correspond to the forward state, the rearward state, and the neutral state, respectively. In other words, the forward/rearward switching mechanism 19 performs switching to the forward state when the shift actuator 25 moves the dog clutch 24 to the forward position.

The drive shaft 18 is driven by the engine 6 in a constant rotation direction. The pinion 21 rotates together with the drive shaft 18 around the central axis of the drive shaft 18. The front gear 22 and the rear gear 23 rotate in mutually opposite directions in response to the rotation of the pinion 21. The rotation of the front gear 22 is transmitted to the engine output transmission shaft 20 through the dog clutch 24 in a state in which the dog clutch 24 is disposed at the forward position and in which the front gear 22 is rotating. As a result, the engine output transmission shaft 20 rotates in the normal rotation direction. Additionally, the rotation of the rear gear 23 is transmitted to the engine output transmission shaft 20 through the dog clutch 24 in a state in which the dog clutch 24 is disposed at the rearward position and in which the rear gear 23 is rotating. As a result, the engine output transmission shaft 20 rotates in the reverse rotation direction. Additionally, the rotation of the drive shaft 18 is not transmitted to the engine output transmission shaft 20, and the drive shaft 18 runs idle in a state in which the dog clutch 24 is disposed at the neutral position.

On the other hand, as shown in FIG. 1A and FIG. 1B, the propulsion unit 4 includes the propeller 5 and the electric motor 7 both of which have been described above and a duct 26 that surrounds the propeller 5 around the propeller axis A2. The duct 26 includes a cylindrical shape extending in the front-rear direction. The duct 26 is connected to the lower case 15 through the stay 17. The propeller 5 and the electric motor 7 are held by the duct 26. The propeller 5 is rotatable in the normal rotation direction and in the reverse rotation direction in the duct 26. The engine ECU 8 and the motor ECU 9 cause the propeller 5 to rotate in the normal rotation direction and in the reverse rotation direction by at least one of the engine 6 and the electric motor 7. When the propeller 5 rotates in the normal rotation direction, water is sucked from the front into the duct 26, and the water sucked thereinto is discharged rearwardly from the duct 26. As a result, a thrust force in the forward direction is generated. Contrary to this, when the propeller 5 rotates in the reverse rotation direction, water is sucked from the rear into the duct 26, and the water sucked thereinto is discharged forwardly from the duct 26. As a result, a thrust force in the backward direction is generated.

The marine vessel propulsion device 1 additionally includes a steering device 27 that steers the marine vessel V1. As shown in FIG. 1A, the steering device 27 may include a tiller handle 27a that is arranged to be operated by a vessel operator. As shown in FIG. 1B, the steering device 27 may additionally include a steering member 27b that is operable by the vessel operator and a steering unit 27c that rotates the outboard motor 3 right-handedly and left-handedly around the steering axis A1 in accordance with the operation of the steering member 27b. The tiller handle 27a is connected to the steering shaft 16. The steering shaft 16 rotates around the steering axis A1 together with the tiller handle 27a. On the other hand, as shown in FIG. 1B, the steering unit 27c is connected to a steering arm 27d that rotates around the steering axis A1 together with the steering shaft 16. The steering unit 27c rotates the steering arm 27d right-handedly and left-handedly around the steering axis A1. The steering member 27b may be mechanically connected to the steering unit 27c by a push-pull cable, or may be electrically connected to the steering unit 27c.

The marine vessel propulsion device 1 additionally includes an output adjusting device 28 that performs the output adjustment of the marine vessel propulsion device 1 and that performs switching between directions of a thrust force. As shown in FIG. 1A, the output adjusting device 28 may include a throttle grip 28a and a shift lever 28b both of which are disposed on the tiller handle 27a. The throttle grip 28a is rotatably arranged around the central axis of the tiller handle 27a, and the shift lever 28b is arranged tiltably back and forth centering on its lower end. The throttle grip 28a and the shift lever 28b are operable by the vessel operator. The engine ECU 8 and the motor ECU 9 adjust the output of the marine vessel propulsion device 1 in accordance with the position of the throttle grip 28a. Additionally, the engine ECU 8 and the motor ECU 9 switch the state of the forward/rearward switching mechanism 19 in accordance with the position of the shift lever 28b. For example, when the shift lever 28b is tilted back and forth, the engine ECU 8 and the motor ECU 9 cause the forward/rearward switching mechanism 19 to perform switching to a forward state or to a rearward state.

As shown in FIG. 1A and FIG. 1B, the output adjusting device 28 may include a remote control unit 28c that functions as the throttle grip 28a and as the shift lever 28b. The remote control unit 28c may be electrically connected to either the engine ECU 8 or the motor ECU 9, or may be electrically connected to both the engine ECU 8 and the motor ECU 9. A command issued by the remote control unit 28c is sent to the steering unit 27c preferably via a wired communication or wireless communication.

As shown in FIG. 1A and FIG. 1B, the remote control unit 28c may include a control lever 28d tiltable back and forth, or may include a joystick 28e tiltable back, forth, left and right. Additionally, the remote control unit 28c may include a wireless remote control 28f including four buttons, for example, or may include a touch panel 28g that communicates with at least one of the engine ECU 8 and the motor ECU 9 through a data communication network such as the Internet, for example. Of course, the output adjusting device 28 may include devices other than the above-described devices. In other words, the arrangement of the output adjusting device 28 is not limited to the above-described one.

A description will be hereinafter given of a case in which the output adjusting device 28 includes the remote control unit 28c and in which the remote control unit 28c includes the control lever 28d. As shown in FIG. 1A, the control lever 28d is movable back and forth between a forward output maximum position Fmax at which the lever is tilted most forwardly and a rearward output maximum position Rmax at which the lever is tilted most rearwardly. The output in the forward direction is the maximum at the forward output maximum position Fmax, whereas the output in the rearward direction (i.e., backward direction) is the maximum at the rearward output maximum position Rmax. A forward output minimum position Fmin and a rearward output minimum position Rmin are disposed between the forward output maximum position Fmax and the rearward output maximum position Rmax. The forward output minimum position Fmin is a position (zero position) at which the output in the forward direction is the minimum, whereas the rearward output minimum position Rmin is a position (zero position) at which the output in the rearward direction is the minimum.

As shown in FIG. 1A, the forward output minimum position Fmin is a position closer to the forward output maximum position Fmax than to the rearward output minimum position Rmin. A range between the forward output maximum position Fmax and the forward output minimum position Fmin is a forward position (forward range) at which the forward/rearward switching mechanism 19 is maintained in a forward state, whereas a range between the rearward output maximum position Rmax and the rearward output minimum position Rmin is a rearward position (reverse range) at which the forward/rearward switching mechanism 19 is maintained in a rearward state. A range between the forward output minimum position Fmin and the rearward output minimum position Rmin is a neutral position at which the forward/rearward switching mechanism 19 is maintained in a neutral state.

The present position of the control lever 28d is output from the remote control unit 28c to the engine ECU 8 and to the motor ECU 9. For example, when the vessel operator moves the control lever 28d from the neutral position to the forward position, the engine ECU 8 causes the forward/rearward switching mechanism 19 to perform switching from the neutral state to the forward state. Thereafter, the engine ECU 8 and the motor ECU 9 cause the marine vessel propulsion device 1 to generate an output having an amount that is corresponding to the operational amount of the control lever 28d from the forward output minimum position Fmin, so that the marine vessel V1 is advanced.

Figure 4:
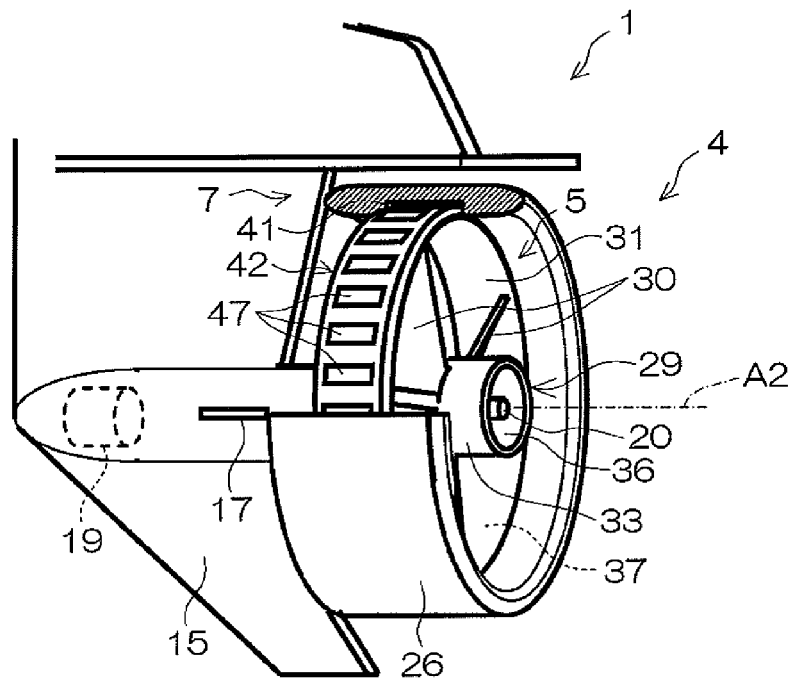
FIG. 4 is a partially sectional view of a lower portion of the marine vessel propulsion device according to the first preferred embodiment of the present invention.
Figure 5:
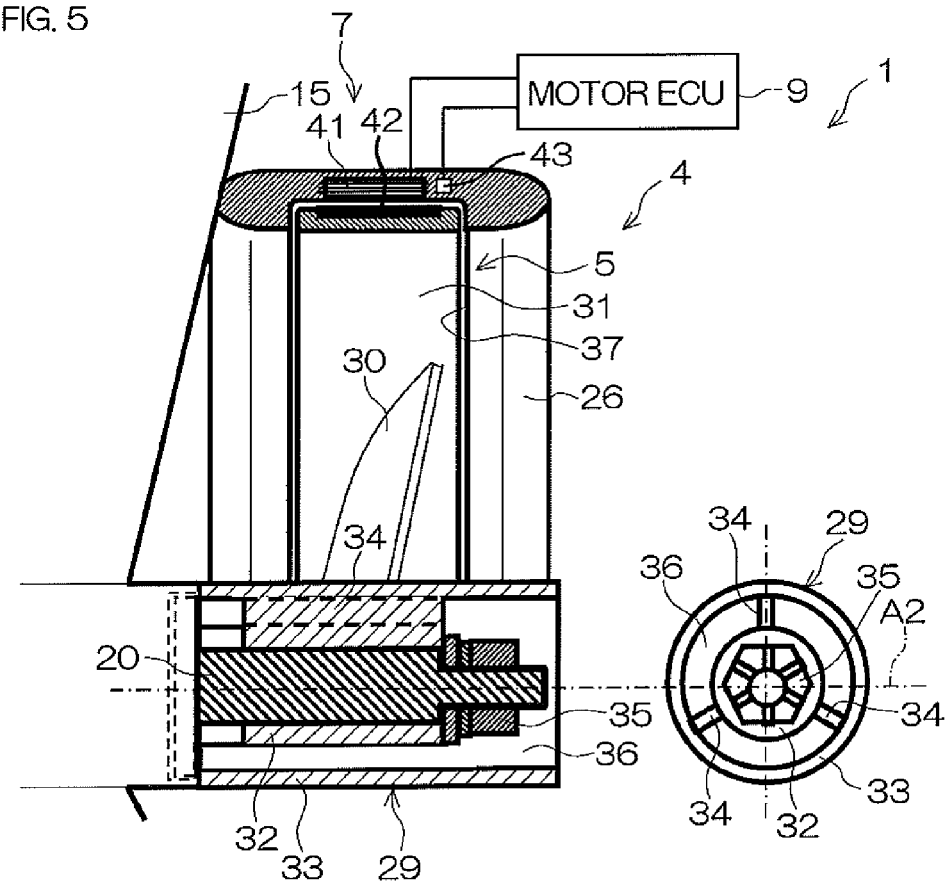
FIG. 5 is a sectional view of the lower portion of the marine vessel propulsion device according to the first preferred embodiment of the present invention.
Figure 6:
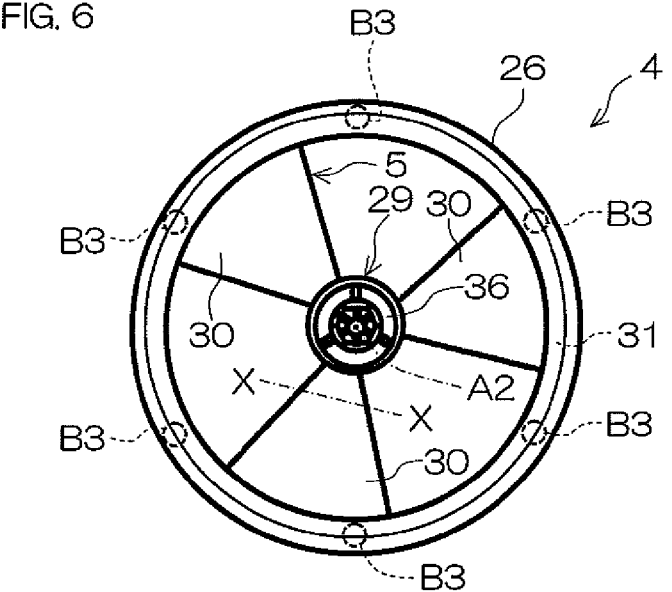
FIG. 6 is a rear view of a propulsion unit according to the first preferred embodiment of the present invention.
Figure 7A:
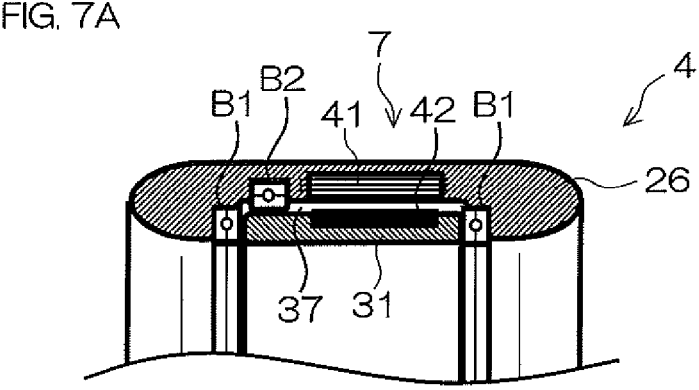
FIG. 7A is a sectional view of an outer peripheral portion of the propulsion unit according to the first preferred embodiment of the present invention.
Figure 7B:
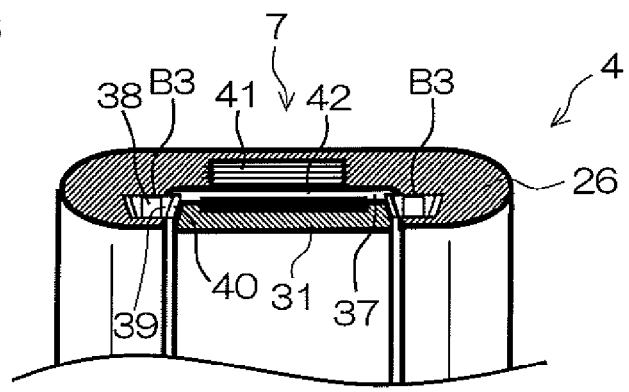
FIG. 7B is a sectional view of an outer peripheral portion of the propulsion unit according to the first preferred embodiment of the present invention.

FIG. 4 is a partial sectional view of a lower portion of the marine vessel propulsion device 1. FIG. 5 is a sectional view of a lower portion of the marine vessel propulsion device 1. FIG. 6 is a rear view of the propulsion unit 4. FIG. 7A and FIG. 7B are sectional views showing an outer peripheral portion of the propulsion unit 4.

As shown in FIG. 4, the duct 26 is connected to the lower case 15 such that the duct 26 extends in the front-rear direction. The propeller 5 and the duct 26 are disposed coaxially. The propeller 5 includes a cylindrical rotational shaft 29 that extends along the propeller axis A2, a plurality of blades 30 disposed around the rotational shaft 29, and a cylindrical rim 31 that surrounds the blades 30.

As shown in FIG. 5, the rotational shaft 29 includes a cylindrical inner shaft portion 32 that extends along the propeller axis A2, an outer shaft portion 33 that surrounds the inner shaft portion 32 around the propeller axis A2, and a plurality of connection portions 34 by which the inner shaft portion 32 and the outer shaft portion 33 are connected together. The rear end of the engine output transmission shaft 20 protrudes rearwardly from the lower case 15. The rear end of the engine output transmission shaft 20 penetrates through the inner shaft portion 32. The inner shaft portion 32 is connected to the rear end of the engine output transmission shaft 20 by a bolt 35, for example. Therefore, the rotational shaft 29 rotates around the propeller axis A2 together with the engine output transmission shaft 20. The connection portions 34 are disposed between the inner shaft portion 32 and the outer shaft portion 33. The connection portions 34 are spaced apart in the circumferential direction of the propeller 5. An exhaust passage 36 defined between the inner shaft portion 32 and the outer shaft portion 33 communicates with the lower case 15. Exhaust gas generated by the engine 6 flows into the exhaust passage 36 from the front. Thereafter, the exhaust gas that has flowed into the exhaust passage 36 is discharged rearwardly from the exhaust passage 36. As a result, the exhaust gas generated by the engine 6 is discharged into the water.

As shown in FIG. 6, the blades 30 are spaced apart in the circumferential direction of the propeller 5. Each blade 30 preferably has a generally triangular shape that extends from an inner peripheral surface of the rim 31 toward the propeller axis A2. The blades 30 may be a flat plate, or may be a curved plate including a curved portion. The outer ends (i.e., ends on the side of the rim 31) of the blades 30 are fixed to the rim 31, whereas inner ends (i.e., ends on the side opposite to the rim 31) of the blades 30 are fixed to the rotational shaft 29. Therefore, the rotational shaft 29, the blades 30, and the rim 31 are rotatable together around the propeller axis A2. Therefore, when the engine output transmission shaft 20 rotates around the propeller axis A2, the rotational shaft 29, the blades 30, and the rim 31 rotate around the propeller axis A2 together with the engine output transmission shaft 20.

As shown in FIG. 5, the rim 31 surrounds the propeller axis A2 inside the duct 26. The rim 31 is contained in an annular groove 37 provided in the inner peripheral portion of the duct 26. The annular groove 37 is more hollow than the inner peripheral surface of the duct 26, and is continuous over its whole circumference. The central axis of the rim 31 and that of the duct 26 are disposed on the propeller axis A2. The rim 31 is rotatable around the propeller axis A2 with respect to the duct 26 in a state of being contained in the annular groove 37. Therefore, the propeller 5 is rotatable around the propeller axis A2 with respect to the duct 26.

The rim 31 may not be held by the duct 26, or may be held by the duct 26 with a plurality of bearings therebetween. For example, as shown in FIG. 7A, the rim 31 may be supported by the duct 26 with two thrust bearings B1 and a radial bearing B2 therebetween. Alternatively, as shown in FIG. 7B, the rim 31 may be supported by the duct 26 with a plurality of tapered roller bearings B3 therebetween. The thrust bearing B1 and the radial bearing B2 may be ball bearings, or may be roller bearings, or may be different types of bearings.

As shown in FIG. 7A, one of the thrust bearings B1 is disposed between a front end surface of the rim 31 and the duct 26, and the other thrust bearing B1 is disposed between a rear end surface of the rim 31 and the duct 26. The radial bearing B2 is disposed between an outer peripheral surface of the rim 31 and the duct 26. The two thrust bearings B1 support the rim 31 rotatably around the propeller axis A2, and restrict an amount of movement of the rim 31 in the axial direction (i.e., A direction along the propeller axis A2). The radial bearing B2 supports the rim 31 rotatably around the propeller axis A2, and restricts an amount of movement of the rim 31 in the radial direction. Therefore, the movement amount of the propeller 5 in the axial direction and that of the propeller 5 in the radial direction are restricted by the thrust bearings B1 and the radial bearing B2.

As shown in FIG. 7B, the tapered roller bearings B3 are preferably arranged as a plurality of pairs. As is understood from a combination of FIG. 6 and FIG. 7B, the tapered roller bearings B3 serving as a pair are spaced apart back and forth so as to coincide with each other when seen from the front-rear direction. The front tapered roller bearing B3 is disposed between the front end surface of rim 31 and the duct 26, whereas the rear tapered roller bearing B3 is disposed between the rear end surface of the rim 31 and the duct 26. The pairs of tapered roller bearings B3 are spaced apart in the circumferential direction.

As shown in FIG. 7B, the tapered roller bearing B3 includes a support shaft 38 held by the duct 26, an inner ring 39 that surrounds the support shaft 38, and a plurality of rollers 40 disposed around the inner ring 39. The rollers 40 are held by an annular retainer (not shown). Each roller 40 is rotatable around the inner ring 39 while rotating around its central axis (while turning on its own central axis). Each roller 40 is in contact with the front end surface or the rear end surface of the rim 31. The tapered roller bearings B3 support the rim 31 so as to be rotatable around the propeller axis A2, and restrict the amount of movement of the rim 31 in the axial direction and that of movement of the rim 31 in the radial direction. Therefore, the amount of movement of the propeller 5 in the axial direction and that of movement of the propeller 5 in the radial direction are restricted by the tapered roller bearings B3.

Figure 8A:
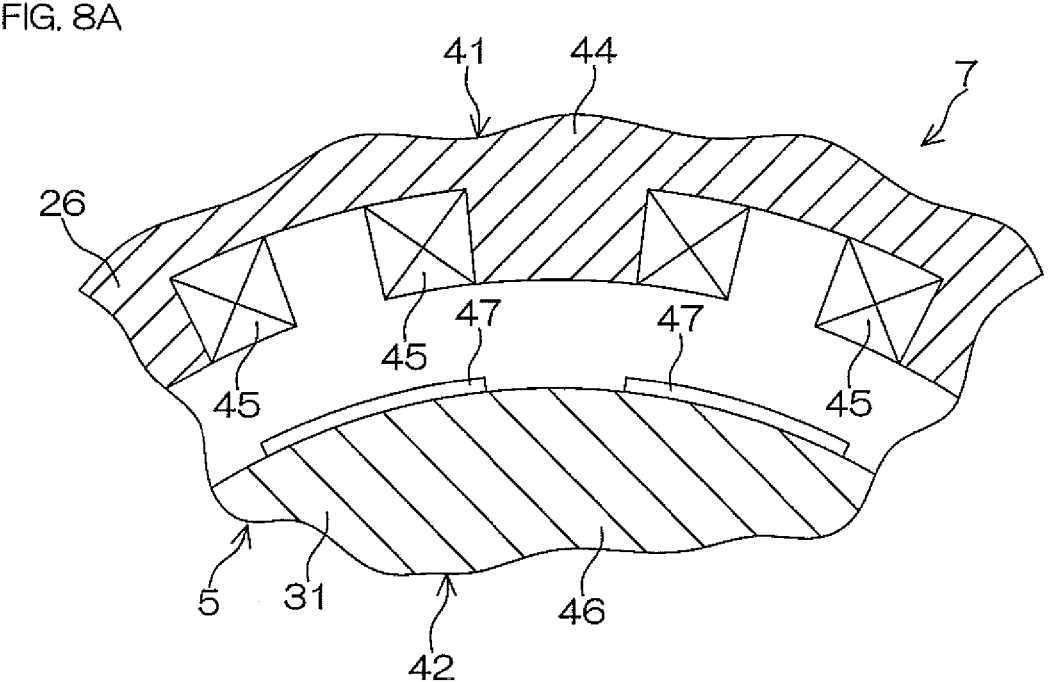
FIG. 8A is a sectional view of a portion of an electric motor according to the first preferred embodiment of the present invention.
Figure 8B:
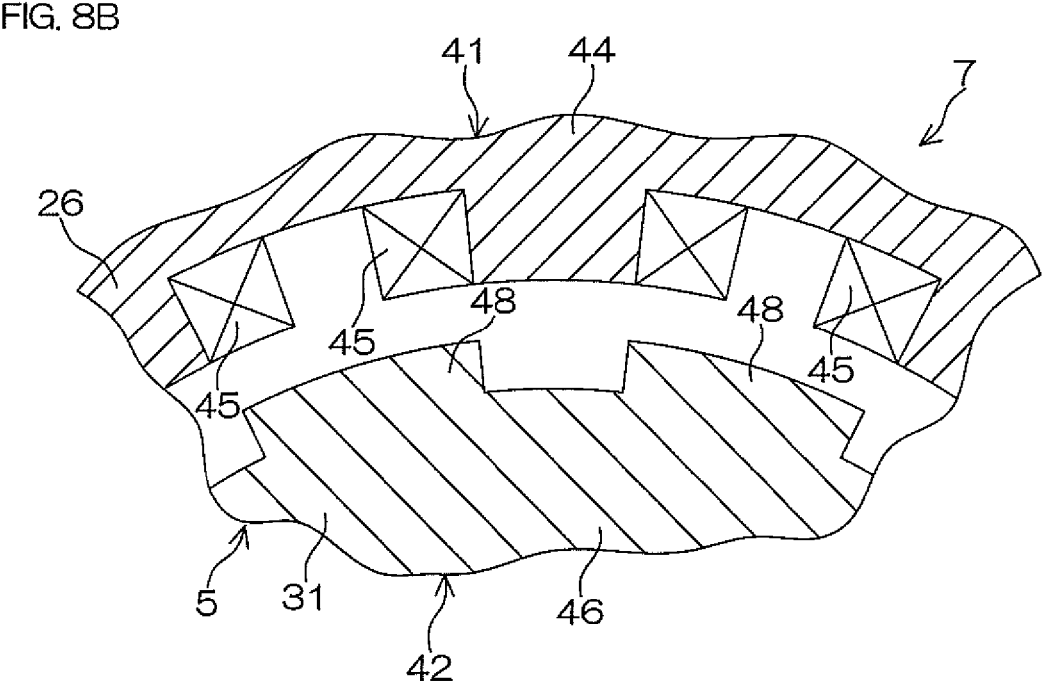
FIG. 8B is a sectional view of a portion of the electric motor according to the first preferred embodiment of the present invention.

FIG. 8A and FIG. 8B are sectional views showing a portion of the electric motor 7. In the following description, reference is made to FIG. 5, FIG. 8A, and FIG. 8B.

As shown in FIG. 5, the propulsion unit 4 includes a propeller speed detector 43 that detects the rotation speed of the propeller 5. The propeller speed detector 43 is disposed in the duct 26. The rotation angle of the electric motor 7 (i.e., the rotation angle of a rotor 42) is detected by the propeller speed detector 43. The electric motor 7 includes an annular stator 41 defined by a portion of the duct 26 and the cylindrical rotor 42 defined by a portion of the rim 31. In other words, the duct 26 includes the stator 41 disposed between the outer peripheral surface of the duct 26 and a bottom surface of the annular groove 37, and the rim 31 includes the rotor 42 disposed on an outer peripheral portion of the rim 31. The stator 41 and the rotor 42 surround the propeller axis A2. The stator 41 and the rotor 42 face each other in the radial direction of the propeller 5 with a space between the stator 41 and the rotor 42. As shown in FIG. 8A and FIG. 8B, the stator 41 includes an annular stator core 44 preferably made of a soft magnetic material, such as a magnetic steel sheet, and a plurality of coils 45 that are wound onto the stator core 44.

As shown in FIG. 8A, the rotor 42 may be a permanent-magnet rotor that includes a cylindrical rotor core 46 preferably made of a soft magnetic material and a plurality of magnets 47 held by the rotor core 46. In other words, the electric motor 7 may be a permanent-magnet type direct-current motor. Alternatively, as shown in FIG. 8B, the rotor 42 may be a cylindrical salient poled rotor that includes a plurality of salient poles 48 spaced apart in the circumferential direction of the propeller 5 and that is preferably made of a soft magnetic material. In other words, the electric motor 7 may be a switched reluctance motor. Without being limited to these types of motors, the electric motor 7 may be a direct-current motor provided with a brush, or may be a brushless motor, or may be another type of motor.

As shown in FIG. 8A, the coils 45 are arranged in the circumferential direction of the propeller 5. The coils 45 define an annular row that surrounds the propeller axis A2. Likewise, the magnets 47 are arranged in the circumferential direction of the propeller 5, and define an annular row that surrounds the propeller axis A2. The coils 45 may surround the propeller axis A2, and may define a plurality of annular rows arranged in the axial direction of the propeller 5. Likewise, the magnets 47 may surround the propeller axis A2, and may define a plurality of annular rows arranged in the axial direction of the propeller 5. For example, two annular rows arranged in the axial direction of the propeller 5 may be defined by the coils 45, the number of windings of which is reduced to half thereof. According to this arrangement, it is possible to reduce the thickness of the electric motor 7 in the radial direction while minimizing a change in the maximum output of the electric motor 7.

The electric motor 7 rotates the rim 31 around the propeller axis A2 with respect to the duct 26 by causing the stator 41 to rotate the rotor 42 around the propeller axis A2. As a result, the blades 30 rotate around the propeller axis A2 with respect to the duct 26. The electric motor 7 can perform normal rotation and reverse rotation. When the electric motor 7 rotates the rotor 42 in the normal rotation direction, the propeller 5 also rotates in the normal rotation direction, and a thrust force in the forward direction is generated. On the contrary, when the electric motor 7 rotates the rotor 42 in the reverse rotation direction, the propeller 5 also rotates in the reverse rotation direction, and a thrust force in the backward direction (i.e., in the rearward direction) is generated. Based on an output command that has been input from the output adjusting device 28 (see FIG. 1A), the motor ECU 9 controls the power supply to the stator 41. In other words, based on an output of the propeller speed detector 43, the motor ECU 9 controls the power supply to the stator 41, and hence controls the rotation direction and the rotation speed of the rotor 42.

Figure 9A:
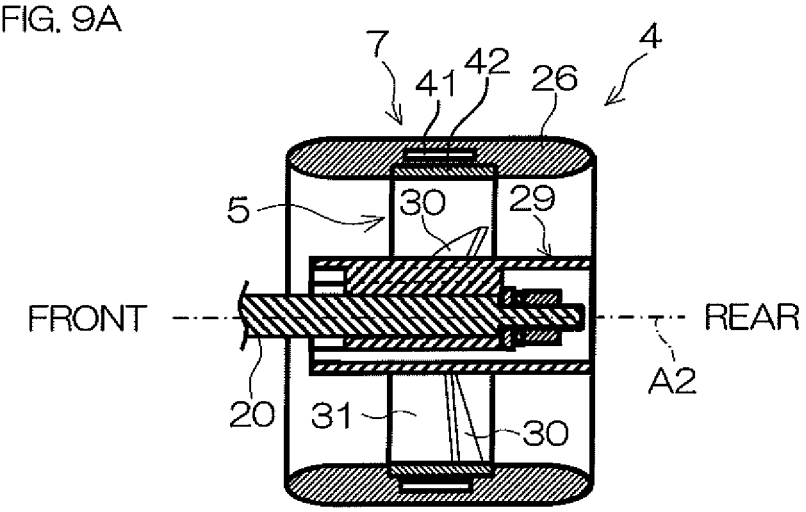
FIG. 9A is a sectional view of a propulsion unit according to the first preferred embodiment of the present invention.
Figure 9B:
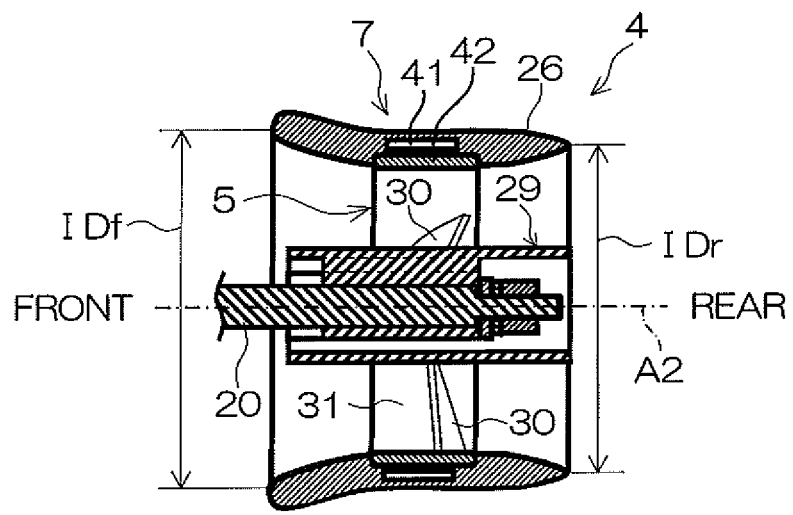
FIG. 9B is a sectional view of a propulsion unit according to the first preferred embodiment of the present invention.
Figure 10A:
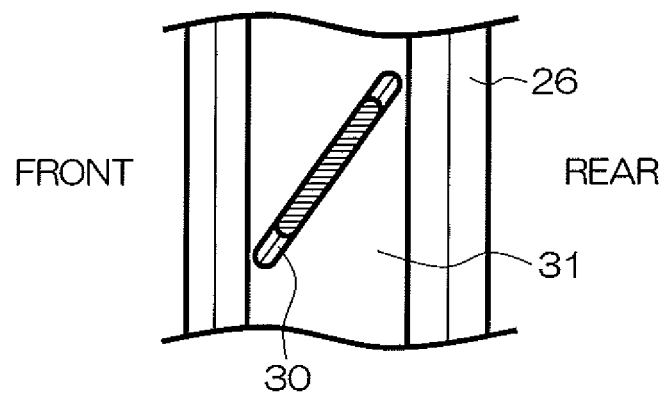
FIG. 10A is a sectional view of a blade taken along line X-X in FIG. 6.
Figure 10B:
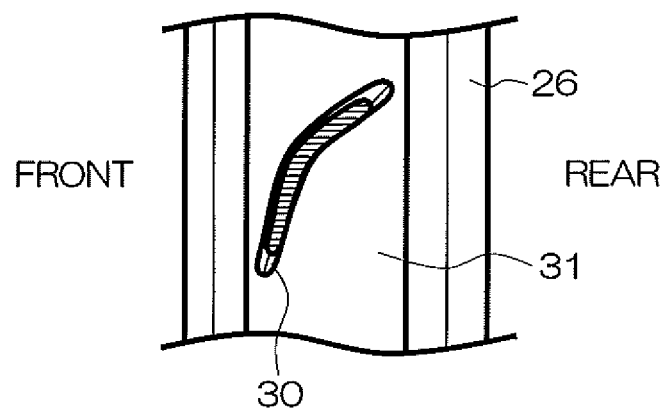
FIG. 10B is a sectional view of a blade taken along line X-X in FIG. 6.

FIG. 9A and FIG. 9B are sectional views showing the propulsion unit 4. FIG. 10A and FIG. 10B are sectional views showing the blade 30 taken along line X-X in FIG. 6.

As shown in FIG. 9A, the inner diameter of the front end of the duct 26 may be equal to the inner diameter of the rear end of the duct 26. In this case, as shown in FIG. 10A, the cross section of the blade 30 may be linear. According to this arrangement, if the rotation speed of the propeller 5 is the same, the propulsion unit 4 can generate a thrust force in the backward direction that is substantially the same in strength as a thrust force in the forward direction.

On the other hand, as shown in FIG. 9B, the inner diameter IDf of the front end of the duct 26 may be greater than the inner diameter IDr of the rear end of the duct 26. In this case, as shown in FIG. 10B, the cross section of the blade 30 may include a circular-arc shape that is forwardly convex. According to this arrangement, the flow passage area of the rear end of the duct 26 is smaller than the flow passage area of the front end of the duct 26, and therefore a water stream that flows through the duct 26 from the front toward the rear is accelerated by the duct 26. As a result, a greater thrust force in the forward direction is generated. Additionally, propulsive efficiency is improved because the cross section of the blade 30 includes a circular-arc shape.

Figure 11:
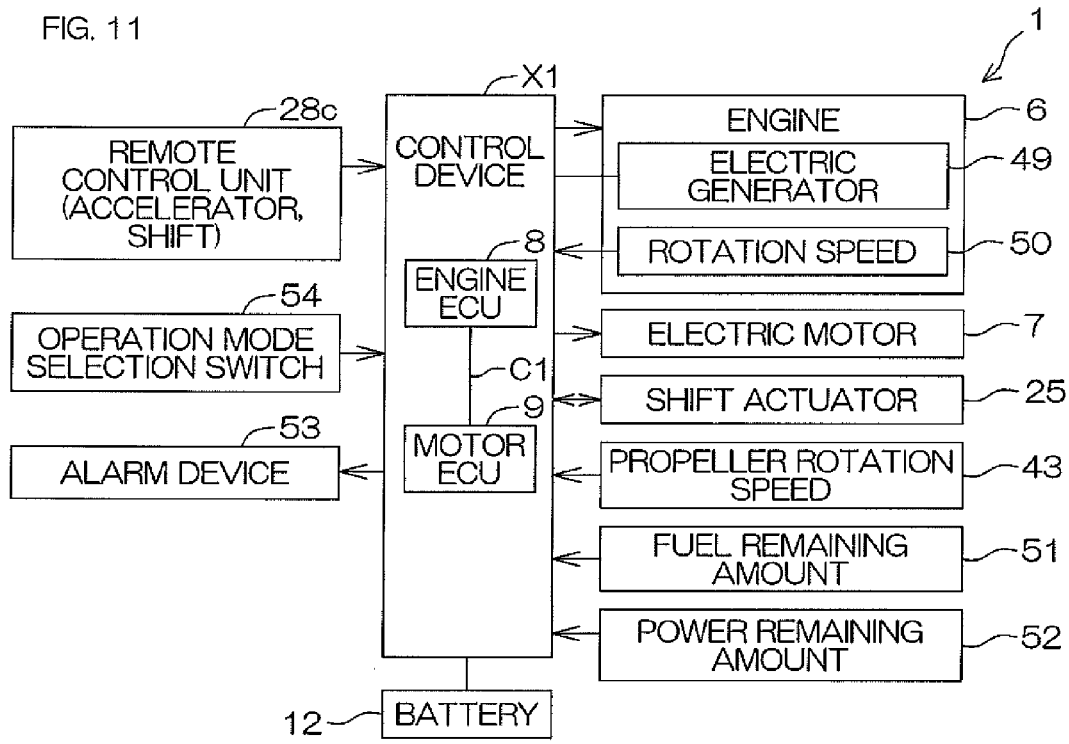
FIG. 11 is a block diagram showing an electric arrangement of the marine vessel propulsion device according to the first preferred embodiment of the present invention.

FIG. 11 is a block diagram showing an electric arrangement of the marine vessel propulsion device 1.

The marine vessel propulsion device 1 includes a control device X1 including the engine ECU 8 and the motor ECU 9. The engine 6 and the electric motor 7 are connected to the control device X1. Likewise, the shift actuator 25 and the remote control unit 28c are connected to the control device X1. The engine 6, the electric motor 7, and the shift actuator 25 are controlled by the control device X1 based on a command that is input from the remote control unit 28c to the control device X1.

As shown in FIG. 11, the engine 6 includes an electric generator (e.g., a flywheel magneto) 49 that generates electricity in response to the rotation of the crankshaft. The electric generator 49 is connected to the control device X1. The control device X1 is connected to the battery 12. Electric power generated by the electric generator 49 is supplied to the battery 12 through the control device X1. The engine 6 additionally includes an engine speed detector 50 that detects the rotation speed of the engine 6 (i.e., that detects the rotation speed of the crankshaft). The engine speed detector 50 is connected to the control device X1. Likewise, the propeller speed detector 43 that detects the rotation speed of the propeller 5 is connected to the control device X1.

The marine vessel propulsion device 1 additionally includes a fuel remaining amount detector 51 that detects a remaining amount of fuel in the fuel tank 11, a power remaining amount detector 52 that detects a remaining amount of electric power in the battery 12, and an alarm device 53 that issues an alarm to persons on the marine vessel. The fuel remaining amount detector 51 may be a float sensor that detects a remaining amount of fuel based on the position of a float disposed in the fuel tank 11, or may be a fuel remaining amount estimating portion that estimates a remaining amount of fuel from an injection amount of fuel jetted to produce an air-fuel mixture of air and fuel. The power remaining amount detector 52 may be a power remaining amount estimating portion that estimates a remaining amount of electric power from the voltage of the battery 12 or from the integrated value of input electric current or output electric current of the battery 12. The power remaining amount estimating portion may be disposed in the control device X1, or may be disposed in a device other than the control device X1. Likewise, the fuel remaining amount estimating portion may be disposed in the control device X1, or may be disposed in a device other than the control device X1.

The fuel remaining amount detector 51, the power remaining amount detector 52, and the alarm device 53 are connected to the control device X1. When the remaining amount of fuel in the fuel tank 11 reaches a lower limit, the control device X1 causes the alarm device 53 to issue an alarm. Likewise, when the remaining amount of electric power in the battery 12 reaches a lower limit, the control device X1 causes the alarm device 53 to issue an alarm. The alarm device 53 may be a light emitting device that emits light, or may be a sound generation device that generates an alarm sound, or may be a display device that displays a message, or may be a device that warns persons on the marine vessel by use of two or more among the light, the sound, and the message.

The marine vessel propulsion device 1 additionally includes an operation mode selection switch 54 that is operated by a vessel operator. The operation mode selection switch 54 is connected to the control device X1. The operation mode of the marine vessel propulsion device 1 is selected through the operation of the operation mode selection switch 54 by the vessel operator. The control device X1 operates the marine vessel propulsion device 1 in the operation mode selected by the vessel operator. The operation mode of the marine vessel propulsion device 1 includes an engine mode that causes only the engine 6 to drive the propeller 5, an electric mode that causes only the electric motor 7 to drive the propeller 5, and an assist mode that causes both the engine 6 and the electric motor 7 to drive the propeller 5. The operation mode of the marine vessel propulsion device 1 additionally includes an automatic selection mode in which the control device X1 selects any one of the engine mode, the electric mode, and the assist mode in accordance with the position of the control lever 28d (see FIG. 1A).

Figure 12:
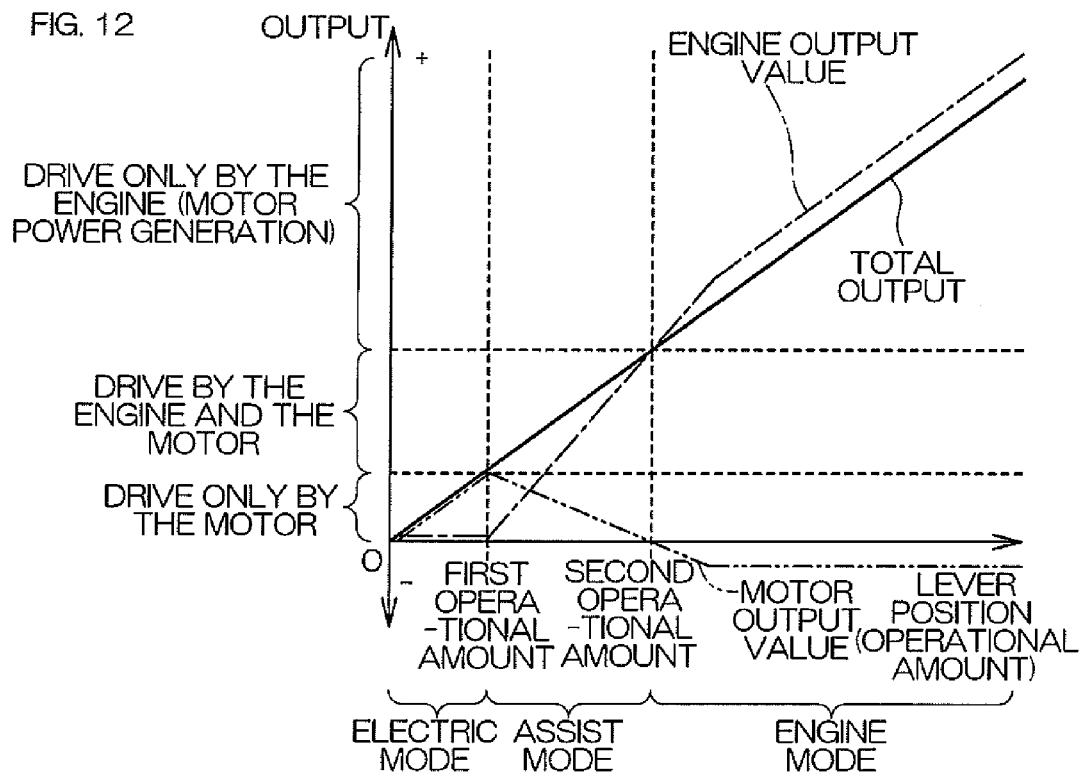
FIG. 12 is a graph showing a relationship between an operational amount of a control lever and an output of the marine vessel propulsion device.

FIG. 12 is a graph showing a relationship between the operational amount of the control lever 28d and the output of the marine vessel propulsion device 1.

When the control lever 28d is disposed at the forward position or at the rearward position in the automatic selection mode, the control device X1 is programmed to select a power source selected from between the engine 6 and the electric motor 7 to drive the propeller 5, and hence generates an output having an amount that is proportional to the operational amount of the control lever 28d from the output minimum position (the forward output minimum position Fmin or the rearward output minimum position Rmin) as shown by the heavy line in FIG. 12.

In detail, when the operational amount of the control lever 28d is below a first operational amount as shown in FIG. 12, the control device X1 causes only the electric motor 7 to drive the propeller 5 so as to generate an output having an amount that is proportional to the operational amount of the control lever 28d. In this case, the control device X1 may stop the operation of the engine 6, or may cause the forward/rearward switching mechanism 19 to perform switching to the neutral state so as to prevent the output of the engine 6 from being transmitted to the propeller 5.

When the operational amount of the control lever 28d is greater than the first operational amount and is not greater than the second operational amount, the control device X1 causes the engine 6 and the electric motor 7 to drive the propeller 5 so as to generate an output having an amount that is proportional to the operational amount of the control lever 28d. As shown in FIG. 12, in this range, the control device X1 may increase the output of the engine 6 in proportion to an increase in the operational amount of the control lever 28d, while decreasing the output of the electric motor 7, so as to generate an output having an amount that is proportional to the operational amount of the control lever 28d.

When the operational amount of the control lever 28d is greater than the second operational amount, the control device X1 is programmed to cause only the engine 6 to drive the propeller 5 so as to generate an output having an amount that is proportional to the operational amount of the control lever 28d. As described below, if the vessel operator does not intend to suddenly accelerate the marine vessel V1 and if the remaining amount of the battery 12 has not reached an upper limit, the control device X1 causes the electric motor 7 to generate electric power, and supplies the electric power generated by the electric motor 7 to the battery 12. Therefore, a torque (negative torque) that is opposite in direction to a torque transmitted from the engine 6 to the propeller 5 is applied to the propeller 5 from the electric motor 7, and the output is decreased.

In the automatic selection mode, the control device X1 is programmed to select a power source to drive the propeller 5 in accordance with the operational amount of the control lever 28d from the output minimum position as described above. The first and second operational amounts based on which power source is selected may be specific constants regardless of the situation of the marine vessel propulsion device 1. Additionally, as described below, the first and second operational amounts may be variables that change in accordance with the situation of the marine vessel propulsion device 1, such as the operation situation of the control lever 28d or the remaining amount of the battery 12.

Figure 13A:
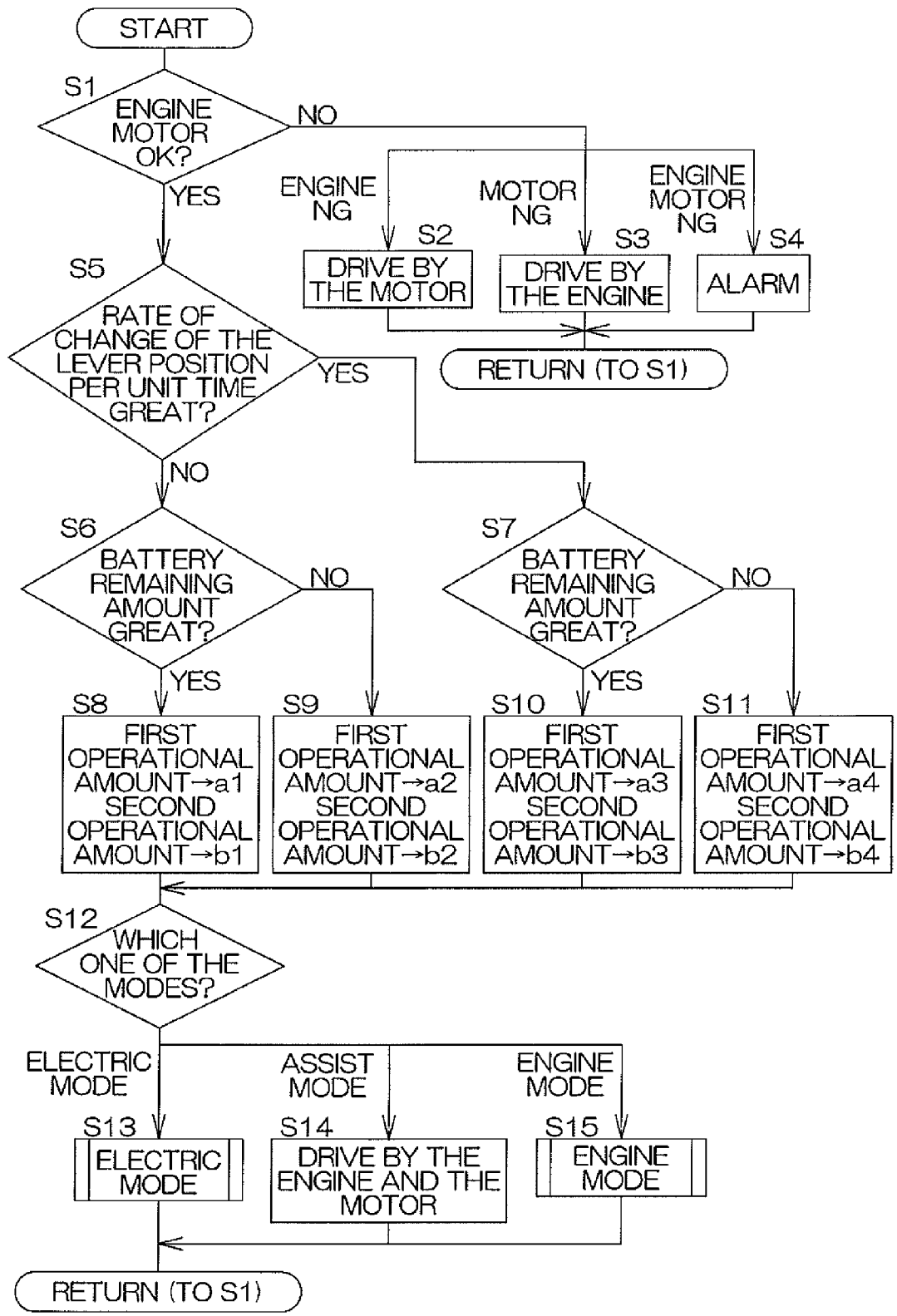
FIG. 13A is a flowchart when the control lever is disposed at a forward position or a rearward position in a state in which the marine vessel propulsion device has been set at an automatic selection mode.

FIG. 13A is a flowchart describing when the control lever 28d is disposed at the forward position or the rearward position in a state in which the marine vessel propulsion device 1 has been set at the automatic selection mode. FIG. 13B is a view for describing a relationship among a lever-position change rate, the remaining amount of the battery 12, and the range of each mode. The lever-position change rate is the rate of change of the position of the control lever 28d per unit time.

If the control lever 28d is disposed at the forward position or the rearward position, the control device X1 is programmed to determine whether both the engine 6 and the electric motor 7 can be continuously operated (S1). In detail, the control device X1 determines whether, for example, the remaining amount of the fuel is not less than a predetermined value and whether the temperature of the engine 6 is not higher than a predetermined value. Furthermore, the control device X1 determines whether, for example, the remaining amount of the battery 12 is not less than a predetermined value. In other words, the control device X1 confirms that the remaining amount of the fuel is not small and that the engine 6 is not high in temperature. Furthermore, the control device X1 confirms that the remaining amount of electric power stored in the battery 12 is not small.

If only the engine 6 cannot be continuously operated (if No at S1), the control device X1 causes the electric motor 7 to drive the propeller 5, and hence generates an output having an amount corresponding to the position of the control lever 28d (S2). Likewise, if only the electric motor 7 cannot be continuously operated (if No at S1), the control device X1 causes the engine 6 to drive the propeller 5, and hence generates an output having an amount corresponding to the position of the control lever 28d (S3). If both the engine 6 and the electric motor 7 cannot be continuously operated (if No at S1), the control device X1 causes the alarm device 53 (see FIG. 11) to issue an alarm (S4).

On the other hand, if both the engine 6 and the electric motor 7 can be continuously operated (if Yes at S1), the control device X1 is programmed to calculate the rate of change of the position of the control lever 28d from a predetermined time (e.g., from immediately before the performance of a calculation) until the present time based on a detection value of the remote control unit 28c. For example, if the control lever 28d is disposed at the forward position, the control device X1 calculates what percentage of a range from the forward output minimum position Fmin (see FIG. 1A) to the forward output maximum position Fmax (see FIG. 1A) that the control lever 28d has moved. Thereafter, the control device X1 determines whether the lever-position change rate is equal to or greater than a predetermined value (S5). In other words, the control device X1 determines whether the vessel operator has quickly moved the control lever 28d by a large movement amount in order to rapidly accelerate the marine vessel V1.

If the lever-position change rate is less than the predetermined value (if No at S5), the control device X1 determines whether the remaining amount of the battery 12 is equal to or greater than the predetermined value (S6). In other words, if the vessel operator does not move the control lever 28d or if the vessel operator slowly moves the control lever 28d, the control device X1 determines whether a sufficient amount of electric power remains in the battery 12. If the lever-position change rate is equal to or greater than the predetermined value at S5 (if Yes at S5), the control device X1 likewise determines whether the remaining amount of the battery 12 is equal to or greater than the predetermined value (S7).

If the remaining amount of the battery 12 is equal to or greater than the predetermined value at S6 (if Yes at S6), the control device X1 is programmed to set a1 as a first operational amount (see FIG. 12), and to set b1 as a second operational amount (see FIG. 12) (S8). If the remaining amount of the battery 12 is less than the predetermined value at S6 (if No at S6), the control device X1 is programmed to set a2 as a first operational amount, and to set b2 as a second operational amount (S9). As shown in FIG. 13B, a2 is smaller than a1 and is a value of zero or more, whereas b2 is smaller than b1 and is a value of zero or more. Therefore, if the lever-position change rate is small and if the remaining amount of the battery 12 is not sufficient, the control device X1 makes a range (electric mode and assist mode) in which the electric motor 7 rotates the propeller 5 narrower than usual.

On the other hand, if the remaining amount of the battery 12 is equal to or greater than the predetermined value at S7 (if Yes at S7), the control device X1 is programmed to set a3 as a first operational amount, and to set b3 as a second operational amount (S10). If the remaining amount of the battery 12 is less than the predetermined value at S7 (if No at S7), the control device X1 is programmed to set a4 as a first operational amount, and to set b4 as a second operational amount (S11). As shown in FIG. 13B, a3 is smaller than b3 and is a value of zero or more, whereas b3 is greater than b1 and is a value of zero or more. Therefore, if the lever-position change rate is large and if the remaining amount of the battery 12 is sufficient, the control device X1 makes the upper limit of the assist mode greater than usual. As shown in FIG. 13B, a4 is smaller than a3 and is a value of zero or more, whereas b4 is smaller than b3 and is a value of zero or more. Therefore, if the remaining amount of the battery 12 is not sufficient even if the lever-position change rate is large, the control device X1 makes the range in which the electric motor 7 rotates the propeller 5 narrower than a case in which the remaining amount of the battery 12 is sufficient.

In other words, if the remaining amount of the battery 12 is small, it is preferable to decrease the output of the electric motor 7 or to narrow the range in which the electric motor 7 rotates the propeller 5 in order to reduce the consumption of electric power. Therefore, preferably, each of the values "a" and "b" is set to a smaller value when the remaining amount of the battery 12 is small than when the remaining amount of the battery 12 is large if the lever-position change rate is the same as shown in a first row (S8) and a second row (S9) of FIG. 13B. Likewise, preferably, each of the values "a" and "b" is set to a smaller value when the remaining amount of the battery 12 is small than when the remaining amount of the battery 12 is large if the lever-position change rate is the same as shown in a third row (S10) and a fourth row (S11) of FIG. 13B.

When the lever-position change rate is large, the vessel operator has the intention of rapidly accelerating the marine vessel V1, and therefore it is preferable to widen a range (engine mode range) in which only the engine 6 rotates the propeller 5 and to widen a range (assist mode range) in which the electric motor 7 assists. Therefore, preferably, the value "b" is set to a greater value when the lever-position change rate is large than when the lever-position change rate is small if the remaining amount of the battery 12 is the same as shown in the first row (S8) and the third row (S10) of FIG. 13B. Likewise, preferably, the value "b" is set to a greater value when the lever-position change rate is large than when the lever-position change rate is small if the remaining amount of the battery 12 is the same as shown in the second row (S9) and the fourth row (S11) of FIG. 13B. The value "a" may be changed in accordance with the lever-position change rate or may not be changed. The electric motor 7 generates greater torque when its speed is low compared to the engine 6. Therefore, the value "a" that is indicated when the lever-position change rate is large may be equal to the value "a" that is indicated when the lever-position change rate is small.

In this manner, the control device X1 sets the first operational amount and the second operational amount in accordance with the lever-position change rate and the remaining amount of the battery 12. Thereafter, as shown in FIG. 13A, based on the first operational amount and the second operational amount that have been set thereby and based on the present position of the control lever 28d, the control device X1 is programmed to select any one of the modes in which the marine vessel propulsion device 1 is operated (S12). If the electric mode is selected, the control device X1 operates the marine vessel propulsion device 1 in the electric mode as described below (S13). If the assist mode is selected, the control device X1 operates the marine vessel propulsion device 1 in the assist mode (S14). In other words, the control device X1 generates an output having an amount corresponding to the position of the control lever 28d while rotating the propeller 5 by the engine 6 and the electric motor 7. If the engine mode is selected, the control device X1 operates the marine vessel propulsion device 1 in the engine mode as described below (S15).

Figure 13C:
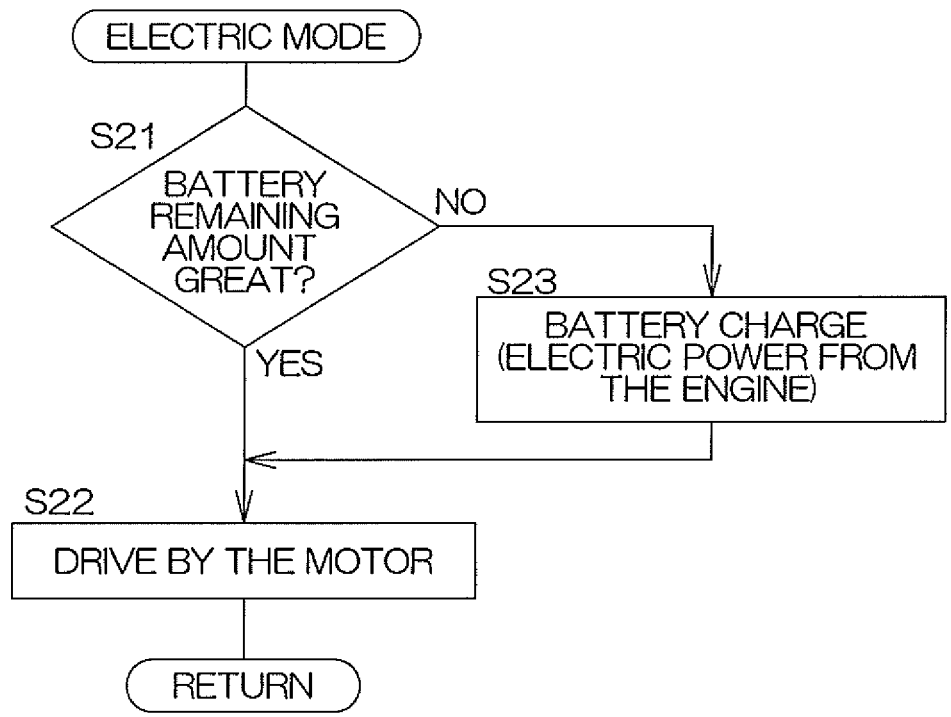
FIG. 13C is a flowchart for describing an electric mode.

FIG. 13C is a flowchart for describing the electric mode.

In the electric mode, the control device X1 determines whether the remaining amount of the battery 12 is equal to or greater than the predetermined value (S21). In other words, the control device X1 determines whether the electric motor 7 can be driven for a longtime only by electric power supplied from the battery 12.

If the remaining amount of the battery 12 is equal to or greater than the predetermined value (if Yes at S21), the control device X1 is programmed to control the electric motor 7 so as to generate an output having an amount corresponding to the position of the control lever 28d (S22).

On the other hand, if the remaining amount of the battery 12 is less than the predetermined value (if No at S21), the control device X1 causes the dog clutch 24 (see FIG. 3) to be moved to the neutral position, and rotates the engine 6 at a rotation speed not less than an idle rotation speed. Thereafter, the control device X1 supplies electric power generated by the electric generator 49 (see FIG. 11) of the engine 6 to the battery 12, and charges the battery 12 (S23). Thereafter, the control device X1 controls the electric motor 7 to drive the propeller 5 so as to generate an output having an amount corresponding to the position of the control lever 28d while charging the battery 12 (S22).

Figure 13D:
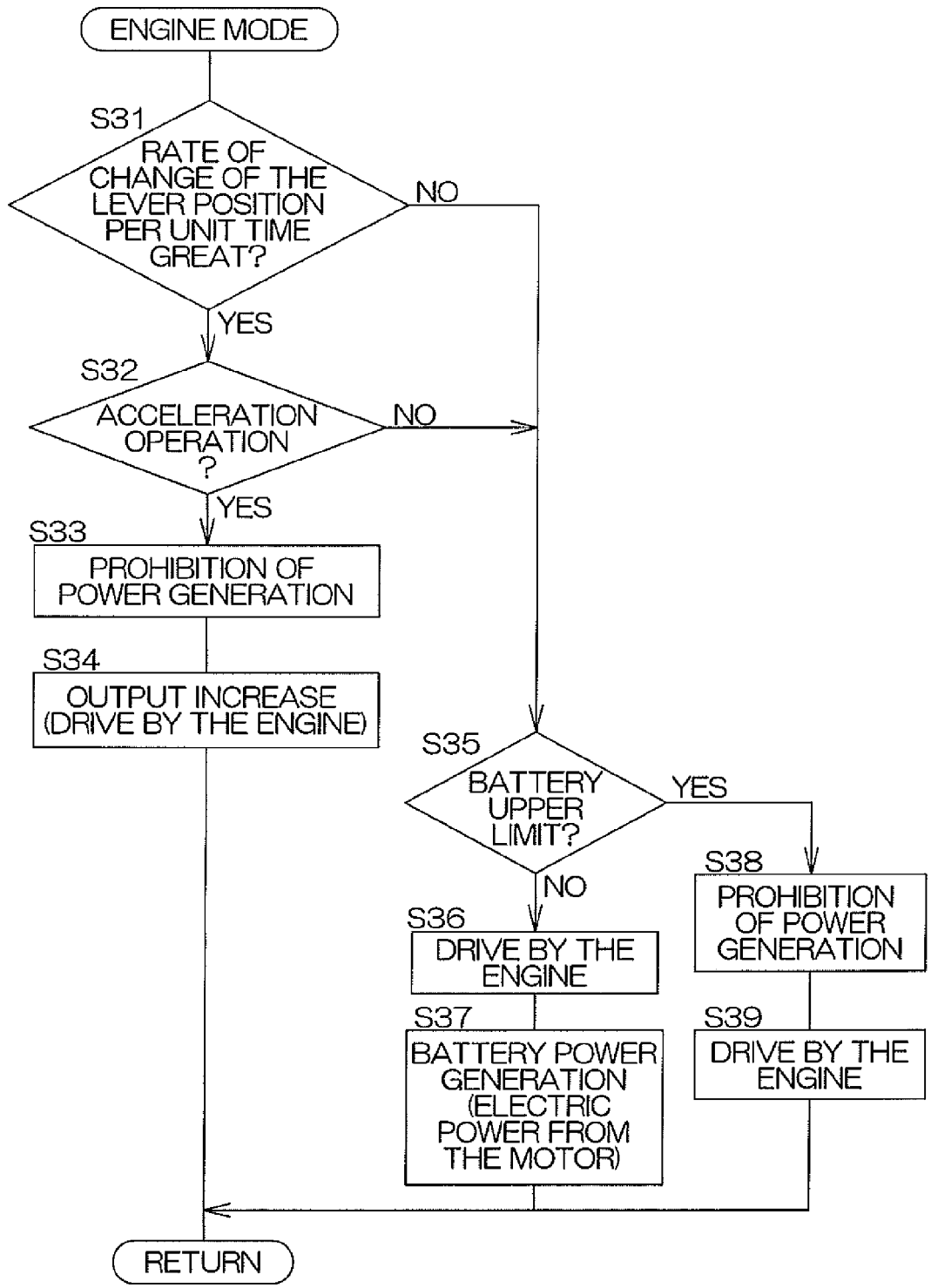
FIG. 13D is a flowchart for describing an engine mode.

FIG. 13D is a flowchart for describing the engine mode.

In the engine mode, the control device X1 determines whether the lever-position change rate is equal to or greater than the predetermined value (S31). If the lever-position change rate is equal to or greater than the predetermined value (if Yes at S31), the control device X1 determines whether the control lever 28d has been operated in a direction in which the marine vessel V1 is accelerated (S32). If the control lever 28d has been operated in the direction in which the marine vessel V1 is accelerated (if Yes at S32), the control device X1 prohibits the electric motor 7 from generating electric power, for example, by temporarily cutting off an electric circuit (S33). In other words, the control device X1 prevents the electric motor 7 from working as a load on the engine 6. Thereafter, the control device X1 generates an output having an amount corresponding to the position of the control lever 28d by increasing the output of the engine 6 (S34).

On the other hand, if the lever-position change rate is less than the predetermined value (if No at S31), the control device X1 determines whether the remaining amount of the battery 12 has reached the upper limit (S35). Likewise, if the control lever 28d has not been operated in the direction in which the marine vessel V1 is accelerated even if the lever-position change rate is equal to or greater than the predetermined value (if No at S32), the control device X1 determines whether the remaining amount of the battery 12 has reached the upper limit (S35). If the remaining amount of the battery 12 has not reached the upper limit (if No at S35), the control device X1 is programmed to control the engine 6 so as to generate an output having an amount corresponding to the position of the control lever 28d (S36). Simultaneously, the control device X1 supplies electric power generated by the electric motor 7 to the battery 12 (S37). On the other hand, if the remaining amount of the battery 12 has reached the upper limit (if Yes at S35), the control device X1 prohibits the electric motor 7 from generating electric power in order to prevent overcharging the battery 12 (S38). Thereafter, the control device X1 generates an output having an amount corresponding to the position of the control lever 28d by controlling the engine 6 in a state in which power generation is prohibited (S39).

FIG. 14A is a flowchart describing when a shift-in operation in which the vessel operator moves the control lever 28d from the neutral position to the forward position or to the rearward position is performed.

The control device X1 determines whether the shift position (the position of the dog clutch 24 (see FIG. 3)) is the neutral position (S41). If the shift position is the neutral position (if Yes at S41), the control device X1 determines whether the lever position (the position of the control lever 28d (see FIG. 1A)) is the forward position (S42). If the lever position is the forward position (if Yes at S42), the control device X1 determines whether a speed difference that is a difference between the rotation speed (absolute value) of the engine 6 and the rotation speed (absolute value) of the propeller 5 is equal to or greater than a first threshold (S43). In detail, the control device X1 determines whether a difference between the rotation speed of the front and rear gears 22 and 23 and the rotation speed of the dog clutch 24 is small.

If the speed difference is less than the first threshold (if No at S43), the control device X1 causes the dog clutch 24 to be moved from the neutral position to the forward position by controlling the shift actuator 25 (S44). As a result, the dog clutch 24 is engaged with the front gear 22, and the rotation of the engine 6 is transmitted to the propeller 5. On the other hand, if the speed difference is equal to or greater than the first threshold (if Yes at S43), the control device X1 reduces the speed difference by controlling at least one of the engine 6 and the electric motor 7 (S45).

When the control device X1 reduces the speed difference, the control device X1 may increase or decrease the rotation speed of the front and rear gears 22 and 23 by controlling the engine 6. Alternatively, the control device X1 may increase or decrease the rotation speed of the dog clutch 24 by controlling the electric motor 7. Of course, the control device X1 may reduce the speed difference by controlling both the engine 6 and the electric motor 7. If the rotation speed of the engine 6 is in a state of being decreased, the control device X1 may maintain the rotation speed of the electric motor 7 at a fixed speed until the rotation speed of the engine 6 falls to or below the predetermined value.

The control device X1 reduces the speed difference, and thereafter again determines whether the speed difference is equal to or greater than the first threshold (S43). If the speed difference is less than the first threshold (if No at S43), the control device X1 causes the dog clutch 24 to be moved to the forward position (S44). If the speed difference is equal to or greater than the first threshold (if Yes at S43), the control device X1 again reduces the speed difference (S45). The control device X1 decreases the speed difference to a value smaller than the first threshold.

If the lever position is not the forward position at S42 (if No at S42), the control device X1 determines whether the lever position is the rearward position (S46). If the lever position is the rearward position (if Yes at S46), the control device X1 determines whether the speed difference is equal to or greater than a second threshold (S47). The second threshold may be a value equal to the first threshold, or may be a value greater or smaller than the first threshold. In other words, the threshold used when the shift position is switched from the neutral position to the forward position and the threshold used when the shift position is switched from the neutral position to the rearward position may be equal to each other or may be different from each other.

If the speed difference is less than the second threshold (if No at S47), the control device X1 causes the dog clutch 24 to be moved from the neutral position to the rearward position by controlling the shift actuator 25 (S48). As a result, the dog clutch 24 is engaged with the rear gear 23, and the rotation of the engine 6 is transmitted to the propeller 5. On the other hand, if the speed difference is equal to or greater than the second threshold (if Yes at S47), the control device X1 reduces the speed difference in the same manner as at S45 (S49). Thereafter, the control device X1 reduces the speed difference, and again determines whether the speed difference is below the second threshold (S47).

Figure 14B:
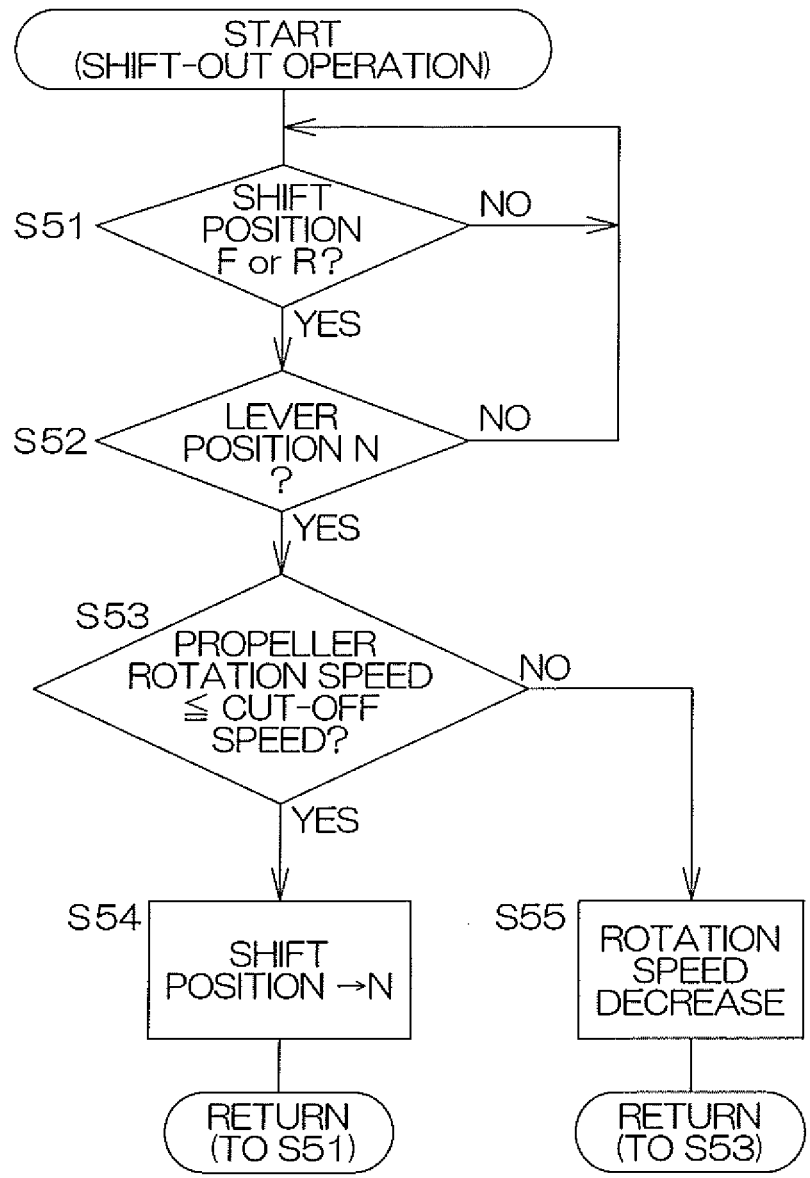
FIG. 14B is a flowchart when a shift-out operation is performed.

FIG. 14B is a flowchart describing when a shift-out operation in which the vessel operator moves the control lever 28d from the forward or rearward position to the neutral position is performed.

The control device X1 determines whether the shift position (the position of the dog clutch 24 (see FIG. 3)) is the forward position or the rearward position (S51). If the shift position is the forward position or the rearward position (if Yes at S51), the control device X1 determines whether the lever position (the position of the control lever 28d (see FIG. 1A)) is the neutral position (S52). If the lever position is the neutral position (if Yes at S52), i.e., if the vessel operator has moved the control lever 28d from the forward or rearward position to the neutral position, the control device X1 determines whether the rotation speed of the propeller 5 is equal to or below a cut-off speed (shift-out cut-off speed) (S53). The cut-off speed may be a fixed speed (a constant), or may be an arbitrary speed (a variable) that is set based on, for example, the lever-position change rate described above.

If the rotation speed of the propeller 5 is equal to or below the cut-off speed (if Yes at S53), the control device X1 causes the dog clutch 24 to be moved from the forward or rearward position to the neutral position (S54). As a result, the dog clutch 24 is disengaged from the front gear 22 or the rear gear 23, and a mechanical connection between the drive shaft 18 and the engine output transmission shaft 20 is released. On the other hand, if the rotation speed of the propeller 5 is greater than the cut-off speed (if No at S53), the control device X1 decreases the rotation speed of the propeller 5 by controlling the electric motor 7 (S55).

If the rotation speed of the propeller 5 is in a state of being decreased when the control device X1 decreases the rotation speed of the propeller 5, the control device X1 may maintain the output of the electric motor 7 at a fixed output level until the rotation speed of the propeller 5 falls to or below the cut-off speed. Alternatively, the control device X1 may decrease the rotation speed of the propeller 5 by decreasing the output of the electric motor 7. In detail, when the output of the electric motor 7 becomes low, resistance from the electric motor 7 is applied to the propeller 5. As a result, the rotation speed of the propeller 5 is decreased. Additionally, the rotation speed of the propeller 5 becomes low in a state in which the shift position is the forward position or the rearward position, and therefore not only the rotation speed of the propeller 5 but also the rotation speed of the engine 6 becomes low.

The control device X1 decreases the rotation speed of the propeller 5, and thereafter again determines whether the rotation speed of the propeller 5 is equal to or below the cut-off speed (S53). If the rotation speed of the propeller 5 is equal to or below the cut-off speed (if Yes at S53), the control device X1 causes the dog clutch 24 to be moved from the forward or rearward position to the neutral position (S54). If the rotation speed of the propeller 5 is greater than the cut-off speed (if No at S53), the control device X1 again decreases the rotation speed of the propeller 5 (S55). The control device X1 decreases the rotation speed of the propeller 5 to or below the cut-off speed in this manner, and then causes the dog clutch 24 to be moved from the forward or rearward position to the neutral position (S54).

Figure 15A:
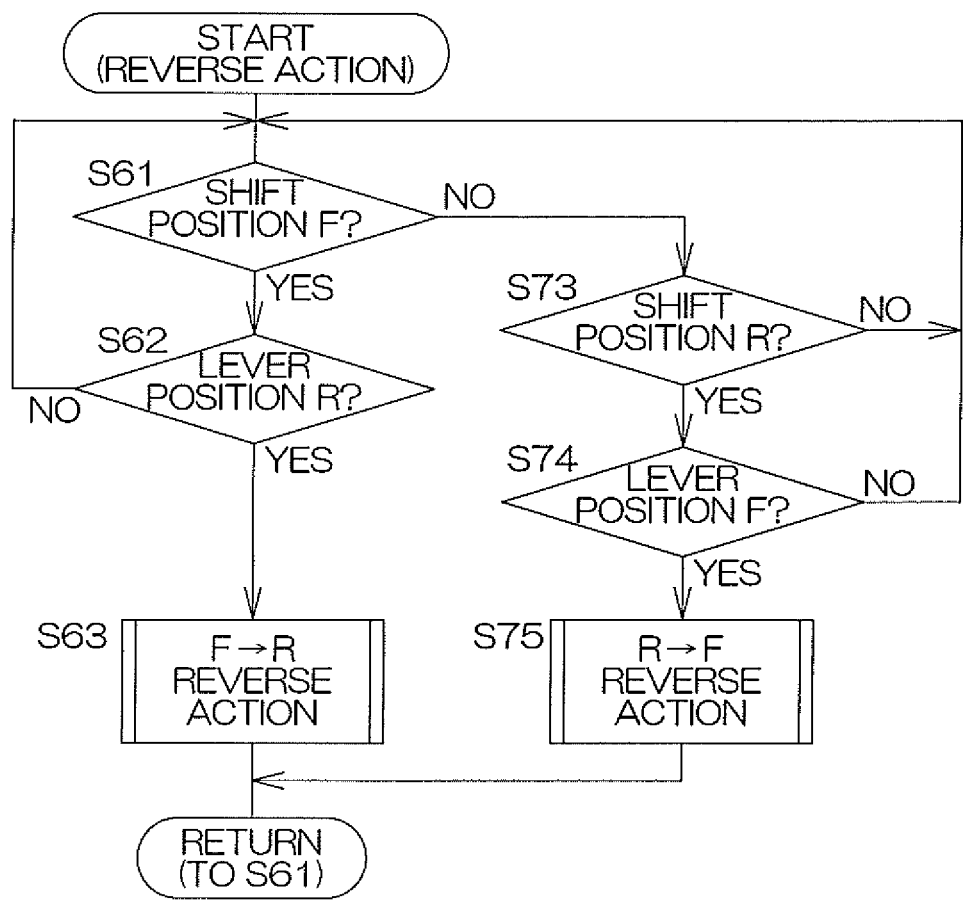
FIG. 15A is a flowchart when a reverse operation is performed.
Figure 15B:
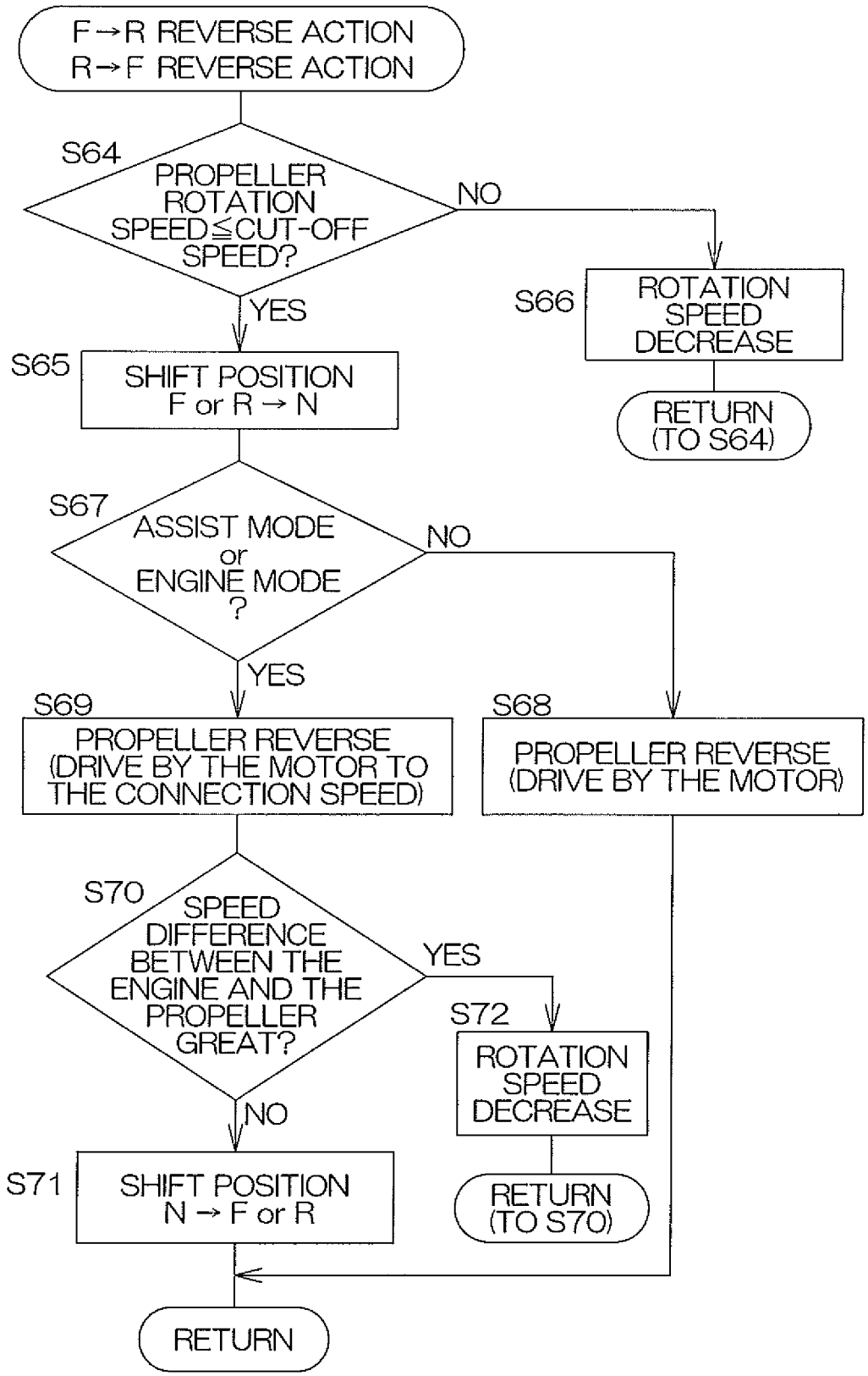
FIG. 15B is a flowchart for describing an F-R reverse action and an R-F reverse action.

FIG. 15A is a flowchart describing when a reverse operation in which the vessel operator moves the control lever 28d from either one of the forward position and the rearward position to the other one is performed. FIG. 15B is a flowchart for describing an F-R reverse action that reverses the rotation direction of the propeller 5 from the forward direction (normal rotation direction) to the backward direction (reverse rotation direction) and an R-F reverse action that reverses the rotation direction of the propeller 5 from the backward direction to the forward direction.

As shown in FIG. 15A, the control device X1 determines whether the shift position (the position of the dog clutch 24 (see FIG. 3)) is the forward position (S61). If the shift position is the forward position (if Yes at S61), the control device X1 determines whether the lever position (the position of the control lever 28d (see FIG. 1A)) is the rearward position (S62). If the lever position is the rearward position (if Yes at S62), i.e., if the vessel operator has moved the control lever 28d from the forward position to the rearward position, the control device X1 performs an F-R reverse action (S63). In detail, as shown in FIG. 15B, the control device X1 determines whether the rotation speed of the propeller 5 is equal to or below an F-R cut-off speed (S64). The F-R cut-off speed may be a fixed speed (a constant), or may be an arbitrary speed (a variable) that is set based on, for example, the lever-position change rate described above. Alternatively, the F-R cut-off speed may be a speed equal to the shift-out cut-off speed described above, or may be greater or smaller than the shift-out cut-off speed.

If the rotation speed of the propeller 5 is equal to or below the F-R cut-off speed (if Yes at S64), the control device X1 causes the dog clutch 24 to be moved from the forward position to the neutral position (S65). As a result, the dog clutch 24 is disengaged from the front gear 22, and a mechanical connection between the drive shaft 18 and the engine output transmission shaft 20 is released. On the other hand, if the rotation speed of the propeller 5 is greater than the F-R cut-off speed (if No at S64), the control device X1 decreases the rotation speed of the propeller 5 by controlling the electric motor 7 in the same manner as at S55 (see FIG. 14B) (S66).

The control device X1 decreases the rotation speed of the propeller 5, and thereafter again determines whether the rotation speed of the propeller 5 is equal to or below the F-R cut-off speed (S64). If the rotation speed of the propeller 5 is equal to or below the F-R cut-off speed (if Yes at S64), the control device X1 causes the dog clutch 24 to be moved from the forward position to the neutral position (S65). If the rotation speed of the propeller 5 is greater than the F-R cut-off speed (if No at S64), the control device X1 again decreases the rotation speed of the propeller 5 (S66). The control device X1 decreases the rotation speed of the propeller 5 to or below the F-R cut-off speed in this manner, and then causes the dog clutch 24 to be moved from the forward position to the neutral position (S65).

After the dog clutch 24 moves to the neutral position, the control device X1 determines whether the operation mode of the marine vessel propulsion device 1 is the assist mode or the engine mode (which includes the assist mode and the engine mode of the automatic selection mode) (S67). If the operation mode is neither the assist mode nor the engine mode (if No at S67), the control device X1 reverses the propeller 5 by controlling the electric motor 7 (S68). In other words, the control device X1 switches the rotation direction of the propeller 5 from the normal rotation direction to the reverse rotation direction by causing the electric motor 7 to drive the propeller 5 in a state in which a mechanical connection between the engine 6 and the propeller 5 has been released. Thereafter, the control device X1 causes the electric motor 7 to accelerate the propeller 5 in the reverse rotation direction up to a propeller rotation speed corresponding to an output command.

Likewise, if the operation mode is the assist mode or the engine mode (if Yes at S67), the control device X1 reverses the propeller 5 by controlling the electric motor 7 (S69). Thereafter, the control device X1 accelerates the propeller 5 in the reverse rotation direction up to an F→R connection speed by causing the electric motor 7 to drive the propeller 5. Thereafter, the control device X1 determines whether a speed difference that is a difference between the rotation speed (absolute value) of the engine 6 and the rotation speed (absolute value) of the propeller 5 is not less than a third threshold (S70).

If the speed difference is less than the third threshold (if No at S70), the control device X1 causes the dog clutch 24 to be moved from the neutral position to the rearward position (S71). As a result, the dog clutch 24 is engaged with the rear gear 23, and the rotation of the engine 6 is transmitted to the propeller 5. Therefore, the propeller 5 is driven in the reverse rotation direction by both the engine 6 and the electric motor 7. On the other hand, if the speed difference is equal to or greater than the third threshold (if Yes at S70), the control device X1 reduces the speed difference by controlling the engine 6 and the electric motor 7 in the same manner as at S45 (see FIG. 14A) (S72). Thereafter, the control device X1 again determines whether the speed difference is equal to or greater than the third threshold (S70).

On the other hand, as shown in FIG. 15A, if the shift position is not the forward position at S61 (if No at S61), the control device X1 determines whether the shift position is the rearward position (S73). If the shift position is the rearward position (if Yes at S73), the control device X1 determines whether the lever position is the forward position (S74). If the lever position is the forward position (if Yes at S74), i.e., if the vessel operator has moved the control lever 28d from the rearward position to the forward position, the control device X1 performs an R-F reverse action (S75). In detail, as shown in FIG. 15B, the control device X1 determines whether the rotation speed of the propeller 5 is equal to or below the R-F cut-off speed (S64). The R-F cut-off speed may be a fixed speed (a constant), or may be an arbitrary speed (a variable) that is set based on, for example, the lever-position change rate described above. Alternatively, the R-F cut-off speed may be a speed equal to the shift-out cut-off speed described above, or may be greater or smaller than the shift-out cut-off speed. Of course, the R-F cut-off speed may be a speed equal to the F-R cut-off speed, or may be greater or smaller than the F-R cut-off speed.

If the rotation speed of the propeller 5 is equal to or below the R-F cut-off speed (if Yes at S64), the control device X1 moves the dog clutch 24 from the rearward position to the neutral position (S65). As a result, the dog clutch 24 is disengaged from the rear gear 23, and a mechanical connection between the drive shaft 18 and the engine output transmission shaft 20 is released. On the other hand, if the rotation speed of the propeller 5 is greater than the R-F cut-off speed (if No at S64), the control device X1 decreases the rotation speed of the propeller 5 in the same manner as at S55 (see FIG. 14B) (S66). As a result, the rotation speed of the engine 6 and that of the propeller 5 are decreased.

The control device X1 decreases the rotation speed of the propeller 5, and thereafter again determines whether the rotation speed of the propeller 5 is equal to or below the R-F cut-off speed (S64). If the rotation speed of the propeller 5 is equal to or below the R-F cut-off speed (if Yes at S64), the control device X1 moves the dog clutch 24 from the rearward position to the neutral position (S65). If the rotation speed of the propeller 5 is greater than the R-F cut-off speed (if No at S64), the control device X1 again decreases the rotation speed of the propeller 5 (S66). The control device X1 causes the rotation speed of the propeller 5 to fall to or below the R-F cut-off speed in this manner, and then causes the dog clutch 24 to be moved from the rearward position to the neutral position (S65).

After the dog clutch 24 moves to the neutral position, the control device X1 determines whether the operation mode of the marine vessel propulsion device 1 is the assist mode or the engine mode (S67). If the operation mode is neither the assist mode nor the engine mode (if No at S67), the control device X1 reverses the propeller 5 by controlling the electric motor 7 (S68). In detail, the control device X1 switches the rotation direction of the propeller 5 from the reverse rotation direction to the normal rotation direction by causing the electric motor 7 to drive the propeller 5 in a state in which a mechanical connection between the engine 6 and the propeller 5 has been released. Thereafter, the control device X1 causes the electric motor 7 to accelerate the propeller 5 in the normal rotation direction up to a propeller rotation speed corresponding to an output command.

Likewise, if the operation mode is the assist mode or the engine mode (if Yes at S67), the control device X1 reverses the propeller 5 by controlling the electric motor 7 (S69). Thereafter, the control device X1 accelerates the propeller 5 in the normal rotation direction up to the R→F connection speed by causing the electric motor 7 to drive the propeller 5. Thereafter, the control device X1 determines whether the speed difference is equal to or greater than a fourth threshold (S70).

If the speed difference is less than the fourth threshold (if No at S70), the control device X1 causes the dog clutch 24 to be moved from the neutral position to the forward position (S71). As a result, the dog clutch 24 is engaged with the front gear 22, and the rotation of the engine 6 is transmitted to the propeller 5. Therefore, the propeller 5 is driven in the normal rotation direction by both the engine 6 and the electric motor 7. On the other hand, if the speed difference is equal to or greater than the fourth threshold (if Yes at S70), the control device X1 reduces the speed difference by controlling the engine 6 and the electric motor 7 in the same manner as at S45 (see FIG. 14A) (S72). Thereafter, the control device X1 again determines whether the speed difference is equal to or greater than the fourth threshold (S70).

As described above, in the present preferred embodiment, the propeller 5 including the blades 30 and the rim 31 is surrounded by the duct 26. The engine 6 rotates the blades 30 around the propeller axis A2 with respect to the duct 26. Likewise, the electric motor 7 rotates the blades 30 around the propeller axis A2 with respect to the duct 26. The propeller 5 is rotationally driven around the propeller axis A2 by either the engine 6 or the electric motor 7 or by both the engine 6 and the electric motor 7. As a result, a thrust force that propels the marine vessel V1 is generated. Thus, the engine 6 and the electric motor 7 can rotate the propeller 5 independently of each other, and therefore the structure of the marine vessel propulsion device 1 can be simplified. Additionally, the propulsion unit 4 is attached to the lower case 15, and therefore the same components as those of existing outboard motors can be used in an arrangement exclusive of the lower portion (lower unit) of the outboard motor 3. Still additionally, the electric motor 7 is disposed in the water when the marine vessel V1 is sailing, and therefore it is difficult for a motor sound generated from the electric motor 7 to travel to persons on the marine vessel. Therefore, the quietness of the marine vessel propulsion device 1 can be improved.

Next, a second preferred embodiment of the present invention will be described.

A main difference between the second preferred embodiment and the above-described first preferred embodiment is that the propulsion unit is disposed in front of the lower case.

Figure 16A:
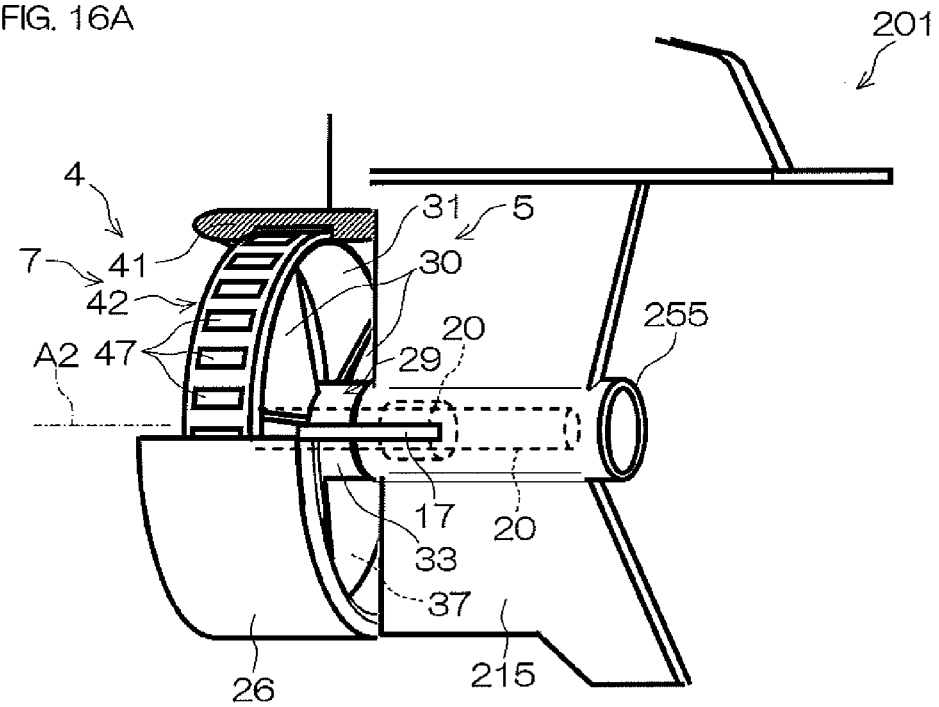
FIG. 16A is a partial sectional view of a lower portion of a marine vessel propulsion device according to a second preferred embodiment of the present invention.
Figure 16B:
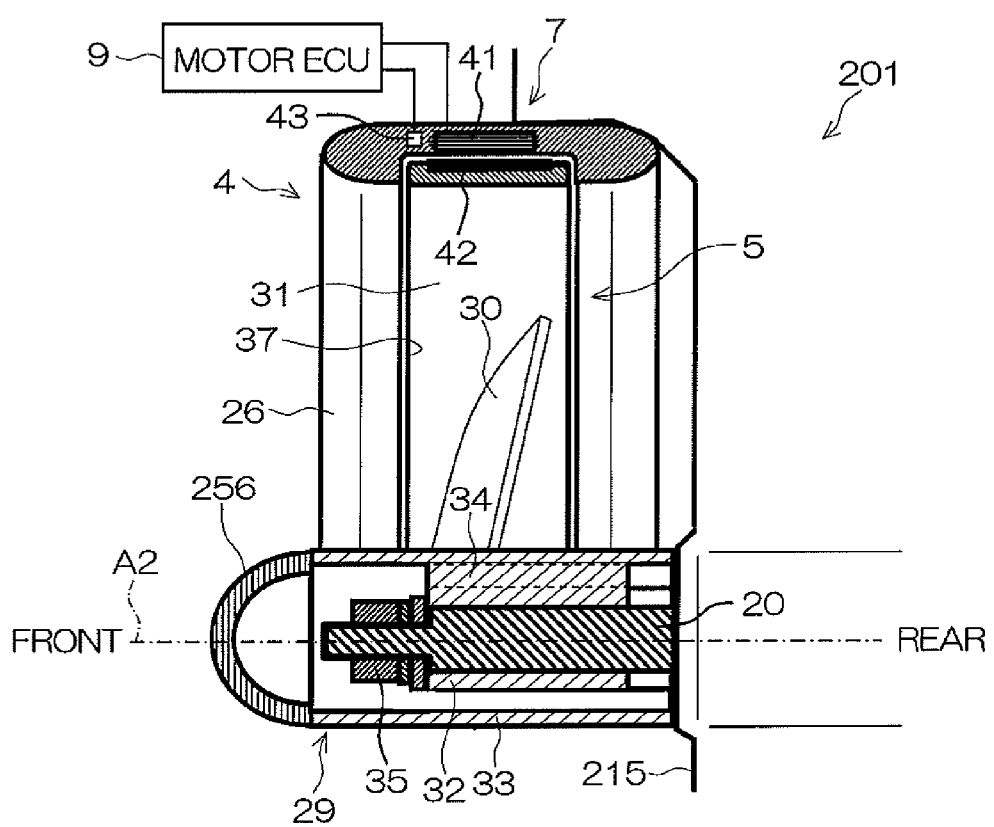
FIG. 16B is a sectional view of a propulsion unit according to the second preferred embodiment of the present invention.

FIG. 16A is a partial sectional view of a lower portion of a marine vessel propulsion device 201 according to the second preferred embodiment of the present invention. FIG. 16B is a sectional view of a propulsion unit 4 according to the second preferred embodiment of the present invention. In FIG. 16A and FIG. 16B, the same reference numerals as in FIGS. 1 to 15 are given to the components corresponding to the components shown in FIGS. 1 to 15, and a description of these components is omitted.

The marine vessel propulsion device 201 according to the second preferred embodiment preferably has the same arrangement as the marine vessel propulsion device 1 according to the first preferred embodiment exclusive of the lower portion (lower unit) of the outboard motor 3. In detail, the marine vessel propulsion device 201 includes a lower case 215 instead of the lower case 15 according to the first preferred embodiment. As shown in FIG. 16A, the lower case 215 includes an exhaust portion 255 disposed at the rear of the lower case 215. The exhaust portion 255 defines an exhaust port through which exhaust gas generated by the engine 6 (see FIG. 1A) is discharged rearwardly. The propulsion unit 4 is disposed in front of the lower case 215. Therefore, the propeller 5 is disposed in front of the forward/rearward switching mechanism 19. The propulsion unit 4 is connected to the lower case 215 through the stay 17. As shown in FIG. 16B, the front end of the engine output transmission shaft 20 protrudes forwardly from the lower case 215. The front end of the engine output transmission shaft 20 penetrates through the inner shaft portion 32 in the front-rear direction. The inner shaft portion 32 is connected to the front end of the engine output transmission shaft 20 by the bolt 35, for example. The front end of the rotational shaft 29 is covered with a cover 256 that is a forwardly convex hemisphere.

Next, a third preferred embodiment of the present invention will be described.

A main difference between the third preferred embodiment and the above-described first preferred embodiment is that the propulsion unit is disposed below the lower case.

Figure 17A:
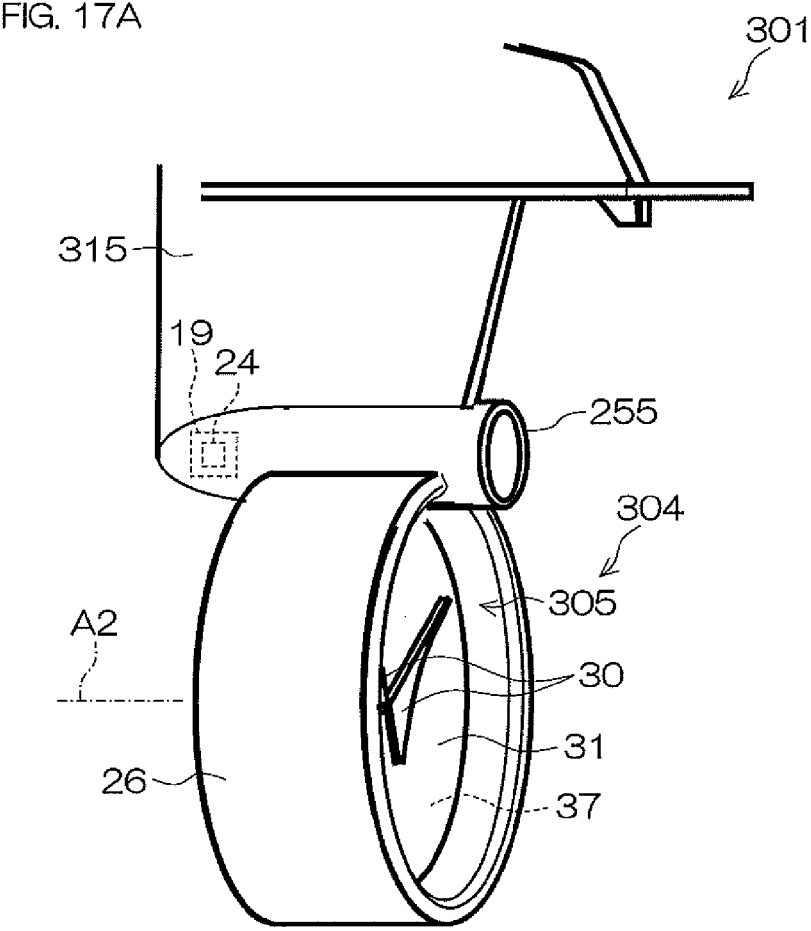
FIG. 17A is a partial sectional view of a lower portion of a marine vessel propulsion device according to a third preferred embodiment of the present invention.
Figure 17B:
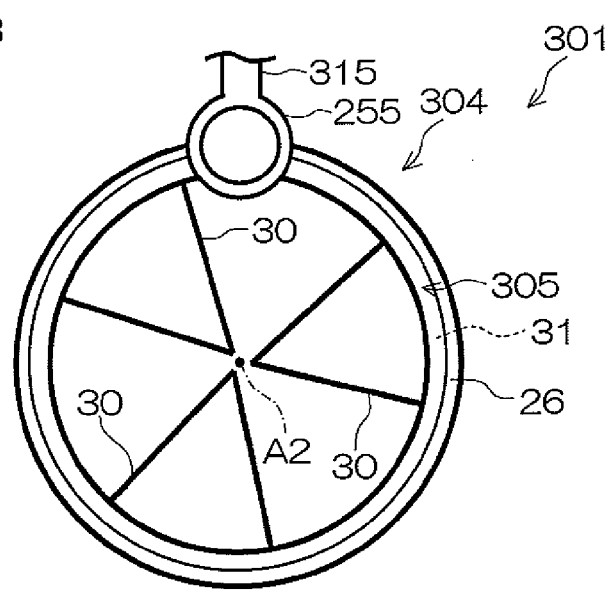
FIG. 17B is a rear view of a propulsion unit according to the third preferred embodiment of the present invention.
Figure 17C:
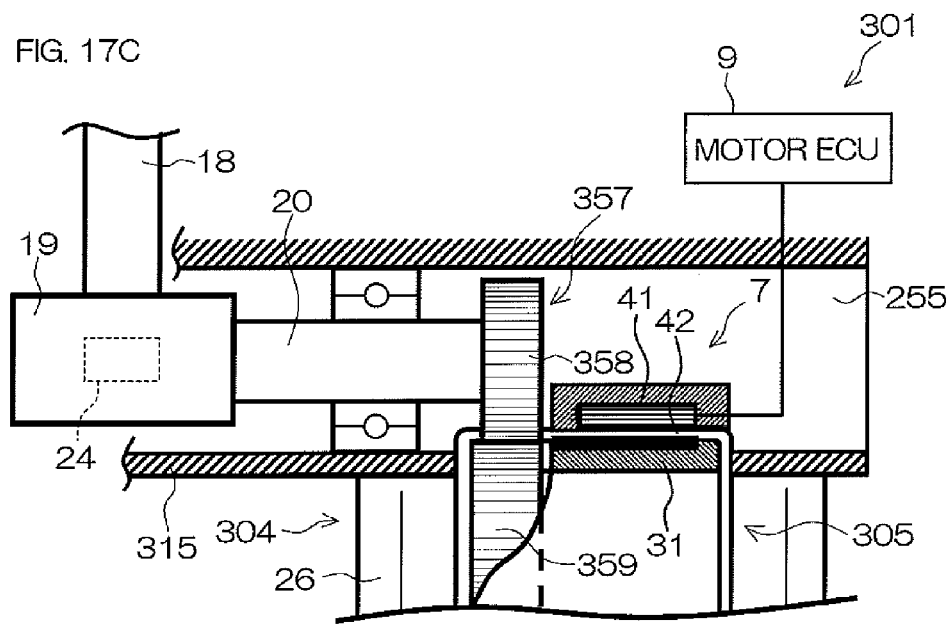
FIG. 17C is a sectional view of the propulsion unit according to the third preferred embodiment of the present invention.

FIG. 17A is a partial sectional view of a lower portion of a marine vessel propulsion device 301 according to the third preferred embodiment of the present invention. FIG. 17B is a rear view of the propulsion unit 4 according to the third preferred embodiment of the present invention. FIG. 17C is a sectional view of the propulsion unit 4 according to the third preferred embodiment of the present invention. In FIG. 17A to FIG. 17C, the same reference numerals as in FIGS. 1 to 16B are given to the components corresponding to the components shown in FIGS. 1 to 16B, and a description of these components is omitted.

The marine vessel propulsion device 301 according to the third preferred embodiment preferably has the same arrangement as the marine vessel propulsion device 1 according to the first preferred embodiment exclusive of the lower portion (lower unit) of the outboard motor 3. In detail, the marine vessel propulsion device 301 includes a lower case 315 instead of the lower case 15 according to the first preferred embodiment. The marine vessel propulsion device 301 additionally includes a propulsion unit 304 instead of the propulsion unit 4 according to the first preferred embodiment. The propulsion unit 304 preferably has the same arrangement as the propulsion unit 4 according to the first preferred embodiment exclusive of the propeller. In detail, the propulsion unit 304 includes a propeller 305 instead of the propeller 5 according to the first preferred embodiment.

As shown in FIG. 17A, the lower case 315 includes an exhaust portion 255 disposed at the rear of the lower case 315. The propulsion unit 304 is disposed below the lower case 315. The upper end of the duct 26 is connected to the lower case 315. The propeller 305 is disposed below the dog clutch 24. As shown in FIG. 17B, the propeller 305 includes the blades 30 and the rim 31. In other words, unlike the propeller 5 according to the first preferred embodiment, the propeller 305 is not provided with the rotational shaft 29. The rim 31 is held by the duct 26 with the bearings B1 to B3 (see FIG. 7A and FIG. 7B) arranged therebetween. As a result, the propeller 305 is held by the duct 26.

As shown in FIG. 17C, the marine vessel propulsion device 301 additionally includes a gear transmission mechanism 357 that transmits the power of the engine 6 to the rim 31. The gear transmission mechanism 357 includes a driving gear 358 connected to the engine output transmission shaft 20 and a driven gear 359 disposed on the outer periphery of the rim 31. The driving gear 358 and the driven gear 359 may mesh with each other, or may mesh with a shared intermediate gear. FIG. 17C shows a state in which the driving gear 358 meshes with the driven gear 359. The driving gear 358 rotates together with the engine output transmission shaft 20, and the driven gear 359 rotates together with the rim 31. The rotation of the engine output transmission shaft 20 is transmitted to the rim 31 while being decelerated by the gear transmission mechanism 357. As a result, its rotation is transmitted to the rim 31 in a state in which the power of the engine 6 has been amplified, and the propeller 305 rotates around the propeller axis A2 with respect to the duct 26.

Next, a fourth preferred embodiment of the present invention will be described.

A main difference between the fourth preferred embodiment and the above-described second preferred embodiment is that a propeller pitch (i.e., a distance advanced by one rotation of the propeller) can be changed.

Figure 18:
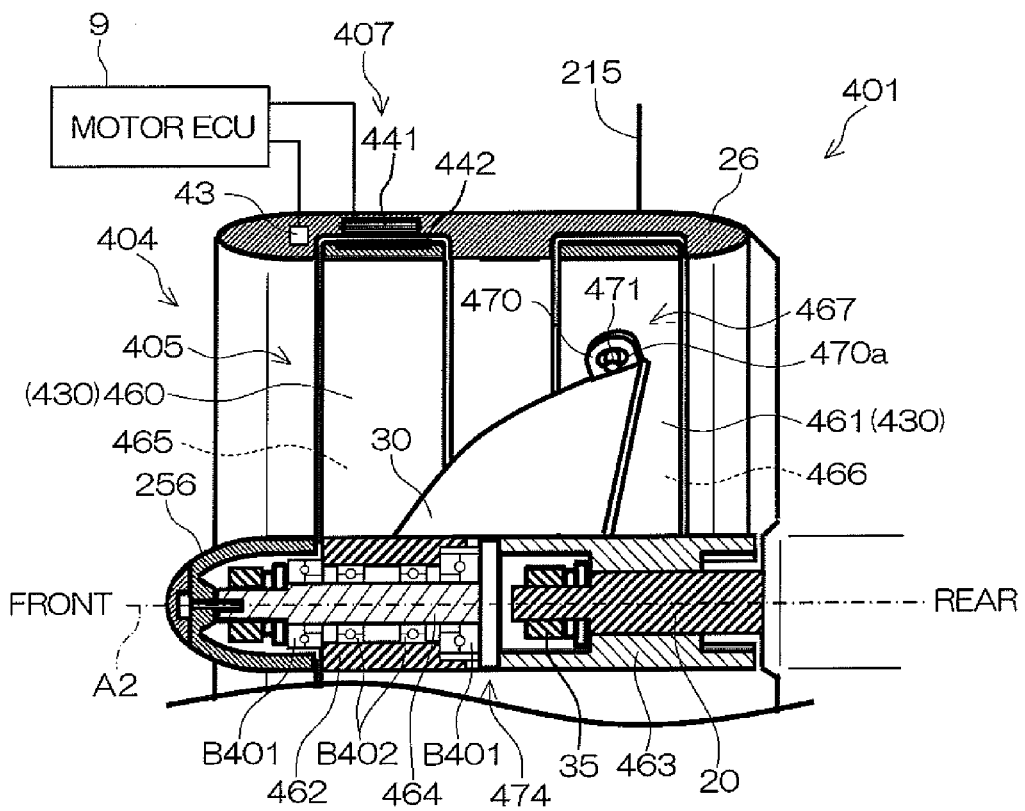
FIG. 18 is a sectional view of a propulsion unit according to a fourth preferred embodiment of the present invention.
Figure 19A:
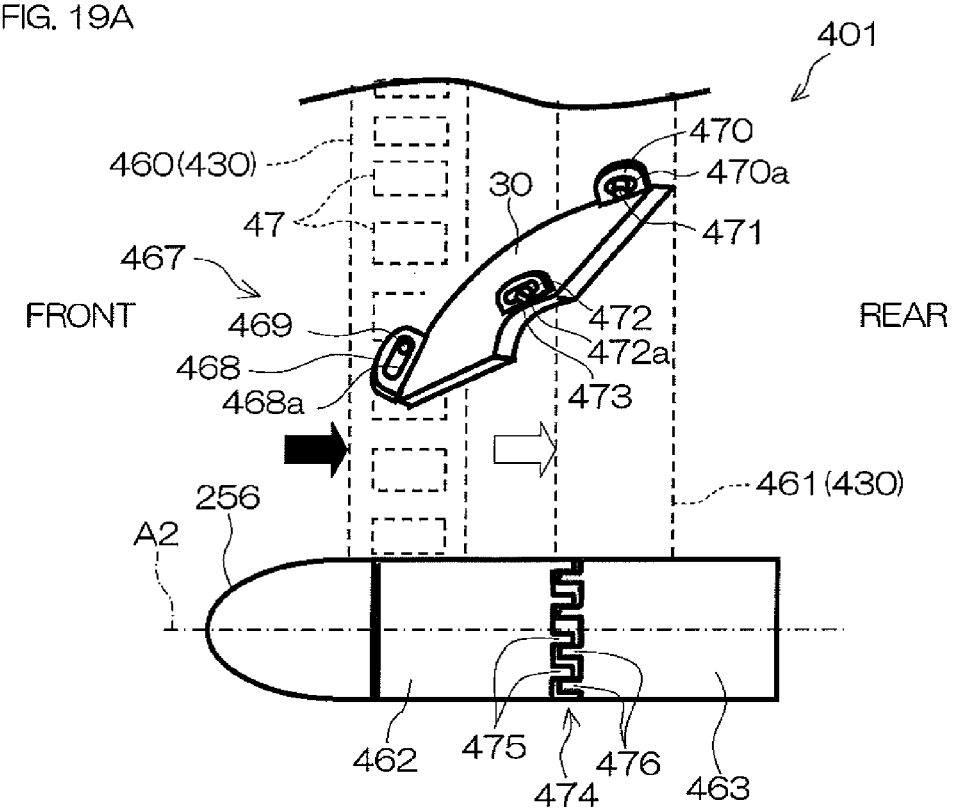
FIG. 19A is a view for describing the inclination angle of a blade with respect to a propeller axis.
Figure 19B:
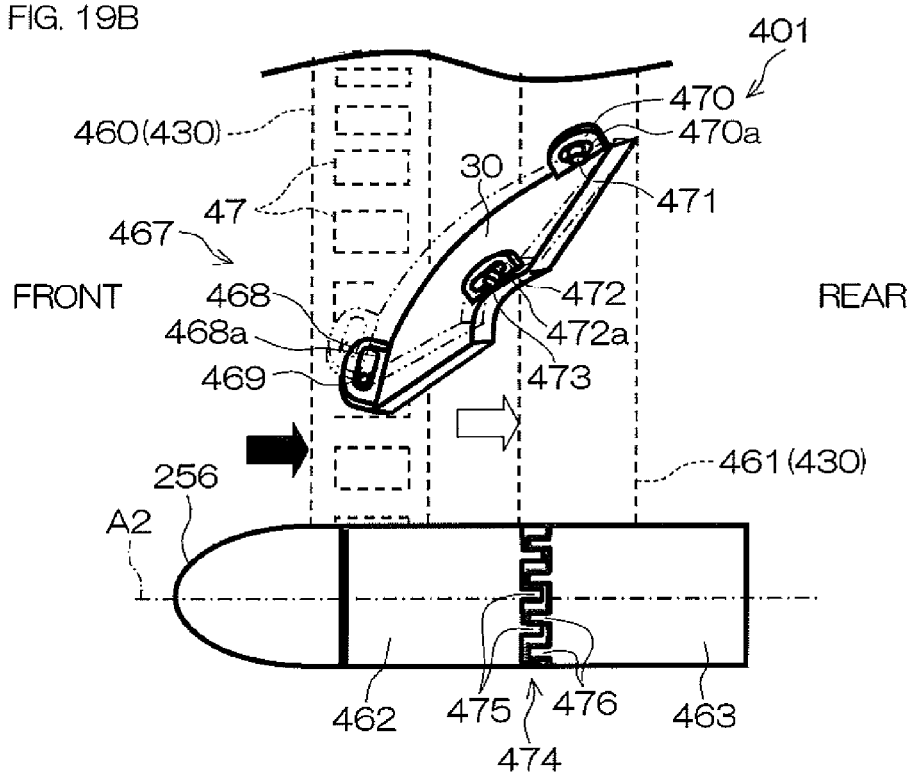
FIG. 19B is a view for describing the inclination angle of the blade with respect to the propeller axis.

FIG. 18 is a sectional view of a propulsion unit 404 according to the fourth preferred embodiment of the present invention. FIG. 19A and FIG. 19B are views for describing the inclination angle of the blade 30 with respect to the propeller axis A2. In FIG. 18 to FIG. 19B, the same reference numerals as in FIGS. 1 to 17C are given to the components corresponding to the components shown in FIGS. 1 to 17C, and a description of these components is omitted.

The marine vessel propulsion device 401 according to the fourth preferred embodiment preferably has the same arrangement as the marine vessel propulsion device 201 according to the second preferred embodiment exclusive of the propulsion unit. In detail, as shown in FIG. 18, the marine vessel propulsion device 401 includes the propulsion unit 404 instead of the propulsion unit 4. The propulsion unit 404 includes a propeller 405 rotatable around the propeller axis A2, an electric motor 407 that rotates the propeller 405 around the propeller axis A2, and a duct 26 that surrounds the propeller 405 around the propeller axis A2. The propeller 405 is held by the duct 26. The propeller 405 and the duct 26 are disposed coaxially.

As shown in FIG. 18, the propeller 405 includes a cylindrical front rotational shaft 462 and a cylindrical rear rotational shaft 463 that extend along the propeller axis A2, a plurality of blades 30 disposed around the front and rear rotational shafts 462 and 463, and a cylindrical rim 430 that surrounds the blades 30. In FIG. 18 to FIG. 19B, only one blade 30 is shown, and the other blades 30 are omitted from the figures. Each blade 30 is supported by the rim 430. The rim 430 includes a cylindrical front rim 460 that surrounds the blades 30 and a rear rim 461 that surrounds the blades 30 behind the front rim 460.

As shown in FIG. 18, the front rotational shaft 462 is supported by a center shaft 464 that extends along the propeller axis A2 with two thrust bearings B401 and two radial bearings B402 arranged therebetween. The center shaft 464 is fixed to the cover 256. The cover 256 is fixed to the duct 26 by a fixing member (not shown). Therefore, the front rotational shaft 462 is rotatable around the propeller axis A2 with respect to the duct 26. The front rotational shaft 462 is fixed to the front rim 460 by a fixing member (not shown). Therefore, the front rim 460 is supported by the front rotational shaft 462.

On the other hand, as shown in FIG. 18, the rear rotational shaft 463 is disposed behind the front rotational shaft 462. The front rotational shaft 462 and the rear rotational shaft 463 are preferably equal in outer diameter to each other. The front end of the engine output transmission shaft 20 is inserted in the rear rotational shaft 463. The rear rotational shaft 463 is connected to the engine output transmission shaft 20 so as to be rotatable together therewith. The rear rotational shaft 463 rotates around the propeller axis A2 together with the engine output transmission shaft 20. The rear rotational shaft 463 is rotatable around the propeller axis A2 with respect to the front rotational shaft 462. As described below, the rear rotational shaft 463 is connected to the rear rim 461 through the blades 30. The rear rotational shaft 463 is rotatable around the propeller axis A2 together with the blades 30 and with the rear rim 461.

As shown in FIG. 18, the front rim 460 and the rear rim 461 surround the propeller axis A2 inside the duct 26. The front rim 460 is contained in a front annular groove 465 provided in the inner peripheral portion of the duct 26. The front annular groove 465 is more hollow than the inner peripheral surface of the duct 26, and is continuous over its whole circumference. The central axis of the front rim 460 and that of the duct 26 are disposed on the propeller axis A2. The front rim 460 is rotatable around the propeller axis A2 with respect to the duct 26 in a state of being contained in the front annular groove 465.

Likewise, as shown in FIG. 18, the rear rim 461 is contained in a rear annular groove 466 provided in the inner peripheral portion of the duct 26. The rear annular groove 466 is more hollow than the inner peripheral surface of the duct 26, and is continuous over its whole circumference. The central axis of the rear rim 461 and that of the duct 26 are disposed on the propeller axis A2. The rear rim 461 is rotatable around the propeller axis A2 with respect to the duct 26 in a state of being contained in the rear annular groove 466.

As shown in FIG. 18, the electric motor 407 includes an annular stator 441 defined by a portion of the duct 26 and a cylindrical rotor 442 defined by a portion of the front rim 460. In other words, the duct 26 includes the stator 441 disposed between the outer peripheral surface of the duct 26 and the bottom surface of the front annular groove 465, and the front rim 460 includes the rotor 442 disposed at the outer peripheral portion of the front rim 460. The electric motor 407 rotates the front rim 460 around the propeller axis A2. As described below, the front rim 460 is connected to the front end of each blade 30, and the rear end of each blade 30 is connected to the rear rim 461. Therefore, when the electric motor 407 rotates the front rim 460, the power of the electric motor 407 is transmitted to the blades 30 and to the rear rim 461. As a result, the entire propeller 405 rotates around the propeller axis A2.

As shown in FIG. 19A, the propulsion unit 404 additionally includes an outer peripheral side restricting portion 467 that restricts a relative rotation amount of the front rim 460 and the rear rim 461 with respect to each other. The outer peripheral side restricting portion 467 includes a front supported portion 468 disposed at the front end of each blade 30 and a front supporting portion 469 disposed at the front rim 460. The outer peripheral side restricting portion 467 additionally includes a rear supported portion 470 disposed at the rear end of each blade 30 and a rear supporting portion 471 disposed at the rear rim 461. The outer peripheral side restricting portion 467 still additionally includes an inner supported portion 472 disposed at the inner end of each blade 30 and an inner supporting portion 473 disposed at the rear rotational shaft 463.

As shown in FIG. 19A, the front supporting portion 469 is disposed on the inner peripheral surface of the front rim 460, and the rear supporting portion 471 is disposed on the inner peripheral surface of the rear rim 461. The front supporting portion 469 is a rod-shaped projection that protrudes from the inner peripheral surface of the front rim 460, and the rear supporting portion 471 is a rod-shaped projection that protrudes from the inner peripheral surface of the rear rim 461. The front supporting portion 469 is inserted in a front insertion hole 468a defined by the front supported portion 468. Likewise, the rear supporting portion 471 is inserted in a rear insertion hole 470a defined by the rear supported portion 470. Although a state in which the rear rotational shaft 463 and the inner supporting portion 473 are spaced away from each other is shown in FIG. 19A and FIG. 19B, the inner supporting portion 473 is fixed to the rear rotational shaft 463, and protrudes outwardly from the rear rotational shaft 463. The rear rotational shaft 463 is a rod-shaped projection that protrudes from the outer peripheral surface of the rear rotational shaft 463. The rear rotational shaft 463 is inserted in an inner insertion hole 472a defined by the inner supported portion 472.

As shown in FIG. 19A, the front insertion hole 468a and the inner insertion hole 472a are long holes that extend in a direction (longitudinal direction) that inclines with respect to the propeller axis A2, and the rear insertion hole 470a is approximately circular. The front supported portion 468 is supported by the front supporting portion 469 rotatably around the front supporting portion 469. Likewise, the rear supported portion 470 is supported by the rear supporting portion 471 rotatably around the rear supporting portion 471, and the inner supported portion 472 is supported by the inner supporting portion 473 rotatably around the inner supporting portion 473. The front insertion hole 468a is a long hole, and therefore the front supported portion 468 is movable in the longitudinal direction of the front insertion hole 468a with respect to the front supporting portion 469. The movement amount of the front supported portion 468 with respect to the front supporting portion 469 is restricted by contact between the front supporting portion 469 and the front supported portion 468 (i.e., the inner surface of the front insertion hole 468a). Likewise, the inner insertion hole 472a is a long hole, and therefore the inner supported portion 472 is movable in the longitudinal direction of the inner insertion hole 472a with respect to the inner supporting portion 473. The movement amount of the inner supported portion 472 with respect to the inner supporting portion 473 is restricted by contact between the inner supporting portion 473 and the inner supported portion 472 (i.e., the inner surface of the inner insertion hole 472a). The relative rotation of the front rim 460 and the rear rim 461 is restricted by contact between the front supporting portion 469 and the front supported portion 468 or contact between the inner supporting portion 473 and the inner supported portion 472.

As shown in FIG. 19A, the propulsion unit 404 additionally includes a central restricting portion 474 that restricts the relative rotation amount of the front rim 460 and the rear rim 461 by restricting the relative rotation amount of the front rotational shaft 462 and the relative rotation amount of the rear rotational shaft 463. The relative rotation amount of the front rim 460 and the rear rim 461 that is allowed by the central restricting portion 474 may be equal to or be different from the relative rotation amount of the front rim 460 and the rear rim 461 that is allowed by the outer peripheral side restricting portion 467. In other words, the relative rotation amount of the front rim 460 and the rear rim 461 may be restricted by the central restricting portion 474 and by the outer peripheral side restricting portion 467, or may be restricted by the central restricting portion 474 or by the outer peripheral side restricting portion 467.

The central restricting portion 474 includes a front engagement portion 475 and a rear engagement portion 476 that are disposed at the front rotational shaft 462 and the rear rotational shaft 463, respectively. The front engagement portion 475 is disposed at the rear end of the front rotational shaft 462, whereas the rear engagement portion 476 is disposed at the front end of the rear rotational shaft 463. The front engagement portion 475 includes a plurality of projections that protrude rearwardly, whereas the rear engagement portion 476 includes a plurality of projections that protrude forwardly. The front engagement portion 475 and the rear engagement portion 476 engage with each other. The front engagement portion 475 and the rear engagement portion 476 are relatively rotatable around the propeller axis A2 in a predetermined angular range. In other words, when the relative rotation amount of the front rotational shaft 462 and the rear rotational shaft 463 reaches a predetermined value, the projections of the front engagement portion 475 and the projections of the rear engagement portion 476 come into contact with each other, and the relative rotation of the front rotational shaft 462 and the rear rotational shaft 463 is restricted.

As shown by a black arrow and a white arrow in FIG. 19A and FIG. 19B, when the front rim 460 and the rear rim 461 relatively rotate around the propeller axis A2, the front supported portion 468 moves in the longitudinal direction of the front insertion hole 468a with respect to the front supporting portion 469. Simultaneously, the rear supported portion 470 rotates around the rear supporting portion 471 with respect to the rear supporting portion 471. Therefore, the inclination angle of each blade 30 with respect to the propeller axis A2 changes. The amount of change of the inclination angle of the blade 30 rises in proportion to an increase in the relative rotation amount of the front rim 460 and the rear rim 461. When the relative rotation amount of the front rim 460 and the rear rim 461 reaches a predetermined value, the relative rotation of the front rim 460 and the rear rim 461 is restricted by at least either one of the outer peripheral side restricting portion 467 and the central restricting portion 474. As a result, the relative rotation amount of the front rim 460 and the rear rim 461 is restricted.

When the power of the engine 6 (see FIG. 1A) is transmitted to the engine output transmission shaft 20, the front rim 460 and the rear rim 461 rotate in a state in which the phase of the front rim 460 and that of the rear rim 461 coincide with each other (in the same phase state) as shown by the black and white arrows in FIG. 19A. At this time, each blade 30 rotates around the propeller axis A2 together with the front and rear rims 460 and 461 in a state in which the front supporting portion 469 has been deviated backwardly with respect to the front supported portion 468. On the other hand, when the electric motor 407 rotates the front rim 460, the front rim 460 and the rear rim 461 rotate in a state in which the phase of the front rim 460 is in a more forward position than the phase of the rear rim 461 (in a state in which the front rim 460 has advanced) as shown by the black and white arrows in FIG. 19B. At this time, each blade 30 rotates around the propeller axis A2 together with the front and rear rims 460 and 461 in a state in which the front supporting portion 469 has been deviated forwardly with respect to the front supported portion 468.

As is understood from a comparison between FIG. 19A and FIG. 19B, a difference in the inclination angle of the blade 30 with respect to the propeller axis A2 exists between the state in which the phase of the front rim 460 and the phase of the rear rim 461 coincide with each other and the state in which the phase of the front rim 460 is in a more forward position than the phase of the rear rim 461. The pitch of the propeller 405 changes in accordance with the inclination angle of the blade 30 with respect to the propeller axis A2. Therefore, the control device X1 can make a two-stage adjustment to the pitch of the propeller 405 within a range in which the front and rear rims 460 and 461 are relatively rotatable while controlling the engine 6 and the electric motor 407. Therefore, the control device X1 can change the characteristics of the propeller 405 between a high torque type and a high output type.

Next, a fifth preferred embodiment of the present invention will be described.

A main difference between the fifth preferred embodiment and the above-described fourth preferred embodiment is that the propeller pitch can be changed in a non-stepped manner and is that a front electric motor that rotationally drives the front rim and a rear electric motor that rotationally drives the rear rim are provided.

Figure 20:
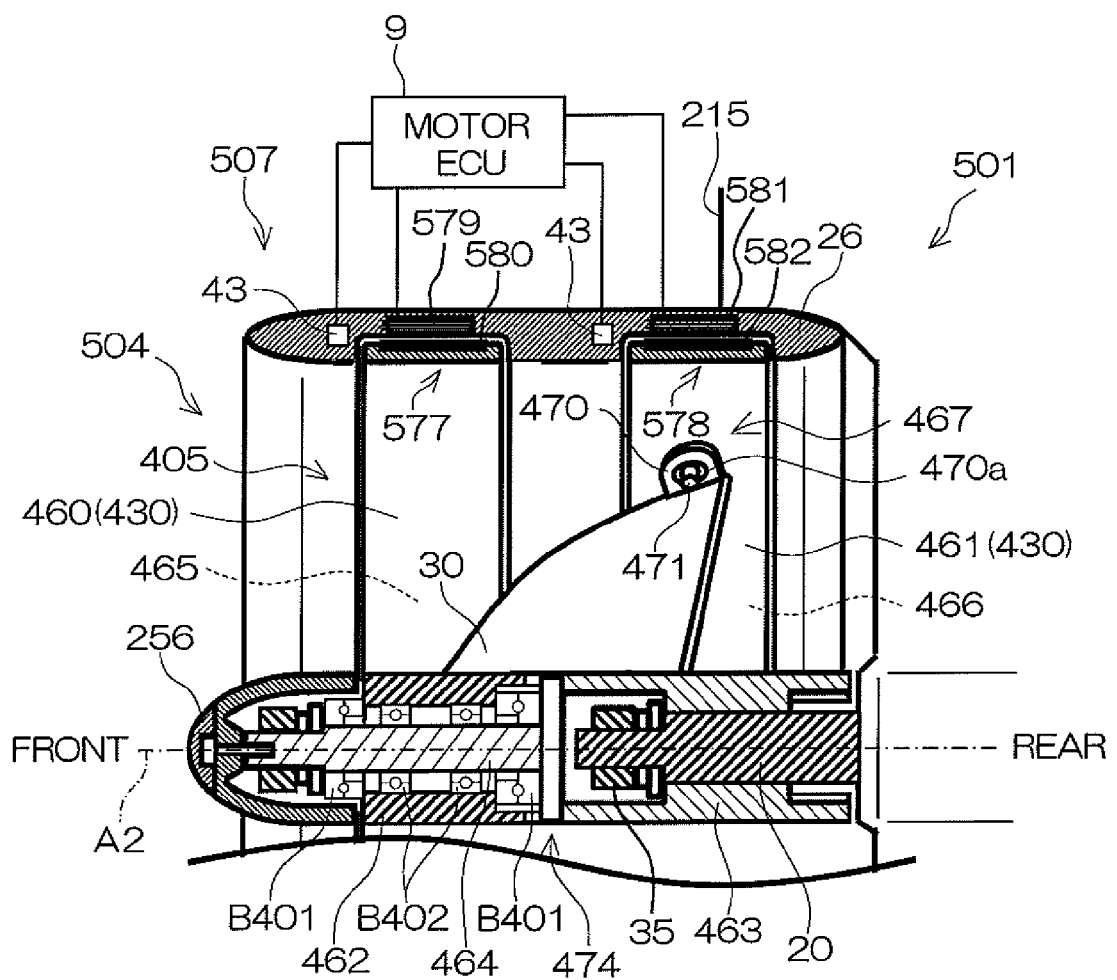
FIG. 20 is a sectional view of a propulsion unit according to a fifth preferred embodiment of the present invention.
Figure 21A:
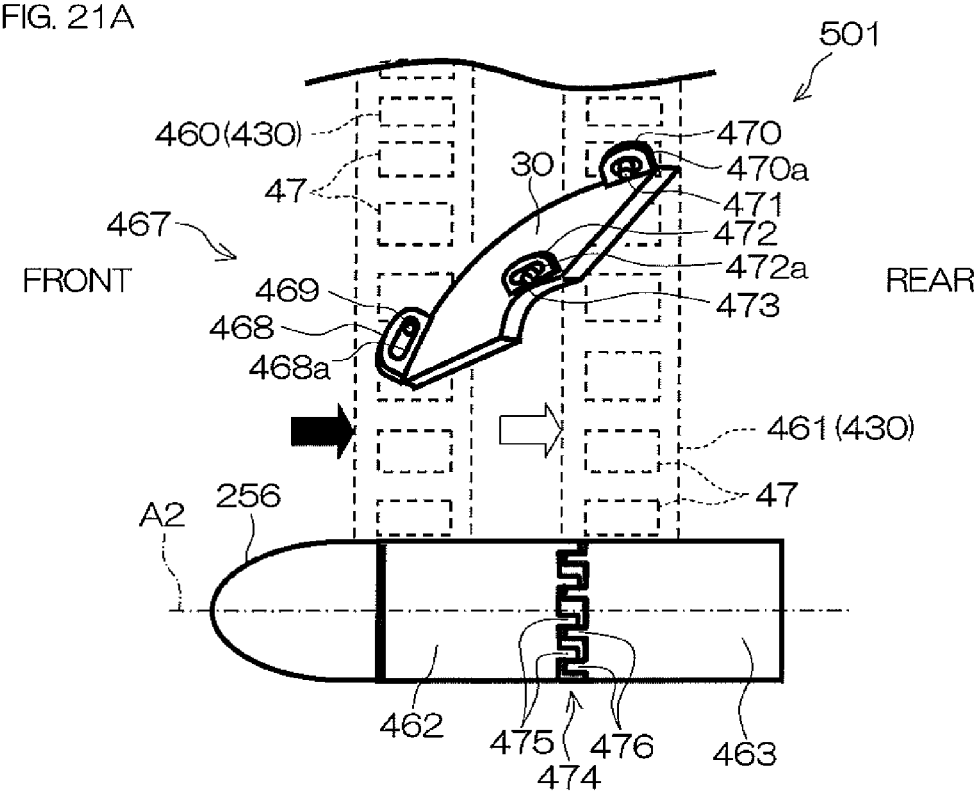
FIG. 21A is a view for describing the inclination angle of a blade with respect to a propeller axis.
Figure 21B:
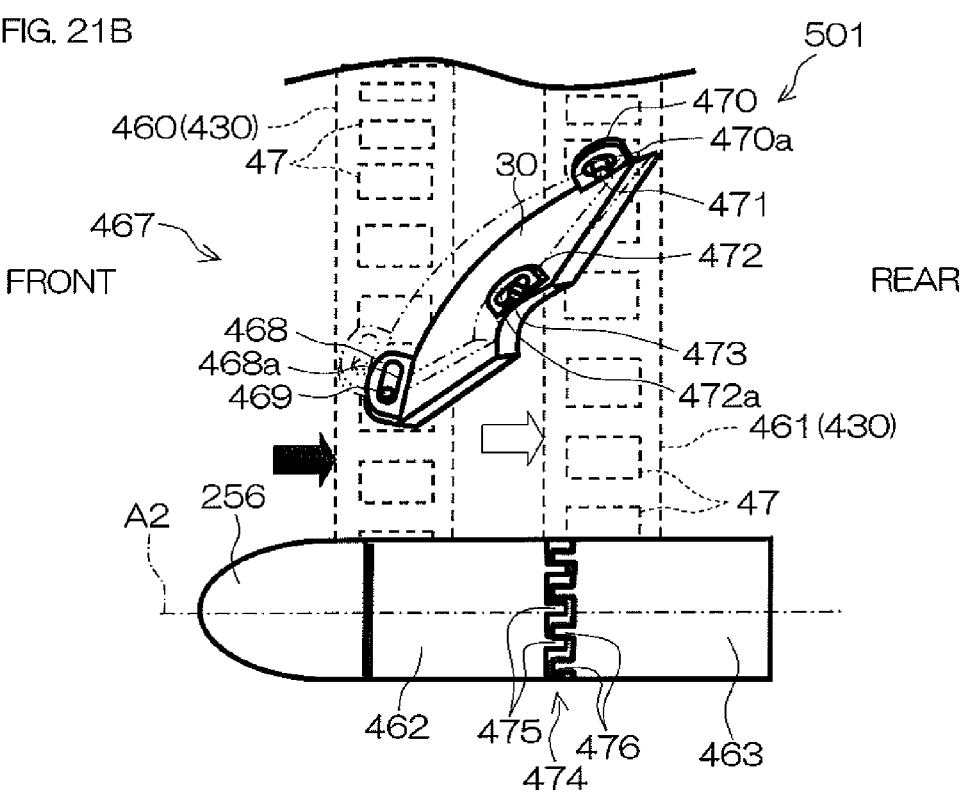
FIG. 21B is a view for describing the inclination angle of the blade with respect to the propeller axis.

FIG. 20 is a sectional view of a propulsion unit 504 according to the fifth preferred embodiment of the present invention. FIG. 21A and FIG. 21B are views for describing the inclination angle of the blade 30 with respect to the propeller axis A2. In FIG. 20 to FIG. 21B, the same reference numerals as in FIGS. 1 to 19B are given to the components corresponding to the components shown in FIGS. 1 to 19B, and a description of these components is omitted.

A marine vessel propulsion device 501 according to the fifth preferred embodiment preferably has the same arrangement as the marine vessel propulsion device 401 according to the fourth preferred embodiment exclusive of the propulsion unit 404. In detail, as shown in FIG. 20, the marine vessel propulsion device 501 includes the propulsion unit 504 instead of the propulsion unit 404. The propulsion unit 504 preferably has the same arrangement as the propulsion unit 404 according to the fourth preferred embodiment exclusive of the electric motor 407. In detail, the propulsion unit 504 includes an electric motor 507 instead of the electric motor 407.

As shown in FIG. 20, the electric motor 507 includes a front electric motor 577 that rotates the front rim 460 around the propeller axis A2 and a rear electric motor 578 that rotates the rear rim 461 around the propeller axis A2. The front electric motor 577 and the rear electric motor 578 are controlled by the motor ECU 9. The front electric motor 577 and the rear electric motor 578 may be the same type motors, or may be different type motors. For example, the front electric motor 577 may be a permanent-magnet type direct-current motor, and the rear electric motor 578 may be a switched reluctance motor.

As shown in FIG. 20, the front electric motor 577 includes an annular front stator 579 defined by a portion of the duct 26 and a cylindrical front rotor 580 defined by a portion of the front rim 460. In other words, the duct 26 includes the front stator 579 disposed between the outer peripheral surface of the duct 26 and the bottom surface of the front annular groove 465, and the front rim 460 includes the front rotor 580 disposed at the outer peripheral portion of the front rim 460. The front stator 579 and the front rotor 580 surround the propeller axis A2. The front stator 579 and the front rotor 580 face each other in the radial direction of the propeller 405 with a space therebetween.

Likewise, the rear electric motor 578 includes an annular rear stator 581 defined by a portion of the duct 26 and a cylindrical rear rotor 582 defined by a portion of the rear rim 461. In other words, the duct 26 includes the rear stator 581 disposed between the outer peripheral surface of the duct 26 and the bottom surface of the rear annular groove 466, and the rear rim 461 includes the rear rotor 582 disposed at the outer peripheral portion of the rear rim 461. The rear stator 581 and the rear rotor 582 surround the propeller axis A2. The rear stator 581 and the rear rotor 582 face each other in the radial direction of the propeller 405 with a space therebetween.

As shown by the black and white arrows in FIG. 21A, the control device X1 causes the front rim 460 and the rear rim 461 to rotate in a state in which the phase of the front rim 460 and that of the rear rim 461 coincide with each other by controlling the front electric motor 577 and the rear electric motor 578. Additionally, as shown by the black and white arrows in FIG. 21B, the control device X1 causes the front rim 460 and the rear rim 461 to rotate in a state in which the phase of the front rim 460 is in a more forward position than the phase of the rear rim 461 by controlling the front electric motor 577 and the rear electric motor 578. The control device X1 can individually control the phase of the front rim 460 and that of the rear rim 461. Therefore, the control device X1 can adjust the pitch of the propeller 405 in a non-stepped manner within a range in which the front and rear rims 460 and 461 are relatively rotatable.

Next, a sixth preferred embodiment of the present invention will be described.

A main difference between the sixth preferred embodiment and the above-described first preferred embodiment is that a dust-proof structure that prevents foreign substances from entering the space between the inner peripheral surface of the duct and the outer peripheral surface of the rim is provided.

Figure 22A:
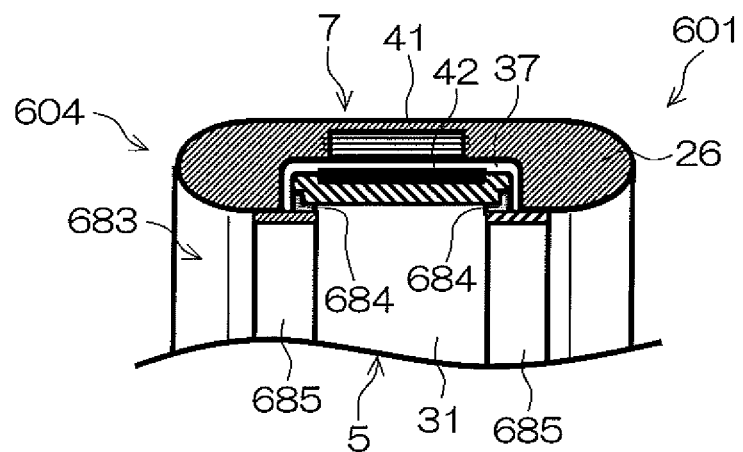
FIG. 22A is a sectional view of an outer peripheral portion of a propulsion unit according to a sixth preferred embodiment of the present invention.
Figure 22B:
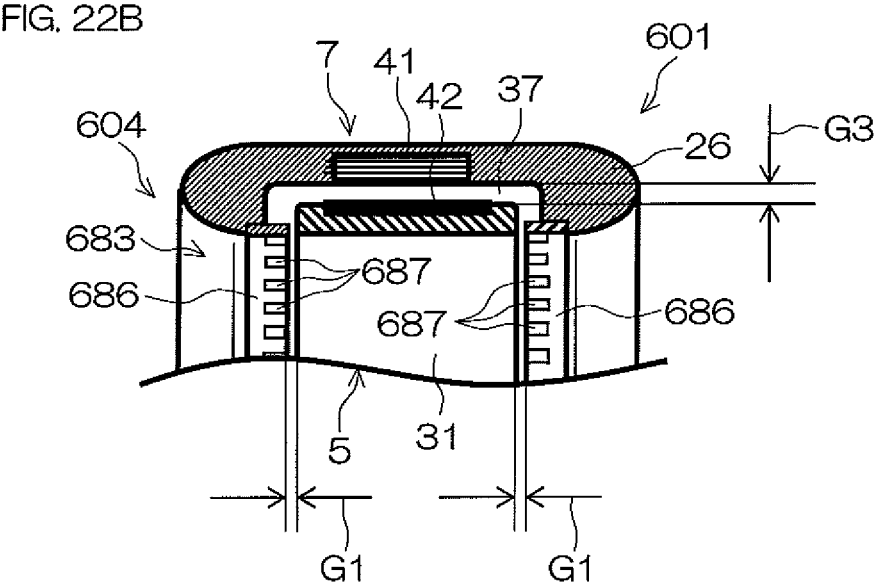
FIG. 22B is a sectional view of an outer peripheral portion of a propulsion unit according to the sixth preferred embodiment of the present invention.
Figure 23:
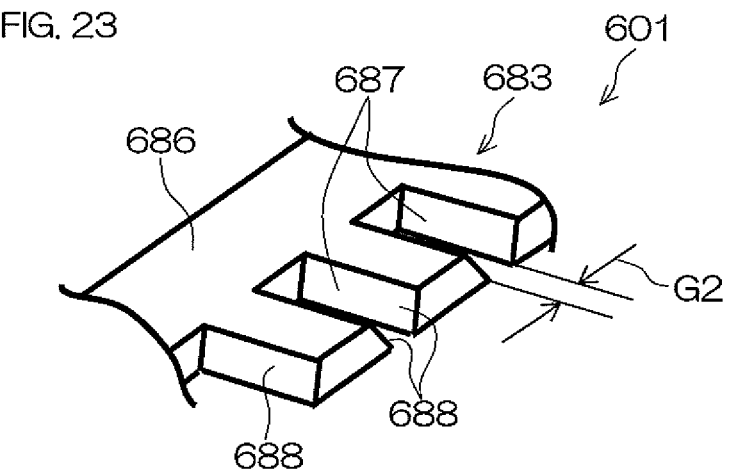
FIG. 23 is an enlarged perspective view of a portion of the propulsion unit of FIG. 22B.

FIG. 22A and FIG. 22B are sectional views of an outer peripheral portion of a propulsion unit 604 according to the sixth preferred embodiment of the present invention. FIG. 23 is an enlarged perspective view of the portion of the propulsion unit 604 of FIG. 22B. In FIG. 22A to FIG. 23, the same reference numerals as in FIGS. 1 to 21B are given to the components equivalent to the components shown in FIGS. 1 to 21B, and a description of these components is omitted.

The propulsion unit 604 of a marine vessel propulsion device 601 according to the sixth preferred embodiment preferably has the same arrangement as the propulsion unit 4 according to the first preferred embodiment. In other words, the propulsion unit 604 has a dust-proof structure 683 that prevents foreign substances from entering the space between the inner peripheral surface of the duct 26 and the outer peripheral surface of the rim 31 in addition to the arrangement of the propulsion unit 4 according to the first preferred embodiment. The dust-proof structure 683 may include a seal 684 shown in FIG. 22A, or may include a dust-proof ring 686 shown in FIG. 22B.

In detail, the dust-proof structure 683 shown in FIG. 22A includes two pairs of seals 684 and securing rings 685 that are spaced apart in the front-rear direction. Each seal 684 has an annular shape that is continuous over its whole circumference. The front seal 684 is disposed at the front end of the rim 31, and the rear seal 684 is disposed at the rear end of the rim 31. The seal 684 is in contact with the rim 31 over its whole circumference. The seal 684 surrounds the securing ring 685 and serves as a pair of seals. The seal 684 is held by the securing ring 685 and serves as the pair of seals. The seal 684 is pressed against the rim 31 by the securing ring 685. As a result, the seal 684 is in close contact with the rim 31. The securing ring 685 extends from the inside of the seal 684 toward the inside of the duct 26. The securing ring 685 is fixed to the duct 26. Therefore, the seal 684 is fixed to the duct 26 through the securing ring 685 serving as the pair of seals. When the rim 31 rotates around the propeller axis A2 with respect to the duct 26, the rim 31 and the seal 684 relatively rotate around the propeller axis A2 in a state in which the seal 684 is in close contact with the rim 31.

The space between the inner peripheral surface of the duct 26 and the outer peripheral surface of the rim 31 is filled with a lubricant. The front seal 684 and front securing ring 685 close a gap between the front end of the rim 31 and the duct 26 in the axial direction, whereas the rear seal 684 and rear securing ring 685 close a gap between the rear end of the rim 31 and the duct 26 in the axial direction. Therefore, the space between the inner peripheral surface of the duct 26 and the outer peripheral surface of the rim 31 is sealed by the dust-proof structure 683. Therefore, the lubricant is prevented from leaking from between the duct 26 and the rim 31. Additionally, foreign substances, such as small stones or water, are prevented from entering the space between the duct 26 and the rim 31.

On the other hand, the dust-proof structure 683 shown in FIG. 22B includes two dust-proof rings 686 spaced apart in the front-rear direction. The dust-proof ring 686 is fixed to the duct 26. The front dust-proof ring 686 extends rearwardly from the inside of the front end of the duct 26. A gap G1 in the axial direction is provided between the rear end of the front dust-proof ring 686 and the front end of the duct 26. Likewise, the rear dust-proof ring 686 extends forwardly from the inside of the rear end of the duct 26. A gap G1 in the axial direction is provided between the front end of the rear dust-proof ring 686 and the rear end of the duct 26.

The front dust-proof ring 686 includes a plurality of slits 687 that extend forwardly from its rear end. Likewise, the rear dust-proof ring 686 includes a plurality of slits 687 that extend rearwardly from its front end. The slits 687 are arranged at equal intervals in the circumferential direction. As shown in FIG. 23, the slit 687 is disposed between two oblique surfaces 688 that face each other in the circumferential direction. The slit 687 leads to a space between the inner peripheral surface of the duct 26 and the outer peripheral surface of the rim 31. A minimum gap G2 of the dust-proof ring 686 (i.e., a minimum width of the slit 687) is narrower than a minimum gap G1 in the axial direction between the dust-proof ring 686 and the rim 31. Additionally, the minimum gap G1 in the axial direction between the dust-proof ring 686 and the rim 31 is narrower than a minimum gap G3 in the radial direction between the duct 26 and the rim 31.

Water that has entered the inside of the duct 26 passes through the gap G1 between one of the two dust-proof rings 686 and the rim 31 and through the gap G2 of one of the two dust-proof rings 686, and flows into the space between the inner peripheral surface of the duct 26 and the outer peripheral surface of the rim 31. Thereafter, this water passes through the gap G1 between the other dust-proof ring 686 and the rim 31 and through the gap G2 of the other dust-proof ring 686, and flows out from the space between the inner peripheral surface of the duct 26 and the outer peripheral surface of the rim 31. The dust-proof rings 686 and the rim 31 prevent foreign substances greater in size than the gaps G1 and G2 from entering the space between the inner peripheral surface of the duct 26 and the outer peripheral surface of the rim 31. Additionally, the gap G1 and the gap G2 are narrower than the gap G3 in the radial direction between the duct 26 and the rim 31, and therefore foreign substances greater in size than the gap G3 can be prevented from entering the space between the duct 26 and the rim 31 and obstructing the rotation of the rim 31. Still additionally, water flows through the space between the duct 26 and the rim 31, and therefore small foreign substances that exist between the duct 26 and the rim 31 can be discharged by a water stream.

Next, a seventh preferred embodiment of the present invention will be described.

A main difference between the seventh preferred embodiment and the above-described second preferred embodiment is that an illuminant that emits light is disposed on the propeller.

Figure 24:
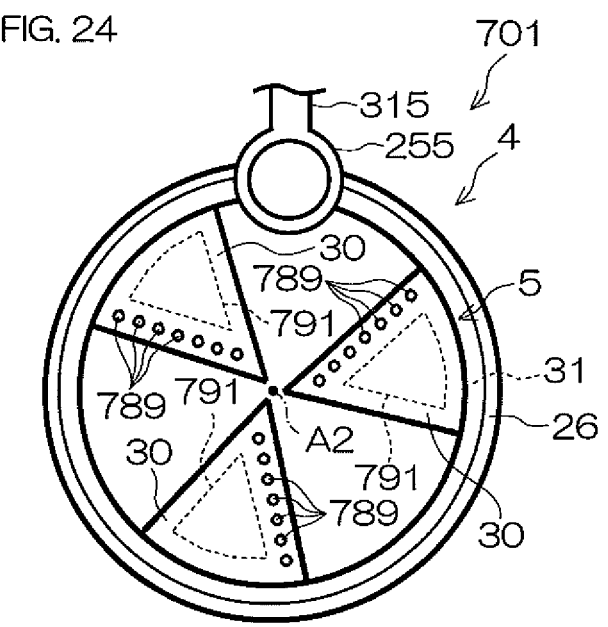
FIG. 24 is a rear view of a propulsion unit according to a seventh preferred embodiment of the present invention.
Figure 25A:
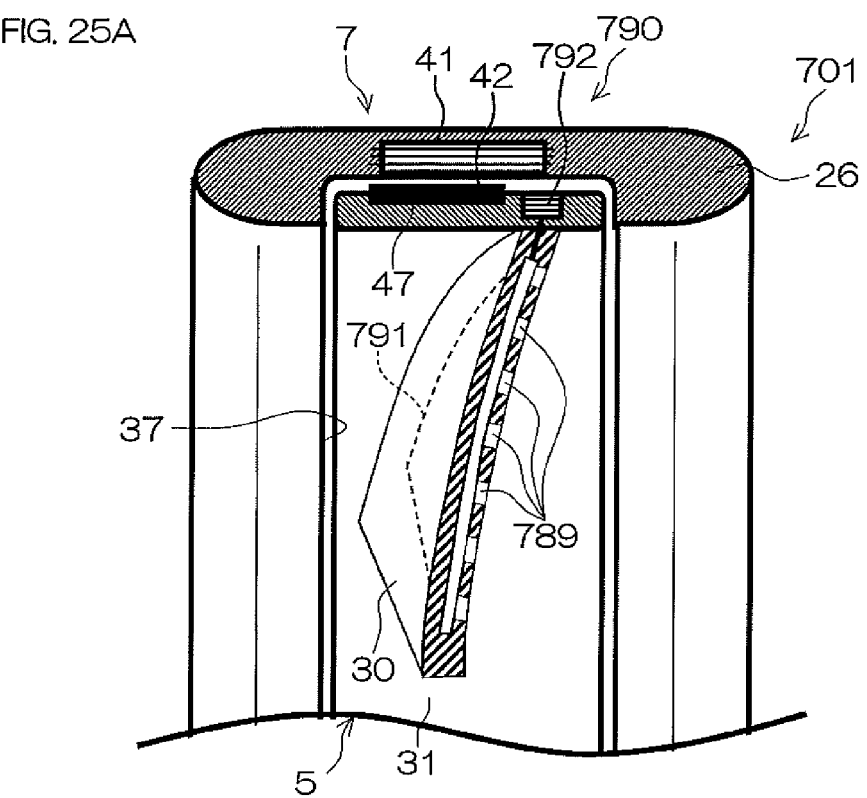
FIG. 25A is a sectional view of a portion of the propulsion unit according to the seventh preferred embodiment of the present invention.
Figure 25B:
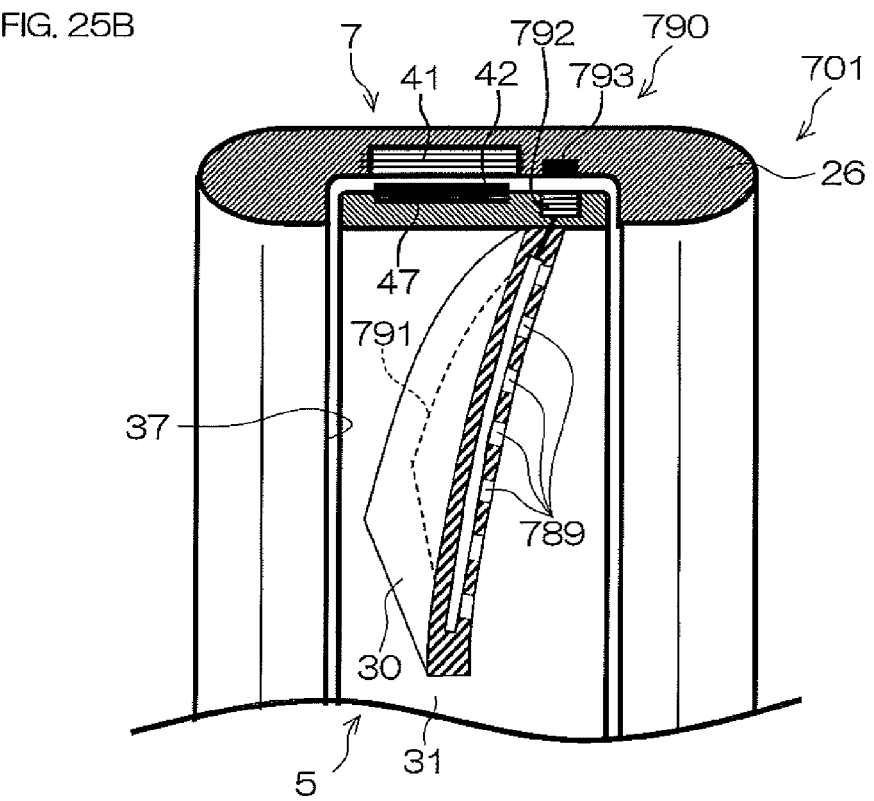
FIG. 25B is a sectional view of a portion of the propulsion unit according to the seventh preferred embodiment of the present invention.

FIG. 24 is a rear view of the propulsion unit 204 according to the seventh preferred embodiment of the present invention. FIG. 25A and FIG. 25B are sectional views of a portion of the propulsion unit 204 according to the seventh preferred embodiment of the present invention. In FIG. 24 to FIG. 25B, the same reference numerals as in FIGS. 1 to 23 are given to the components corresponding to the components shown in FIGS. 1 to 23, and a description of these components is omitted.

A marine vessel propulsion device 701 according to the seventh preferred embodiment preferably includes the same arrangement as the marine vessel propulsion device 201 according to the second preferred embodiment. In other words, as shown in FIG. 25A and FIG. 25B, the marine vessel propulsion device 701 includes a plurality of illuminants 789 each of which emits light, a power generator 790 that generates electric power, and a plurality of substrates (flexible printed boards) 791 that supply electric power from the power generator 790 to the illuminants 789 in addition to the arrangement of the marine vessel propulsion device 201 according to the second preferred embodiment. The illuminant 789 may be an electric lamp, or may be an LED (light emitting diode). As shown in FIG. 24, each blade 30 holds the illuminants 789. The illuminants 789 held by the one shared blade 30 are arranged to define a linear row that extends in the radial direction.

As shown in FIG. 25A and FIG. 25B, the illuminant 789 is embedded in the blade 30, and a portion of the illuminant 789 is exposed from the back surface of the blade 30. The substrates 791 are embedded in the blades 30, respectively. The substrate 791 is electrically connected to the illuminants 789 held by the shared blade 30. An electric circuit that controls electric power to be supplied to the illuminants 789 is mounted on the substrate 791. The substrate 791 is electrically connected to the power generator 790. The substrate 791 allows the illuminants 789 to emit light by supplying electric power from the power generator 790 to the illuminants 789. The power generator 790 may be arranged to include a power generation coil 792 shown in FIG. 25A, or may be arranged to include the power generation coil 792 and a power generation magnet 793 shown in FIG. 25B.

In detail, the power generator 790 shown in FIG. 25A includes a plurality of power generation coils 792 attached to the rim 31. Each power generation coil 792 is attached to the rim 31 at a position at which it faces the stator 41. The power generation coils 792 rotate around the propeller axis A2 together with the rim 31. When the electric motor 7 rotates the propeller 5, the stator 41 and the power generation coils 792 relatively rotate, and a magnetic flux passing through the power generation coils 792 changes. Therefore, an electric current (induced current) is generated in the power generation coils 792. Therefore, the illuminants 789 emit light when the electric motor 7 rotates the propeller 5.

The substrate 791 changes the light emission state of the illuminant 789 in accordance with a current value generated in the power generation coils 792. An electric current generated in the power generation coils 792 changes in accordance with the rotation speed of the propeller 5. Additionally, when the propeller 5 is rotated with a high torque, electric power supplied to the stator 41 is greater than with a low torque even if the rotation speed of the propeller 5 is the same, and therefore the electric current generated in the power generation coils 792 is increased. Therefore, the light emission state of the illuminant 789 changes in accordance with a rotation state of the propeller 5 including its rotation speed and torque.

On the other hand, the power generator 790 shown in FIG. 25B includes a plurality of power generation coils 792 attached to the rim 31 and a plurality of power generation magnets 793 attached to the duct 26. Each power generation coil 792 and each power generation magnet 793 face each other in the radial direction. The power generation coils 792 rotate around the propeller axis A2 together with the rim 31. When the electric motor 7 rotates the propeller 5, the power generation coils 792 and the power generation magnets 793 relatively rotate, and a magnetic flux passing through the power generation coils 792 changes. Likewise, when the engine 6 (see FIG. 1A) rotates the propeller 5, the power generation coils 792 and the power generation magnets 793 relatively rotate, and a magnetic flux passing through the power generation coils 792 changes. Therefore, an electric current is generated in the power generation coils 792. Therefore, the illuminants 789 emit light when at least one of the engine 6 and the electric motor 7 rotates the propeller 5. A light emission state of each illuminant 789 changes in accordance with a rotation state of the propeller 5.

Next, an eighth preferred embodiment of the present invention will be described.

A main difference between the eighth preferred embodiment and the above-described first preferred embodiment is that illuminants each of which emits light are disposed at the duct.

Figure 26:
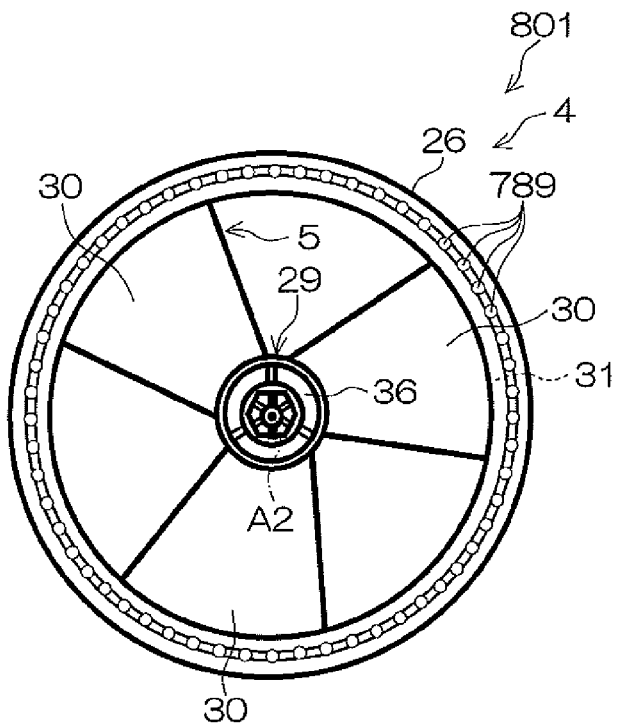
FIG. 26 is a rear view of a propulsion unit according to an eighth preferred embodiment of the present invention.
Figure 27A:
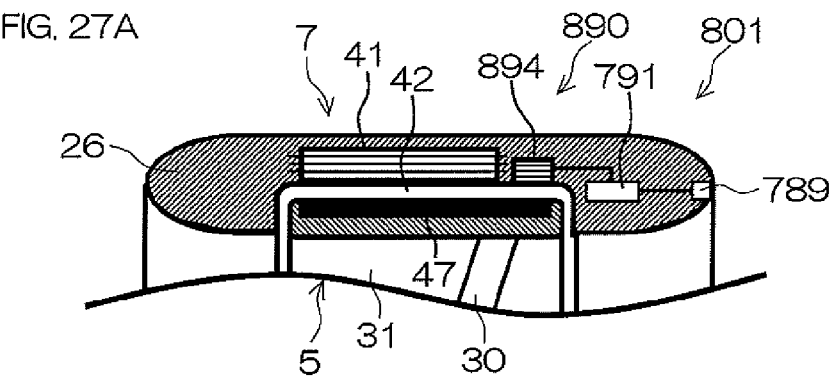
FIG. 27A is a sectional view of a portion of the propulsion unit according to the eighth preferred embodiment of the present invention.
Figure 27B:
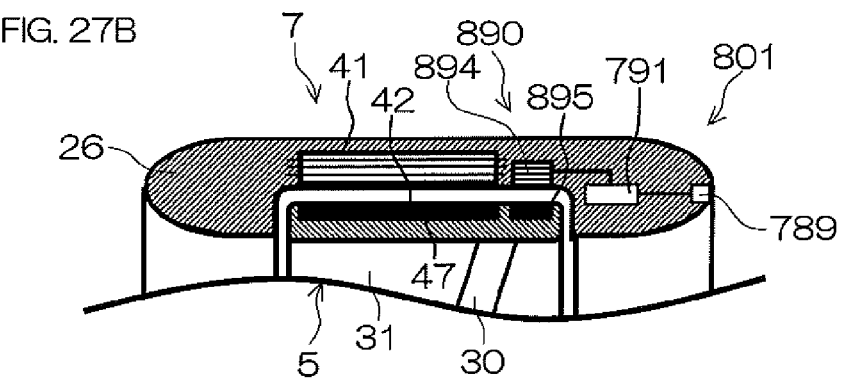
FIG. 27B is a sectional view of a portion of the propulsion unit according to the eighth preferred embodiment of the present invention.

FIG. 26 is a rear view of the propulsion unit 4 according to the eighth preferred embodiment of the present invention. FIG. 27A and FIG. 27B are sectional views showing a portion of the propulsion unit 4 according to the eighth preferred embodiment of the present invention. In FIG. 26 to FIG. 27B, the same reference numerals as in FIGS. 1 to 25B are given to the components corresponding to the components shown in FIGS. 1 to 25B, and a description of these components is omitted.

A marine vessel propulsion device 801 according to the eighth preferred embodiment preferably includes the same arrangement as the marine vessel propulsion device 1 according to the first preferred embodiment. In detail, as shown in FIG. 27A and FIG. 27B, the marine vessel propulsion device 801 includes a plurality of illuminants 789 each of which emits light, a power generator 890 that generates electric power, and a plurality of substrates 791 that supply electric power from the power generator 890 to the illuminants 789 in addition to the arrangement of the marine vessel propulsion device 1 according to the second preferred embodiment. As shown in FIG. 26, the duct 26 holds the illuminants 789. The illuminants 789 held by the duct 26 are disposed annularly along the back surface of the duct 26.

As shown in FIG. 27A and FIG. 27B, the illuminants 789 are embedded in the duct 26, and a portion thereof is exposed from the back surface of the duct 26. The substrates 791 are embedded in the duct 26. The substrates 791 are electrically connected to the illuminants 789. The substrates 791 are also electrically connected to the power generator 890. The substrates 791 allow the illuminants 789 to emit light by supplying electric power from the power generator 890 to the illuminants 789. The power generator 890 may be arranged to include the power generation coils 894 shown in FIG. 27A, or may be arranged to include the power generation coils 894 and the power generation magnets 895 shown in FIG. 27B.

In detail, the power generator 890 shown in FIG. 27A includes a plurality of power generation coils 894 attached to the duct 26. Each power generation coil 894 is attached to the duct 26 at a position at which it faces the magnet 47. The magnets 47 and the power generation coils 894 relatively rotate when the electric motor 7 rotates the propeller 5, and a magnetic flux passing through the power generation coils 894 changes. Likewise, when the engine 6 (see FIG. 1A) rotates the propeller 5, the magnets 47 and the power generation coils 894 relatively rotate, and a magnetic flux passing through the power generation coils 894 changes. Therefore, an electric current is generated in the power generation coils 894. Therefore, each illuminant 789 emits light when at least one of the engine 6 and the electric motor 7 rotates the propeller 5. A light emission state of each illuminant 789 changes in accordance with a rotation state of the propeller 5.

On the other hand, the power generator 890 shown in FIG. 27B includes a plurality of power generation coils 894 attached to the duct 26 and a plurality of power generation magnets 895 attached to the rim 31. Each power generation coil 894 and each power generation magnet 895 face each other in the radial direction. The power generation magnets 895 rotate around the propeller axis A2 together with the rim 31. When the electric motor 7 rotates the propeller 5, the power generation coils 894 and the power generation magnets 895 relatively rotate, and a magnetic flux passing through the power generation coils 894 changes. Likewise, when the engine 6 (see FIG. 1A) rotates the propeller 5, the power generation coils 894 and the power generation magnets 895 relatively rotate, and a magnetic flux passing through the power generation coils 894 changes. Therefore, an electric current is generated in the power generation coils 894. Therefore, each illuminant 789 emits light when at least one of the engine 6 and the electric motor 7 rotates the propeller 5. A light emission state of each illuminant 789 changes in accordance with a rotation state of the propeller 5.

Although the first to eighth preferred embodiments of the present invention have been described as above, the present invention is not limited to the contents of the first to eighth preferred embodiments, and can be variously modified within the scope of the appended claims.

For example, as described in the first to eighth preferred embodiments, the electric motor is preferably a radial gap motor including a stator and a rotor that face each other in the radial direction. However, the electric motor may be an axial gap motor including a stator and a rotor that face each other in the axial direction.

Additionally, at least two arrangements of the first to eighth preferred embodiments may be combined together. For example, in the third preferred embodiment, a structure in which the rotational shaft is not disposed at the center of the propeller has been described. However, the rotational shaft of the propeller according to the first preferred embodiment may be disposed at the center of the propeller according to the third preferred embodiment. In other words, an arrangement according to the first preferred embodiment and an arrangement according to the second preferred embodiment may be combined together. Additionally, in the third to sixth preferred embodiments, a structure in which illuminants are preferably not disposed has been described. However, illuminants according to the seventh and eighth preferred embodiments may be disposed at the propulsion unit according to the third to sixth preferred embodiments.

Additionally, as described in the first to eighth preferred embodiments, the motor ECU detects the rotation speed of the propeller preferably based on a detection value of the propeller speed detector. However, the motor ECU may detect the rotation angle of the electric motor (rotor position) from the induced voltage of the electric motor, and may calculate the rotation speed of the propeller based on the rotation angle of the electric motor. In other words, the motor ECU may be provided with a propeller rotation speed detecting portion that detects the rotation speed of the propeller from the induced voltage of the electric motor. In this case, a propeller speed detector is not necessarily required to be provided.

Additionally, although the engine ECU and the motor ECU are preferably connected to a shared battery disposed in the vessel in the first to eighth preferred embodiments, the engine ECU and the motor ECU may be connected to mutually different batteries, respectively. As a result, the battery connected to the motor ECU can be a high-voltage battery in order to increase the output of the motor. In this case, the two batteries may be connected thereto through a DC-DC converter, and one-way or two-way electric power may be supplemented between the two batteries.

Additionally, as described in the eighth preferred embodiment, the electric power from the power generator that generates electric power in response to the rotation of the propeller is preferably supplied to the illuminants. However, the power generator is not necessarily required to be provided if the illuminants are disposed at the fixing portion (the duct) as in the eighth preferred embodiment. In other words, electric power from a motor power source (i.e., the battery) that supplies electric power to the electric motor may be supplied to the illuminants. In this case, the motor ECU may control the light emission state of the illuminants by controlling the power supply to the illuminants.

Additionally, as described in the first to eighth preferred embodiments, the electric motor preferably directly rotates the propeller. However, the electric motor may be disposed between the forward/rearward switching mechanism and the propeller, and the propeller may be rotated by an intermediate member (e.g., an engine output transmission shaft) that rotates together with the propeller. In other words, the electric motor may be arranged to rotate a portion (i.e., an intermediate member or propeller) downstream of the forward/rearward switching mechanism. According to this arrangement, the electric motor can rotate the propeller regardless of the state of the forward/rearward switching mechanism. Therefore, the electric motor can change a difference between the rotation speed of the engine and the rotation speed of the propeller regardless of the state of the forward/rearward switching mechanism.

Additionally, as described in the first preferred embodiment and as shown in FIG. 12, the lever position preferably corresponds to an output amount. However, the lever position may correspond to the rotation speed of the propeller.

In detail, in a marine vessel propulsion device in which only an engine is provided as a power source, the lever position corresponds to a throttle opening degree, and therefore a relationship between the lever position and the rotation speed of the propeller changes in accordance with, for example, a loaded condition of the marine vessel. Additionally, if the marine vessel is propelled at a lower speed than the speed corresponding to the rotation speed of the propeller in a state in which the engine is idling, the dog clutch is required to be repeatedly engaged and disengaged. Additionally, even if the forward/rearward switching mechanism is in a neutral state, the engine output transmission shaft is rotated by oil or the like in the forward/rearward switching mechanism, and the propeller rotates. Therefore, it is impossible to completely stop the rotation of the propeller. Therefore, in a marine vessel propulsion device in which only an engine is provided as a power source, a relationship between the lever position and the rotation speed of the propeller is not constant.

On the other hand, in the hybrid type marine vessel propulsion device according to the first to eighth preferred embodiments, a relationship between the lever position and the rotation speed of the propeller can be maintained at a fixed level by adjusting the rotation speed of the propeller by the electric motor. Additionally, the propeller can be rotated at a low speed by the electric motor, and therefore there is no need to repeatedly engage and disengage the dog clutch. Still additionally, even if torque that rotates the propeller is input to the engine output transmission shaft when the forward/rearward switching mechanism is in a neutral state, an opposite direction torque, which is opposite in direction to torque applied from the engine output transmission shaft to the propeller, can be applied from the electric motor to the propeller. Therefore, the marine vessel propulsion device according to the first to eighth preferred embodiments can completely stop the rotation of the propeller.

The present application corresponds to Japanese Patent Application No. 2011-244662 filed in the Japan Patent Office on Nov. 8, 2011, and the entire disclosure of the application is incorporated herein by reference.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A marine vessel propulsion device comprising:
a propeller that includes a plurality of blades and a rim surrounding the plurality of blades around a propeller axis and that is rotatable around the propeller axis;
a duct that surrounds the propeller around the propeller axis;
an internal combustion engine that rotates the propeller relative to the duct;
an electric motor that rotates the propeller relative to the duct by rotating the rim;
a shift operating member that is operable by a vessel operator in order to switch a direction of a thrust force generated by the marine vessel propulsion device between a forward direction and a rearward direction;
a forward/rearward switching mechanism that performs switching among a forward state in which the internal combustion engine and the propeller are connected together so as to generate a thrust force in the forward direction, a neutral state in which a connection between the internal combustion engine and the propeller is released, and a rearward state in which the internal combustion engine and the propeller are connected together so as to generate a thrust force in the rearward direction;
an engine speed detector that detects a rotation speed of the internal combustion engine;
a propeller speed detector that detects a rotation speed of the propeller; and
a control device programmed to perform a shift-in control that switches the forward/rearward switching mechanism from the neutral state to the forward state or to the rearward state only when a speed difference that is a difference between the rotation speed of the internal combustion engine and the rotation speed of the propeller falls within a predetermined range, in response to a shift-in operation performed on the shift operating member in order to switch the forward/rearward switching mechanism from the neutral state to the forward state or to the rearward state.

2. The marine vessel propulsion device according to claim 1, wherein the propeller further includes a propeller rotational shaft that extends along the propeller axis and that rotates around the propeller axis together with the plurality of blades; and
the internal combustion engine rotates the propeller relative to the duct by rotating the propeller rotational shaft.

3. The marine vessel propulsion device according to claim 1, wherein the electric motor includes a stator defined by at least one portion of the duct and a rotor defined by at least one portion of the rim.

4. The marine vessel propulsion device according to claim 3, wherein the rim includes a magnet that defines at least one portion of the rotor.

5. The marine vessel propulsion device according to claim 3, wherein the electric motor is a reluctance motor.

6. The marine vessel propulsion device according to claim 1, wherein, in a case that the speed difference does not fall within the predetermined range when the shift-in operation is performed on the shift operating member, the control device is programmed to change the speed difference so as to fall within the predetermined range by controlling at least one of the internal combustion engine and the electric motor, and to then perform the shift-in control.

7. A marine vessel propulsion device comprising:
a propeller that includes a plurality of blades and a rim surrounding the plurality of blades around a propeller axis and that is rotatable around the propeller axis;
a duct that surrounds the propeller around the propeller axis;
an internal combustion engine that rotates the propeller relative to the duct;
an electric motor that rotates the propeller relative to the duct by rotating the rim;
a shift operating member that is operable by a vessel operator in order to switch a direction of a thrust force generated by the marine vessel propulsion device between a forward direction and a rearward direction;
a forward/rearward switching mechanism that performs switching among a forward state in which the internal combustion engine and the propeller are connected together so as to generate a thrust force in the forward direction, a neutral state in which a connection between the internal combustion engine and the propeller is released, and a rearward state in which the internal combustion engine and the propeller are connected together so as to generate a thrust force in the rearward direction;
an engine speed detector that detects a rotation speed of the internal combustion engine;
a propeller speed detector that detects a rotation speed of the propeller; and
a control device programmed to control the forward/rearward switching mechanism; wherein
when a reverse operation is performed on the shift operating member to switch the forward/rearward switching mechanism from either one of the forward state and the rearward state to the other one of the forward state and the rearward state, the control device is programmed to decrease the rotation speed of the propeller in a pre-reverse direction to a cut-off speed by controlling the electric motor, and to then switch the forward/rearward switching mechanism from the forward state or from the rearward state to the neutral state.

8. The marine vessel propulsion device according to claim 7, wherein the control device is programmed to switch the forward/rearward switching mechanism from the forward state or from the rearward state to the neutral state, and to then rotate the propeller in a post-reverse direction opposite to the pre-reverse direction by controlling the electric motor, and to switch the forward/rearward switching mechanism from the neutral state to the forward state or to the rearward state in a state in which the rotation speed of the propeller in the post-reverse direction is not less than a connection speed.

9. A marine vessel propulsion device comprising:
a propeller that includes a plurality of blades and a rim surrounding the plurality of blades around a propeller axis and that is rotatable around the propeller axis;

a duct that surrounds the propeller around the propeller axis;
an internal combustion engine that rotates the propeller relative to the duct;
an electric motor that rotates the propeller relative to the duct by rotating the rim;
a shift operating member that is operable by a vessel operator in order to switch a direction of a thrust force generated by the marine vessel propulsion device between a forward direction and a rearward direction;
a forward/rearward switching mechanism that performs switching among a forward state in which the internal combustion engine and the propeller are connected together so as to generate a thrust force in the forward direction, a neutral state in which a connection between the internal combustion engine and the propeller is released, and a rearward state in which the internal combustion engine and the propeller are connected together so as to generate a thrust force in the rearward direction;
an engine speed detector that detects a rotation speed of the internal combustion engine;
a propeller speed detector that detects a rotation speed of the propeller; and
a control device that is programmed to control the forward/rearward switching mechanism; wherein
when a shift-out operation is performed on the shift operating member to switch the forward/rearward switching mechanism from the forward state or from the rearward state to the neutral state, the control device is programmed to decrease the rotation speed of the propeller in a pre-shift-out direction to a cut-off speed by controlling the electric motor, and to then switch the forward/rearward switching mechanism from the forward state or from the rearward state to the neutral state.

10. A marine vessel propulsion device comprising:
a propeller that includes a plurality of blades and a rim surrounding the plurality of blades around a propeller axis and that is rotatable around the propeller axis;
a duct that surrounds the propeller around the propeller axis;
an internal combustion engine that rotates the propeller relative to the duct;
an electric motor that rotates the propeller relative to the duct by rotating the rim;
a drive shaft that extends in a vertical or substantially vertical direction and that is rotationally driven by the internal combustion engine;
a forward/rearward switching mechanism that includes an output shaft extending in a front-rear direction, that transmits rotation of the drive shaft to the output shaft, and that changes a rotation direction of the output shaft relative to a rotation direction of the drive shaft; and
an engine output transmission shaft that transmits rotation of the output shaft to the propeller; wherein
the propeller is disposed behind the forward/rearward switching mechanism, and the output shaft and the engine output transmission shaft are disposed coaxially.

11. A marine vessel propulsion device comprising:
a propeller that includes a plurality of blades and a rim surrounding the plurality of blades around a propeller axis and that is rotatable around the propeller axis;
a duct that surrounds the propeller around the propeller axis;
an internal combustion engine that rotates the propeller relative to the duct;
an electric motor that rotates the propeller relative to the duct by rotating the rim;
a drive shaft that extends in a vertical or substantially vertical direction and that is rotationally driven by the internal combustion engine;
a forward/rearward switching mechanism that includes an output shaft extending in a front-rear direction, that transmits rotation of the drive shaft to the output shaft, and that changes a rotation direction of the output shaft relative to a rotation direction of the drive shaft; and
an engine output transmission shaft that transmits rotation of the output shaft to the propeller; wherein
the propeller is disposed in front of the forward/rearward switching mechanism, and the output shaft and the engine output transmission shaft are disposed coaxially.

12. A marine vessel propulsion device comprising:
a propeller that includes a plurality of blades and a rim surrounding the plurality of blades around a propeller axis and that is rotatable around the propeller axis;
a duct that surrounds the propeller around the propeller axis;
an internal combustion engine that rotates the propeller relative to the duct;
an electric motor that rotates the propeller relative to the duct by rotating the rim;
a drive shaft that extends in a vertical or substantially vertical direction and that is rotationally driven by the internal combustion engine;
a forward/rearward switching mechanism that includes an output shaft extending in a front-rear direction, that transmits rotation of the drive shaft to the output shaft, and that changes a rotation direction of the output shaft relative to a rotation direction of the drive shaft;
an engine output transmission shaft that transmits rotation of the output shaft to the propeller; and
a gear transmission mechanism that transmits power of the internal combustion engine to the rim; wherein
the gear transmission mechanism includes a driving gear that rotates together with the engine output transmission shaft and a driven gear to which rotation of the driving gear is transmitted and that rotates together with the rim; and
the propeller is disposed below the output shaft.

13. A marine vessel propulsion device comprising:
a propeller that includes a plurality of blades and a rim surrounding the plurality of blades around a propeller axis and that is rotatable around the propeller axis;
a duct that surrounds the propeller around the propeller axis;
an internal combustion engine that rotates the propeller relative to the duct; and
an electric motor that rotates the propeller relative to the duct by rotating the rim; wherein
the rim includes a front rim and a rear rim both of which support the plurality of blades so that an inclination angle of the plurality of blades relative to the propeller axis changes in accordance with a relative rotation around the propeller axis;
the internal combustion engine rotates either one of the front rim and the rear rim;
the electric motor rotates the other one of the front rim and the rear rim; and
the internal combustion engine and the electric motor change a pitch of the propeller by relatively rotating the front rim and the rear rim around the propeller axis.

14. A marine vessel propulsion device comprising:
a propeller that includes a plurality of blades and a rim surrounding the plurality of blades around a propeller axis and that is rotatable around the propeller axis;

a duct that surrounds the propeller around the propeller axis;
an internal combustion engine that rotates the propeller relative to the duct; and
an electric motor that rotates the propeller relative to the duct by rotating the rim; wherein
the rim includes a front rim and a rear rim both of which support the plurality of blades so that an inclination angle of the plurality of blades relative to the propeller axis changes in accordance with relative rotation around the propeller axis; and
the electric motor includes a front electric motor that rotates the front rim and a rear electric motor that rotates the rear rim; and
the electric motor changes a pitch of the propeller by relatively rotating the front rim and the rear rim around the propeller axis.

15. The marine vessel propulsion device according to claim 14, further comprising a control device programmed to control a relative rotation amount of the front rim and the rear rim with respect to each other by controlling the front electric motor and the rear electric motor.

16. The marine vessel propulsion device according to claim 13, further comprising a rotation amount restricting portion that restricts a relative rotation amount of the front rim and the rear rim.

17. The marine vessel propulsion device according to claim 16, wherein the rotation amount restricting portion includes a supporting portion disposed at one of the rim and the plurality of blades, and a supported portion that is disposed at the other one of the rim and the plurality of blades and that defines a hole in which the supporting portion is inserted.

18. The marine vessel propulsion device according to claim 16, wherein the propeller further includes a front rotational shaft that extends along the propeller axis and that rotates around the propeller axis together with the front rim, and a rear rotational shaft that extends along the propeller axis and that rotates around the propeller axis together with the rear rim; and
the rotation amount restricting portion includes a front engagement portion and a rear engagement portion that are disposed on the front rotational shaft and on the rear rotational shaft, respectively, and that engage with each other so as to be relatively rotatable around the propeller axis within a predetermined angular range.

19. A marine vessel propulsion device comprising:
a propeller that includes a plurality of blades and a rim surrounding the plurality of blades around a propeller axis and that is rotatable around the propeller axis;
a duct that surrounds the propeller around the propeller axis;
an internal combustion engine that rotates the propeller relative to the duct;
an electric motor that rotates the propeller relative to the duct by rotating the rim;
an illuminant that changes a light emission state in accordance with a rotation state of the propeller; wherein
the electric motor includes a stator defined by at least one portion of the duct and a rotor defined by at least one portion of the rim;
the marine vessel propulsion device further comprises a power generation coil that includes at least one portion attached to the rim at a position at which the one portion attached thereto faces the stator and that rotates around the propeller axis together with the rim; and
the illuminant is connected to the power generation coil and is disposed on the propeller.

20. A marine vessel propulsion device comprising:
a propeller that includes a plurality of blades and a rim surrounding the plurality of blades around a propeller axis and that is rotatable around the propeller axis;
a duct that surrounds the propeller around the propeller axis;
an internal combustion engine that rotates the propeller relative to the duct;
an electric motor that rotates the propeller relative to the duct by rotating the rim;
an illuminant that changes a light emission state in accordance with a rotation state of the propeller;
a power generation coil that is attached to the rim and that rotates around the propeller axis together with the rim; and
a power generation magnet that is attached to the duct and that faces the power generation coil; wherein
the illuminant is connected to the power generation coil and is disposed on the propeller.

21. A marine vessel propulsion device comprising:
an internal combustion engine;
an electric motor;
a propeller that is rotationally driven around a propeller axis by at least one of the internal combustion engine and the electric motor; and
a forward/rearward switching mechanism that is disposed on a power transmission path from the internal combustion engine to the propeller and that performs switching among a forward state in which the internal combustion engine and the propeller are connected together so that the propeller generates a thrust force in a forward direction, a neutral state in which a connection between the internal combustion engine and the propeller is released, and a rearward state in which the internal combustion engine and the propeller are connected together so that the propeller generates a thrust force in a rearward direction; wherein
the electric motor is disposed closer to the propeller than the forward/rearward switching mechanism on the power transmission path from the internal combustion engine to the propeller.

22. The marine vessel propulsion device according to claim 21, further comprising:
a shift operating member that is operable by a vessel operator in order to switch a direction of a thrust force generated by the marine vessel propulsion device between the forward direction and the rearward direction;
an engine speed detector that detects a rotation speed of the internal combustion engine;
a propeller speed detector that detects a rotation speed of the propeller; and
a control device programmed to perform a shift-in control that switches the forward/rearward switching mechanism from the neutral state to the forward state or to the rearward state only when a speed difference that is a difference between the rotation speed of the internal combustion engine and the rotation speed of the propeller falls within a predetermined range, in response to a shift-in operation performed on the shift operating member to switch the forward/rearward switching mechanism from the neutral state to the forward state or to the rearward state.

23. The marine vessel propulsion device according to claim 22, wherein, in a case that the speed difference does not fall within the predetermined range when the shift-in operation is performed on the shift operating member, the control device is programmed to change the speed difference so as to fall within the predetermined range by controlling at least one of the internal combustion engine and the electric motor, and to then perform the shift-in control.

24. The marine vessel propulsion device according to claim 21, further comprising:
- a shift operating member that is operable by a vessel operator;
- an engine speed detector that detects a rotation speed of the internal combustion engine;
- a propeller speed detector that detects a rotation speed of the propeller; and
- a control device programmed to control the forward/rearward switching mechanism; wherein
- when a reverse operation is performed on the shift operating member to switch the forward/rearward switching mechanism from either one of the forward state and the rearward state to the other one of the forward state and the rearward state, the control device is programmed to decrease the rotation speed of the propeller in a pre-reverse direction to a cut-off speed by controlling the electric motor, and to then switch the forward/rearward switching mechanism from the forward state or from the rearward state to the neutral state.

25. The marine vessel propulsion device according to claim 24, wherein the control device is programmed to switch the forward/rearward switching mechanism from the forward state or from the rearward state to the neutral state, and to then rotate the propeller in a post-reverse direction opposite to the pre-reverse direction by controlling the electric motor, and to switch the forward/rearward switching mechanism from the neutral state to the forward state or to the rearward state in a state in which the rotation speed of the propeller in the post-reverse direction is not less than a connection speed.

26. The marine vessel propulsion device according to claim 21, further comprising:
- a shift operating member that is operable by a vessel operator in order to switch a direction of a thrust force generated by the marine vessel propulsion device between the forward direction and the rearward direction;
- an engine speed detector that detects a rotation speed of the internal combustion engine;
- a propeller speed detector that detects a rotation speed of the propeller; and
- a control device programmed to control the forward/rearward switching mechanism; wherein
- when a shift-out operation is performed on the shift operating member to switch the forward/rearward switching mechanism from the forward state or from the rearward state to the neutral state, the control device is programmed to decrease the rotation speed of the propeller in a pre-shift-out direction to a cut-off speed by controlling the electric motor, and to then switch the forward/rearward switching mechanism from the forward state or from the rearward state to the neutral state.

* * * * *